(12) United States Patent
Hayashi et al.

(10) Patent No.: US 9,492,742 B2
(45) Date of Patent: *Nov. 15, 2016

(54) STORAGE MEDIUM HAVING STORED THEREON INFORMATION PROCESSING PROGRAM, INFORMATION PROCESSING APPARATUS, INFORMATION PROCESSING SYSTEM, AND INFORMATION PROCESSING METHOD

(75) Inventors: Yugo Hayashi, Kyoto (JP); Kazuya Sumaki, Kyoto (JP); Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 701 days.

This patent is subject to a terminal disclaimer.

(21) Appl. No.: 13/401,054

(22) Filed: Feb. 21, 2012

(65) Prior Publication Data

US 2012/0229454 A1    Sep. 13, 2012

(30) Foreign Application Priority Data

Mar. 8, 2011    (JP) ................................. 2011-050039
Apr. 5, 2011    (JP) ................................. 2011-083453
(Continued)

(51) Int. Cl.
*G09G 5/00*    (2006.01)
*A63F 13/211*    (2014.01)
(Continued)

(52) U.S. Cl.
CPC .............. *A63F 13/211* (2014.09); *A63F 13/06* (2013.01); *A63F 13/214* (2014.09); *A63F 13/26* (2014.09);
(Continued)

(58) Field of Classification Search
None
See application file for complete search history.

(56) References Cited

U.S. PATENT DOCUMENTS 5,838,909 A    11/1998    Roy et al.
5,853,324 A    12/1998    Kami et al.
(Continued)

FOREIGN PATENT DOCUMENTS

EP    1 726 342 A2    11/2006
EP    2 218 485        8/2010
(Continued)

OTHER PUBLICATIONS

U.S. Appl. No. 13/362,381, filed Jan. 31, 2012. Storage Medium Having Stored Thereon Game Program, Game Apparatus, Game System, and Game Processing Method.
(Continued)

*Primary Examiner* — James A Thompson
*Assistant Examiner* — Xilin Guo
(74) *Attorney, Agent, or Firm* — Nixon & Vanderhye, P.C.

(57) ABSTRACT

On the basis of data based on an attitude and/or a motion of a portable display apparatus body, at least a direction of rotation and an amount of rotation of the portable display apparatus about a predetermined direction in real space are calculated, and a corrected amount of rotation is calculated by offsetting the calculated amount of rotation by a predetermined amount. Then, an operation indication direction based on the direction of rotation and the corrected amount of rotation is calculated with respect to a direction that corresponds to the predetermined direction and is set in a virtual world, and predetermined processing is performed on the virtual world. A first image including at least a part of the virtual world is displayed on the portable display apparatus.

23 Claims, 24 Drawing Sheets

(30) Foreign Application Priority Data

| Apr. 5, 2011 | (JP) | 2011-083454 |
| Apr. 5, 2011 | (JP) | 2011-083455 |
| Apr. 5, 2011 | (JP) | 2011-083456 |
| May 24, 2011 | (JP) | 2011-115402 |
| May 24, 2011 | (JP) | 2011-115403 |
| May 24, 2011 | (JP) | 2011-115404 |
| May 27, 2011 | (JP) | 2011-118901 |
| May 27, 2011 | (JP) | 2011-118902 |
| Jun. 1, 2011 | (JP) | 2011-123644 |
| Jun. 1, 2011 | (JP) | 2011-123645 |
| Jun. 1, 2011 | (JP) | 2011-123646 |
| Oct. 13, 2011 | (JP) | 2011-225538 |

(51) Int. Cl.

| G06T 3/20 | (2006.01) |
| G06T 3/60 | (2006.01) |
| G06T 11/60 | (2006.01) |
| A63F 13/214 | (2014.01) |
| A63F 13/428 | (2014.01) |
| A63F 13/26 | (2014.01) |
| A63F 13/5255 | (2014.01) |
| G06F 3/01 | (2006.01) |
| A63F 13/20 | (2014.01) |
| G06F 3/0481 | (2013.01) |

(52) U.S. Cl.
CPC ......... *A63F 13/428* (2014.09); *A63F 13/5255* (2014.09); *G06F 3/011* (2013.01); *G06T 3/20* (2013.01); *G06T 3/60* (2013.01); *G06T 11/60* (2013.01); *A63F 2300/105* (2013.01); *A63F 2300/1068* (2013.01); *A63F 2300/301* (2013.01); *A63F 2300/403* (2013.01); *A63F 2300/6045* (2013.01); *A63F 2300/6676* (2013.01); *A63F 2300/6684* (2013.01); *A63F 2300/8005* (2013.01); *G06F 3/04815* (2013.01)

(56) References Cited

U.S. PATENT DOCUMENTS

| 6,201,554 | B1 | 3/2001 | Lands |
| 6,225,977 | B1 | 5/2001 | Li |
| 6,290,600 | B1 | 9/2001 | Glasson |
| 6,416,410 | B1* | 7/2002 | Abou-Samra et al. ......... 463/31 |
| 6,450,886 | B1 | 9/2002 | Oishi et al. |
| 6,483,540 | B1 | 11/2002 | Akasawa et al. |
| 6,500,070 | B1 | 12/2002 | Tomizawa et al. |
| 6,540,614 | B1 | 4/2003 | Nishino et al. |
| 6,712,703 | B2* | 3/2004 | Miyamoto et al. ............. 463/43 |
| 6,762,746 | B2 | 7/2004 | Fukuda |
| 6,908,388 | B2 | 6/2005 | Shimizu et al. |
| 6,966,837 | B1 | 11/2005 | Best |
| 7,326,117 | B1 | 2/2008 | Best |
| 7,588,498 | B2 | 9/2009 | Iizuka et al. |
| 2002/0006827 | A1 | 1/2002 | Ogata et al. |
| 2002/0022518 | A1 | 2/2002 | Okuda et al. |
| 2002/0140666 | A1 | 10/2002 | Bradski |
| 2002/0155889 | A1 | 10/2002 | Miyamoto et al. |
| 2002/0165028 | A1 | 11/2002 | Miyamoto et al. |
| 2003/0134665 | A1 | 7/2003 | Kato et al. |
| 2003/0216176 | A1* | 11/2003 | Shimizu et al. ................ 463/31 |
| 2003/0220142 | A1 | 11/2003 | Siegel |
| 2004/0046736 | A1 | 3/2004 | Pryor et al. |
| 2004/0092309 | A1 | 5/2004 | Suzuki |
| 2004/0219980 | A1 | 11/2004 | Bassett et al. |
| 2004/0229687 | A1 | 11/2004 | Miyamoto et al. |
| 2005/0014543 | A1* | 1/2005 | Itoi et al. ........................ 463/8 |
| 2005/0119053 | A1 | 6/2005 | Suzuki et al. |
| 2005/0130738 | A1 | 6/2005 | Miyamoto et al. |
| 2005/0187015 | A1 | 8/2005 | Suzuki et al. |
| 2005/0255900 | A1 | 11/2005 | Takahashi et al. |
| 2006/0017692 | A1 | 1/2006 | Wehrenberg et al. |
| 2006/0040740 | A1 | 2/2006 | DiDato |
| 2006/0046848 | A1 | 3/2006 | Abe et al. |
| 2006/0262120 | A1 | 11/2006 | Rosenberg |
| 2006/0262210 | A1 | 11/2006 | Smith et al. |
| 2006/0266200 | A1 | 11/2006 | Goodwin |
| 2007/0007143 | A1 | 1/2007 | Hayashi et al. |
| 2007/0008298 | A1* | 1/2007 | Ohta ............................. 345/173 |
| 2007/0015577 | A1 | 1/2007 | Hsu |
| 2007/0018968 | A1 | 1/2007 | Iwamoto et al. |
| 2007/0072662 | A1 | 3/2007 | Templeman |
| 2007/0073196 | A1 | 3/2007 | Tanaka et al. |
| 2007/0208528 | A1 | 9/2007 | Seo et al. |
| 2007/0265085 | A1 | 11/2007 | Miyamoto et al. |
| 2008/0009332 | A1 | 1/2008 | Kake |
| 2008/0042973 | A1 | 2/2008 | Zhao et al. |
| 2008/0062198 | A1* | 3/2008 | Takahashi et al. ........... 345/630 |
| 2008/0070686 | A1 | 3/2008 | Satsukawa et al. |
| 2008/0096654 | A1 | 4/2008 | Mondesir et al. |
| 2008/0096657 | A1 | 4/2008 | Benoist |
| 2008/0102951 | A1* | 5/2008 | Eto et al. ........................ 463/32 |
| 2008/0216974 | A1 | 9/2008 | Pitcher et al. |
| 2008/0254821 | A1 | 10/2008 | Kusuda et al. |
| 2008/0261696 | A1 | 10/2008 | Yamazaki et al. |
| 2008/0268956 | A1 | 10/2008 | Suzuki |
| 2008/0274813 | A1 | 11/2008 | Sato |
| 2008/0318681 | A1 | 12/2008 | Rofougaran et al. |
| 2009/0002391 | A1 | 1/2009 | Williamson et al. |
| 2009/0069096 | A1* | 3/2009 | Nishimoto ..................... 463/43 |
| 2009/0070093 | A1 | 3/2009 | Nakanishi et al. |
| 2009/0093305 | A1 | 4/2009 | Okamoto et al. |
| 2009/0156308 | A1 | 6/2009 | Hsu |
| 2009/0187371 | A1 | 7/2009 | Ohta |
| 2009/0244064 | A1 | 10/2009 | Inokuchi et al. |
| 2009/0298585 | A1 | 12/2009 | Cannon et al. |
| 2009/0303204 | A1 | 12/2009 | Nasiri et al. |
| 2010/0045666 | A1 | 2/2010 | Kornmann et al. |
| 2010/0045667 | A1 | 2/2010 | Kornmann et al. |
| 2010/0048357 | A1 | 2/2010 | Nakagawa et al. |
| 2010/0053322 | A1 | 3/2010 | Marti et al. |
| 2010/0058254 | A1 | 3/2010 | Narita |
| 2010/0081505 | A1 | 4/2010 | Alten et al. |
| 2010/0087248 | A1* | 4/2010 | Takahashi ..................... 463/30 |
| 2010/0137063 | A1 | 6/2010 | Shirakawa et al. |
| 2010/0169110 | A1 | 7/2010 | Sawano et al. |
| 2010/0178988 | A1 | 7/2010 | Izuno et al. |
| 2010/0188937 | A1 | 7/2010 | Watanabe |
| 2010/0214216 | A1 | 8/2010 | Nasiri et al. |
| 2010/0245236 | A1 | 9/2010 | Takayama |
| 2010/0245685 | A1* | 9/2010 | Onodera et al. .............. 348/745 |
| 2010/0279770 | A1* | 11/2010 | Ikeda ............................. 463/32 |
| 2010/0283723 | A1 | 11/2010 | Konishi |
| 2010/0285882 | A1 | 11/2010 | Hsu |
| 2010/0292006 | A1 | 11/2010 | Terrell et al. |
| 2010/0302238 | A1* | 12/2010 | Yonemori et al. ............ 345/419 |
| 2010/0304857 | A1 | 12/2010 | Suzuki et al. |
| 2011/0039618 | A1* | 2/2011 | Ichiyanagi et al. ............ 463/31 |
| 2011/0054359 | A1 | 3/2011 | Sazonov et al. |
| 2011/0070953 | A1 | 3/2011 | Konishi |
| 2011/0077088 | A1 | 3/2011 | Hayashi et al. |
| 2011/0092289 | A1 | 4/2011 | Dagman et al. |
| 2011/0159960 | A1 | 6/2011 | Ueshima et al. |
| 2011/0169928 | A1 | 7/2011 | Gassel et al. |
| 2011/0172013 | A1 | 7/2011 | Shirasaka et al. |
| 2011/0244956 | A1 | 10/2011 | Sakakibara et al. |
| 2011/0244957 | A1 | 10/2011 | Nishimura et al. |
| 2011/0250964 | A1 | 10/2011 | Kulas |
| 2011/0250965 | A1 | 10/2011 | Kulas et al. |
| 2011/0281650 | A1 | 11/2011 | Yamazaki et al. |
| 2011/0300930 | A1 | 12/2011 | Hsu |
| 2011/0306425 | A1 | 12/2011 | Rivard et al. |
| 2012/0014558 | A1 | 1/2012 | Stafford et al. |
| 2012/0017236 | A1 | 1/2012 | Stafford et al. |
| 2012/0079080 | A1 | 3/2012 | Pishevar |
| 2012/0086630 | A1 | 4/2012 | Zhu et al. |
| 2012/0086631 | A1 | 4/2012 | Osman et al. |
| 2012/0115596 | A1 | 5/2012 | Otani |

(56) References Cited

U.S. PATENT DOCUMENTS

| | | | |
|---|---|---|---|
| 2012/0115609 | A1 | 5/2012 | Sugiyama et al. |
| 2013/0017876 | A1 | 1/2013 | Koumbourlis |
| 2013/0038532 | A1 | 2/2013 | Okura et al. |

FOREIGN PATENT DOCUMENTS

| | | | |
|---|---|---|---|
| EP | 2 497 545 A2 | | 9/2012 |
| EP | 2 497 545 A3 | | 10/2012 |
| EP | 2015854 | | 11/2013 |
| GB | 2 442 259 | | 4/2008 |
| GB | 2 442 259 A | | 4/2008 |
| JP | H07-36612 A | | 2/1995 |
| JP | H9-091110 | | 4/1997 |
| JP | H09-294260 | | 11/1997 |
| JP | H11-90043 A | | 4/1999 |
| JP | 2000-316143 | | 11/2000 |
| JP | 2000-325653 | | 11/2000 |
| JP | 2001-34247 A | | 2/2001 |
| JP | 2002-298160 | | 10/2002 |
| JP | 2002-325963 | | 11/2002 |
| JP | 2003-61940 | | 3/2003 |
| JP | 2003-512142 | | 4/2003 |
| JP | 2003-325974 A | | 11/2003 |
| JP | 2003-334379 | | 11/2003 |
| JP | 2004-030408 | | 1/2004 |
| JP | 2004-159781 | | 6/2004 |
| JP | 2004-329744 | | 11/2004 |
| JP | 2005-103154 | | 4/2005 |
| JP | 2005-137921 | | 6/2005 |
| JP | 2005-230263 | | 9/2005 |
| JP | 2006-31307 | | 2/2006 |
| JP | 2006-39635 | | 2/2006 |
| JP | 2007-301048 | | 11/2007 |
| JP | 2008-15679 | | 1/2008 |
| JP | 2008-264195 | | 11/2008 |
| JP | 2008-264402 | | 11/2008 |
| JP | 2009-172010 | | 8/2009 |
| JP | 2009-237680 | | 10/2009 |
| JP | 2009-536058 | | 10/2009 |
| JP | 2010-055511 | | 3/2010 |
| JP | 2010-233705 | | 10/2010 |
| JP | 2010-259611 | | 11/2010 |
| JP | 2010-273839 | | 12/2010 |
| JP | 2011-015752 | | 1/2011 |
| JP | 2011-19810 | | 2/2011 |
| JP | 2011-019817 | | 2/2011 |
| JP | 2011-53838 | | 3/2011 |
| JP | 2011-056049 | | 3/2011 |
| WO | WO 00/67864 | | 11/2000 |
| WO | WO 01/30470 A1 | | 5/2001 |
| WO | WO 2004/103244 | | 2/2004 |
| WO | 2010/060211 | | 6/2010 |
| WO | 2011/004629 | | 1/2011 |

OTHER PUBLICATIONS

Jul. 18, 2013 Office Action in U.S. Appl. No. 13/362,255, 20 pages.
Nov. 21, 2012 Office Action from U.S. Appl. No. 13/271,510, 22 pages.
Sep. 4, 2012 European Search Report for EP 11184519.4, 6 pages.
Sep. 4, 2012 European Search Report for EP 11185811.4, 7 pages.
Sep. 4, 2012 European Search Report for EP 11186930.1, 7 pages.
Oct. 2, 2012 European Search Report for EP 11186933.5, 7 pages.
Sep. 4, 2012 European Search Report for EP 11187473.1, 7 pages.
Sep. 7, 2012 European Search Report for EP 12156629.3, 7 pages.
Apr. 10, 2013 Office Action from U.S. Appl. No. 13/277,561, 43 pages.
Office Action of U.S. Appl. No. 13/333,045 dated Feb. 20, 2014.
Office Action in U.S. Appl No. 13/283,032 dated Dec. 5, 2013.
U.S. Office Action dated Jun. 27, 2014 issued in co-pending U.S. Appl. No. 13/283,072.
European Search Report for European Application 12156630.1 dated Oct. 1, 2013.
Final Office Action (36 pages) dated Jul. 2, 2014 issued in co-pending U.S. Appl. No. 13/283,032.
Office Action in U.S. Appl. No. 13/362,255 dated Apr. 10, 2014.
"Minna no Ennichi," Shukan Famitsu, vol. 27, No. 10, Enterbrain Inc., Feb. 23, 2012, pp. 32-33.
"Close-up!," Mobile Software Palm OS, Mobile PRESS, vol. 5, No. 1, Japan—Gijutsu-Hyohron Co., Ltd., Feb. 24, 2005, p. 213.
"iPhone 3G Perfect Guide." Mac People, vol. 14, No. 9, Japan, ASCII Media Works, Inc., Sep. 1, 2008, pp. 122-127.
"The Legend of Zelda: Ocarina of Time 3D," Famitsu DS+Wii, Enterbrain Inc., Apr. 21, 2011, vol. 13, No. 6.
Samurai Slash, [online], Aug. 27, 2015, the date of publication: Jun. 18, 2009 URL:http://raku-job.jp/blog/2009/06/iponeipod-touch.html.
Office Action dated Aug. 28, 2015 issued in corresponding JP Patent Application No. 2011-123644 and English Translation.
Office Action dated Sep. 1, 2015 issued in corresponding JP Patent Application No. 2011-118901 and English Translation.
Office Action dated Sep. 1, 2015 issued in corresponding JP Patent Appliaction No. 2011-115402 and English Translation.
Office Action dated Sep. 1, 2015 issued in corresponding JP Patent Application No. 2011-115404 and English Translation.
Office Action in related U.S. Appl. No. 13/283,032 dated Dec. 30, 2015.
Notice of Allowance in related U.S. Appl. No. 13/343,913 dated Jan. 11, 2016.
Office Action dated Dec. 10, 2014 in corresponding U.S. Appl. No. 13/283,032.
European Search Report in corresponding European Application No. 14166174.4 dated Jan. 14, 2016.
Office Action dated Jan. 20, 2016, issued in corresponding U.S. Appl. No. 13/287,320, filed Nov. 2, 2011.
"Virtual Camera System." Wikipedia. Wikimedia Foundation, Feb. 25, 2011. Web. Jan. 7, 2016. <https://en.wikipedia.org/w/index.php?title=Virtual_camera_system&oldid=415917860>.
U.S. Appl. No. 13/271,510, filed Oct. 12, 2011, Information Processing System, Computer-Readable Storage Medium, and Information Processing Method.
U.S. Appl. No. 13/277,561, filed Oct. 20, 2011, Computer-Readable Storage Medium, Information Processing System, and Information Processing Method.
U.S. Appl. No. 13/283,032, filed Oct. 27, 2011, Computer-Readable Storage Medium, Information Processing System, and Information Processing Method.
U.S. Appl. No. 13/287,320, filed Nov. 2, 2011, Computer-Readable Storage Medium, Information Processing System, and Information Processing Method.
U.S. Appl. No. 13/352,091, filed Jan. 17, 2012, Storage Medium Having Stored Thereon Information Processing Program, Information Processing Apparatus, Information Processing System, and Information Processing Method.
U.S. Appl. No. 13/343,913, filed Jan. 5, 2012, Storage Medium Having Stored Thereon Information Processing Program, Information Processing Apparatus, Information Processing System, and Information Processing Method.
U.S. Appl. No. 13/362,255, filed Jan. 31, 2012, Storage Medium Having Stored Thereon Game Program, Game Apparatus, Game System, and Game Processing Method.
U.S. Appl. No. 13/362,289, filed Jan. 31, 2012, Storage Medium Having Stored Thereon Information Processing Program, Information Processing Apparatus, Information Processing System, and Information Processing Method.
U.S. Appl. No. 13/400,944, filed Feb. 21, 2012, Storage Medium Having Stored Thereon Information Processing Program, Information Processing Apparatus, Information Processing System, and Information Processing Method.
U.S. Appl. No. 13/402,026, filed Feb. 22, 2012, Storage Medium Having Stored Thereon Information Processing Program, Information Processing Apparatus, Information Processing System, and Information Processing Method.

(56) References Cited

OTHER PUBLICATIONS

U.S. Appl. No. 13/401,054, filed Feb. 21, 2012, Storage Medium Having Stored Thereon Information Processing Program, Information Processing Apparatus, Information Processing System, and Information Processing Method.
U.S. Appl. No. 13/283,072, filed Oct. 27, 2011, Computer-Readable Storage Mediu, Inforamtion Processing System, and Information Processing Method.
Notice of Allowance in corresponding U.S. Appl. No. 13/352,091 dated Feb. 18, 2016.
Office Action issued Japanese Patent Appln. No. 2011-083454 dated Jan. 22, 2015 (with translation).
Office Action issued Japanese Patent Appln. Nos. 2011-123645 and 2011-123646 dated Feb. 20, 2015.
The Legend of Zelda: Ocarina of Time, Nintendo DREAM, Kabushiki Kaisha Anbitto, Mar. 1, 2011, vol. 203 p. 11.
European Search Report for EP11194630.7 dated Feb. 16, 2015.
Office Action in corresponding U.S. Appl. No. 13/287,320 dated Feb. 27, 2015.
Office Action in corresponding U.S. Appl. No. 13/343,913 dated Mar. 4, 2015.
Japanese Notice of Reasons for Refusal dated Mar. 16, 2015 in corresponding JP Application No. 2011-118902.
Office Action in corresponding Japanese Patent Application No. 2011-225538 mailed May 21, 2015.
Office Action in corresponding U.S. Appl. No. 13/352,091 dated May 1, 2015.
Office Action dated Jun. 30, 2015 in corresponding U.S. Appl. No. 13/287,320.
Wei et al., "Novel Interface for First Person Shooting Games on PDAs," 2008, pp. 113-121.
Office Action in corresponding U.S. Appl. No. 13/343,913 dated Jul. 29, 2015.
Decision of Refusal in corresponding Japanese Appln. No. 2011-123645 dated Aug. 6, 2015.
Office Action dated Aug. 20, 2014 issued in U.S. Appl. No. 13/343,913.
Aug. 29, 2013 Office Action in U.S. Appl. No. 13/362,289, 71 pages.
Aug. 29, 2013 Office Action in U.S. Appl. No. 13/400,944, 58 pages.
Aug. 29, 2013 Office Action in U.S. Appl. No. 13/402,026, 87 pages.
U.S. Appl. No. 13/283,072, filed Oct. 27, 2011, Computer-Readable Storage Medium, Information Processing System, and Information Processing Method.
U.S. Appl. No. 13/352,091, filed Jan. 17, 2012, Computer-Readable Storage Medium, Information Processing System, and Information Processing Method.
U.S. Appl. No. 13/362,381, filed Jan. 31, 2012, Storage Medium Having Stored Thereon Game Program, Game Apparatus, Game System, and Game Processing Method.
U.S. Appl. No. 13/333,045, filed Dec. 21, 2011, Storage Medium Having Information Processing Program Stored Thereon, Information Processing Apparatus, Information Processing System, and Information Processing Method.
Office Action in co-pending U.S. Appl. No. 13/271,510 dated Sep. 18, 2014.
Office Action in co-pending U.S. Appl. No. 13/287,320 dated Oct. 3, 2014.
Office Action in co-pending U.S. Appl. No. 13/283,072 dated Oct. 10, 2014.
European Search Report EP Application No. 12 15 0272.8 dated Oct. 28, 2014.
European Search Report EP Application No. 12 15 3067.9 dated Oct. 29, 2014.
Cameltry: an iPhone ball rolling labyrinth demanding Cameltray and rotations. You had better not compare it with other similar games, uploaded on Mar. 9, 2009 (with translation).
Notice of Reasons for Refusal for corresponding Japanese Patent Appln. No. JP2011-118901 dated May 18, 2016.
Office Action in related U.S. Appl. No. 13/277,561 dated Jul. 13, 2016.

\* cited by examiner

F I G. 4
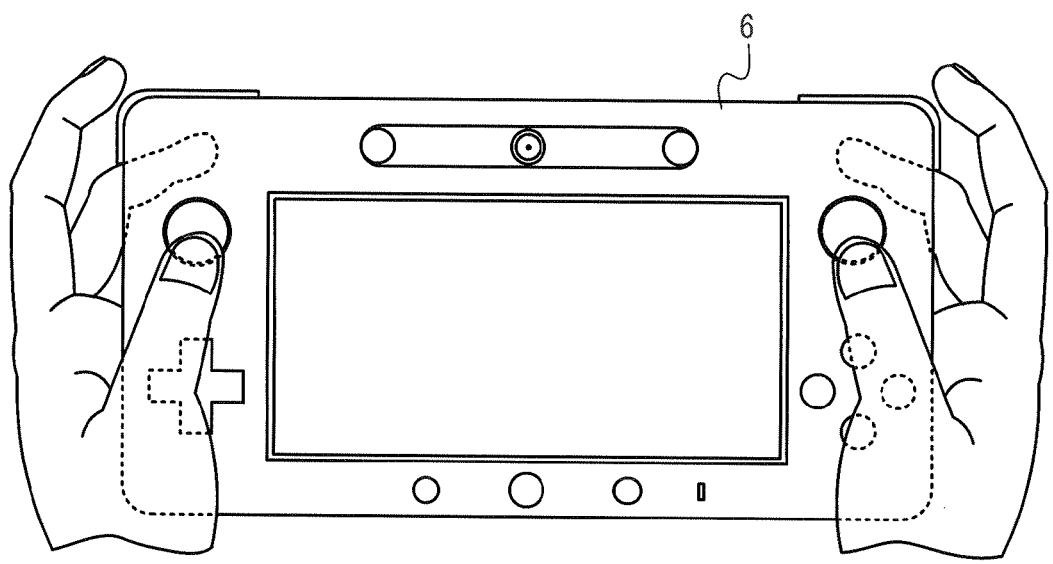

F I G. 8
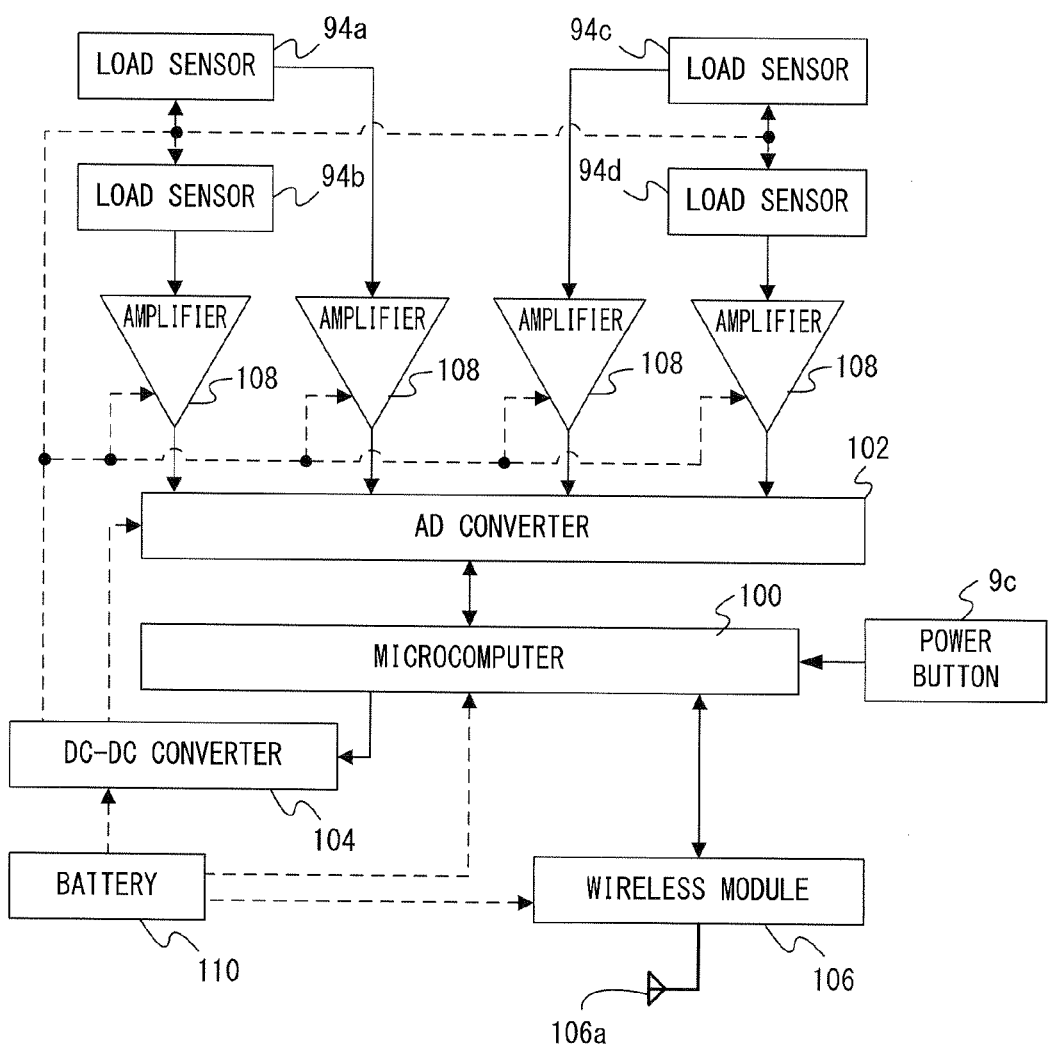

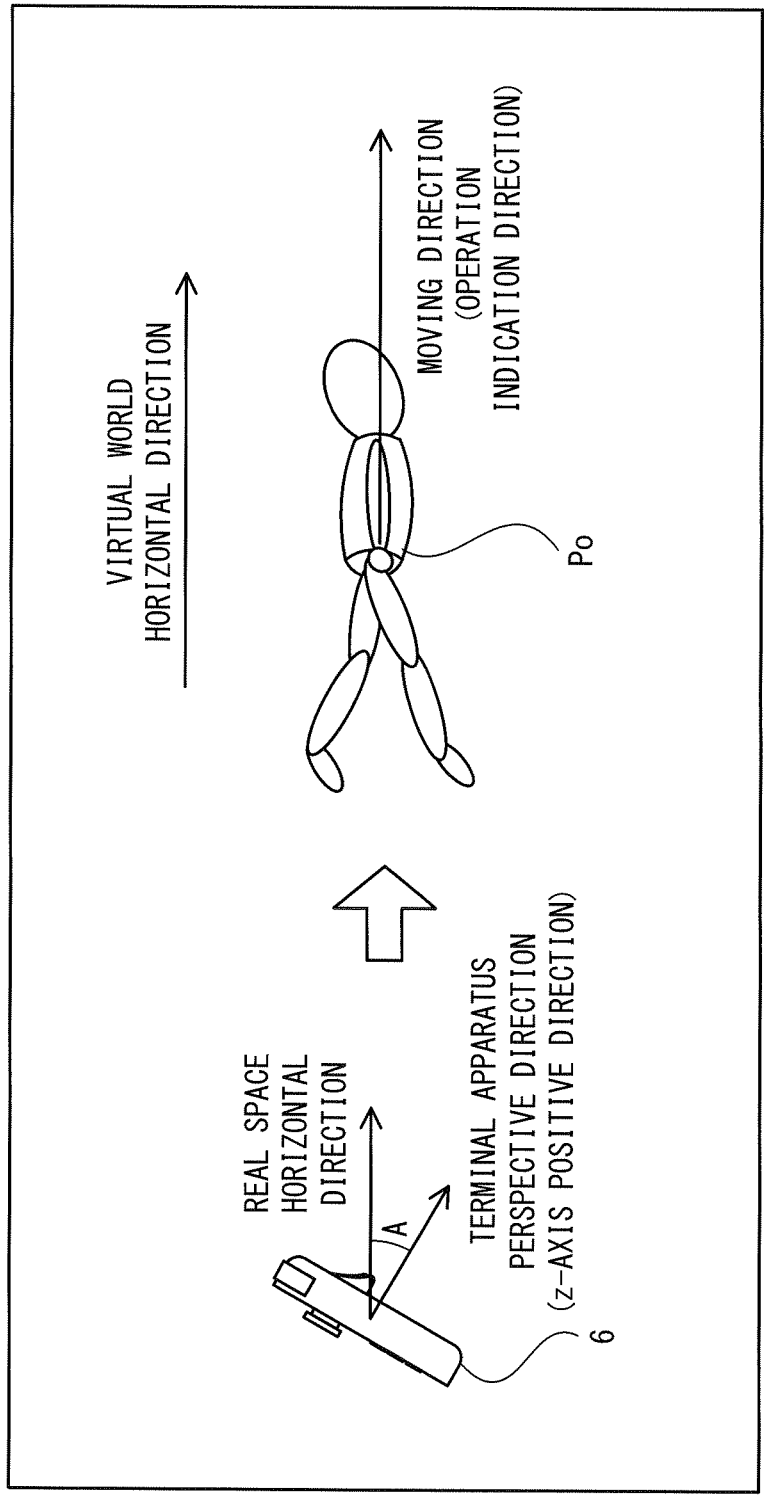

FIG. 12
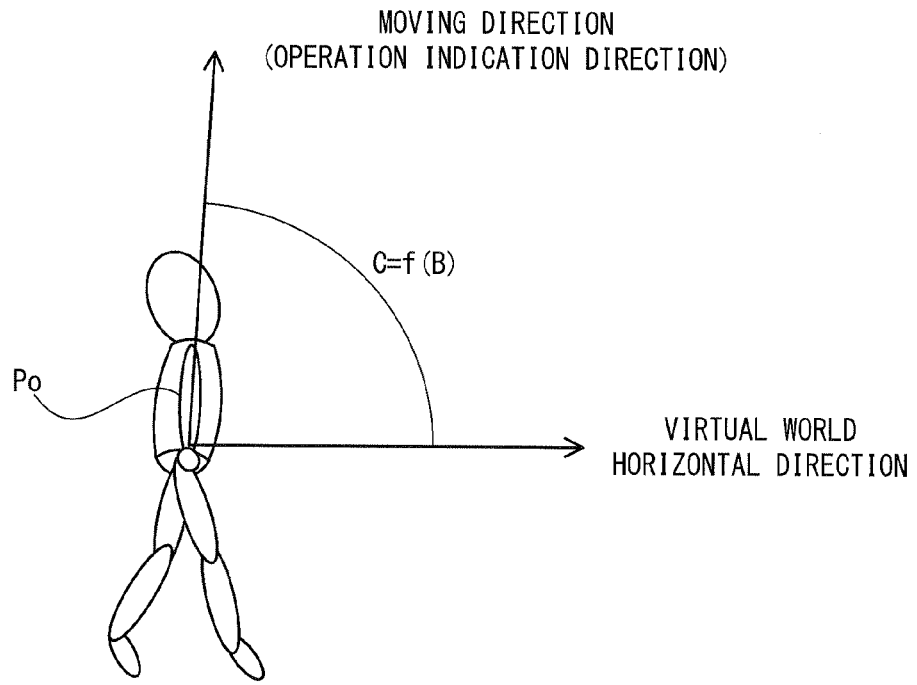
MOVING DIRECTION
(OPERATION INDICATION DIRECTION)
$C=f(B)$
Po
VIRTUAL WORLD HORIZONTAL DIRECTION
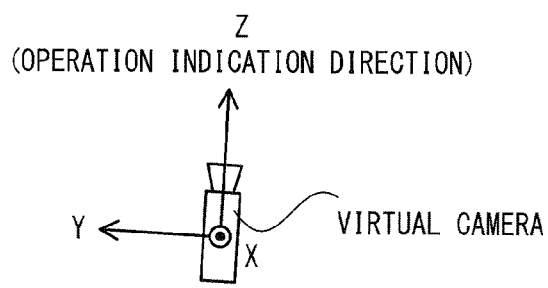
Z
(OPERATION INDICATION DIRECTION)
Y
VIRTUAL CAMERA
X
REAL SPACE HORIZONTAL DIRECTION
⟶
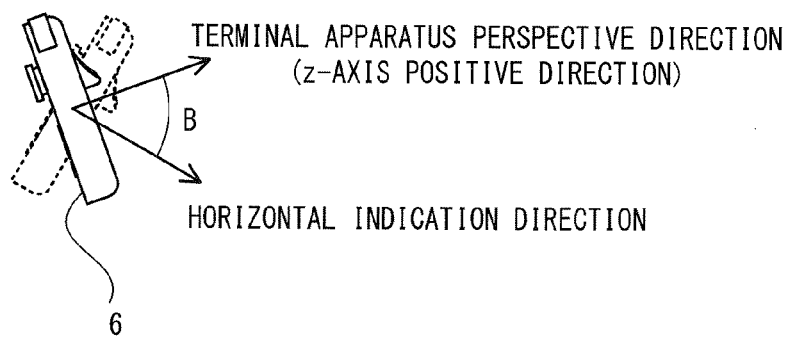
TERMINAL APPARATUS PERSPECTIVE DIRECTION
(z-AXIS POSITIVE DIRECTION)
B
HORIZONTAL INDICATION DIRECTION
6

F I G. 1 3
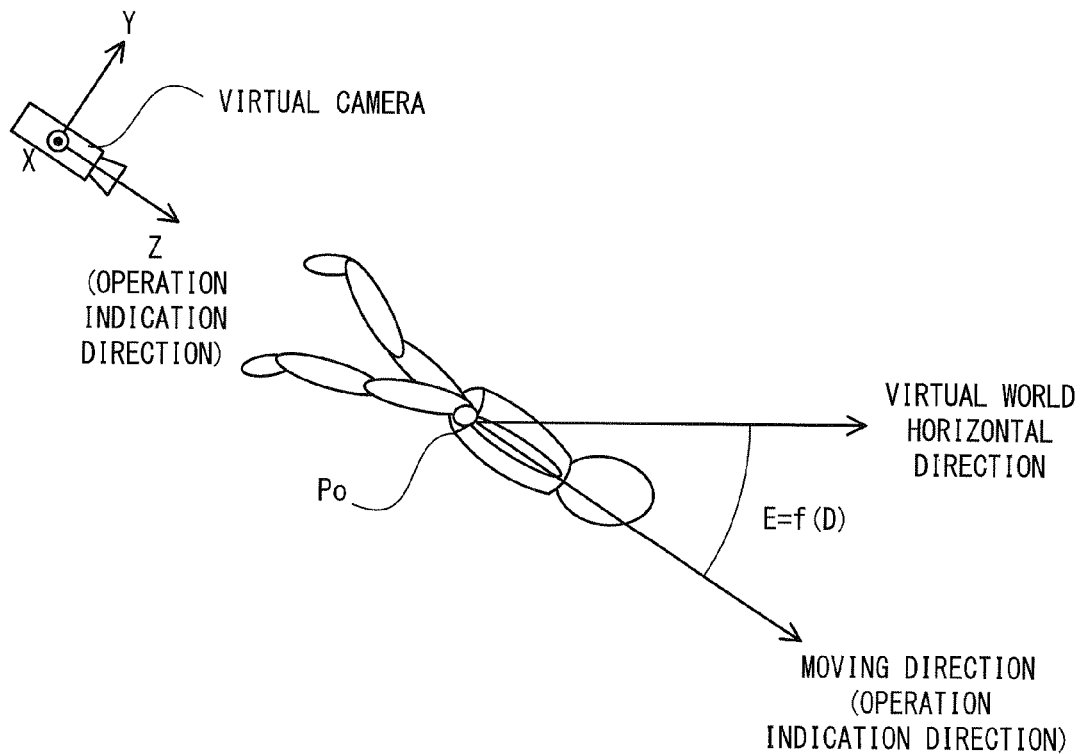
REAL SPACE HORIZONTAL DIRECTION
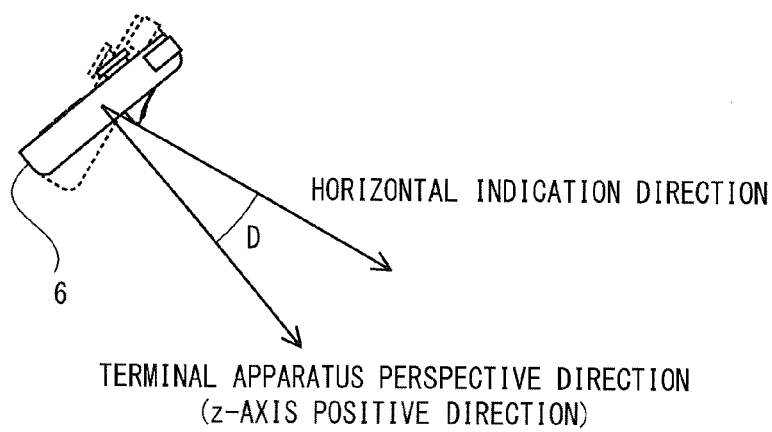

FIG. 23
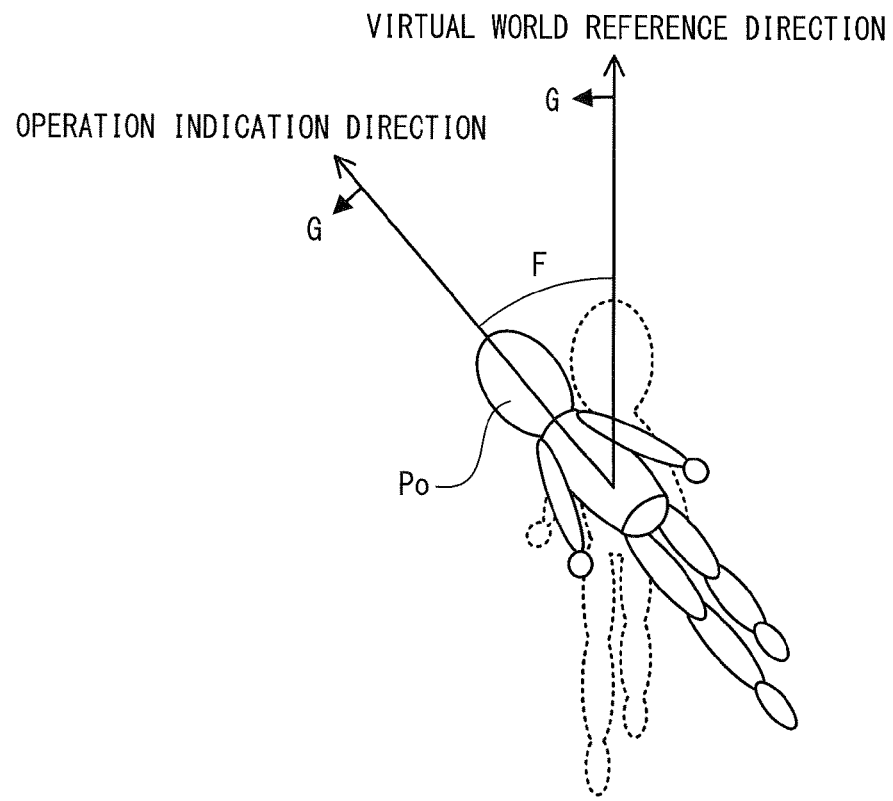
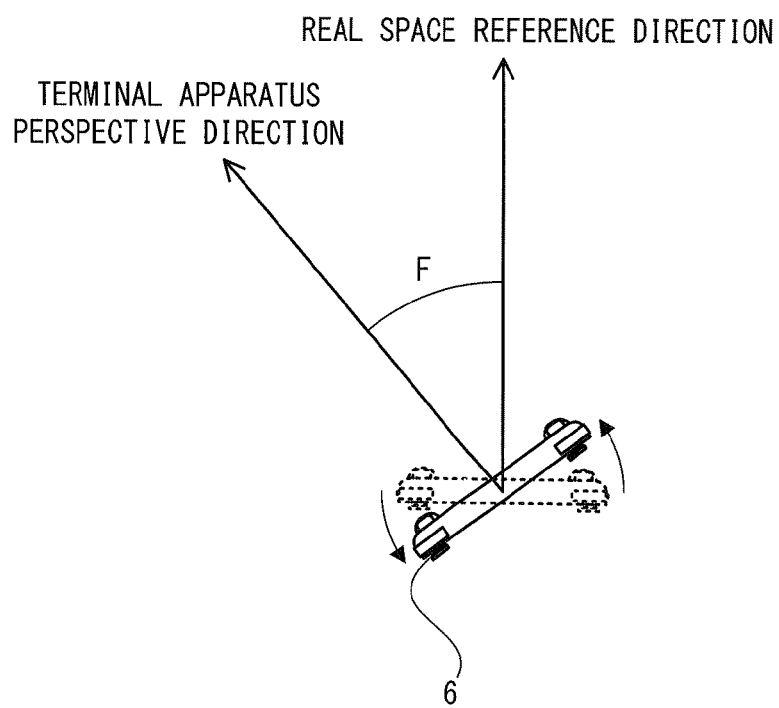

STORAGE MEDIUM HAVING STORED THEREON INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosures of Japanese Patent Application No. 2011-050039, filed on Mar. 8, 2011, Japanese Patent Application No. 2011-083453, Japanese Patent Application No. 2011-083454, Japanese Patent Application No. 2011-083455, and Japanese Patent Application No. 2011-083456, filed on Apr. 5, 2011, Japanese Patent Application No. 2011-115402, Japanese Patent Application No. 2011-115403, and Japanese Patent Application No. 2011-115404, filed on May 24, 2011, Japanese Patent Application No. 2011-118901 and Japanese Patent Application No. 2011-118902, filed on May 27, 2011, Japanese Patent Application No. 2011-123644, Japanese Patent Application No. 2011-123645, and Japanese Patent Application No. 2011-123646, filed on Jun. 1, 2011, and Japanese Patent Application No. 2011-225538, filed on Oct. 13, 2011, are incorporated herein by reference.

FIELD

The technique shown here relates to a storage medium having stored thereon an information processing program, an information processing apparatus, an information processing system, and an information processing method, and in particular, relates to a storage medium having stored thereon an information processing program that, for example, performs the process of displaying a virtual world, and an information processing apparatus, an information processing system, and an information processing method that, for example, perform the process of displaying a virtual world.

BACKGROUND AND SUMMARY

Conventionally, there is a game where a user operates a mobile hand-held terminal (hand-held game apparatus) while holding it, and an event is executed in accordance with the attitude and the position of the mobile hand-held terminal in real space. The mobile hand-held terminal includes a sensor that detects the position and the attitude of the mobile hand-held terminal in real space, and the user of the terminal advances the game by moving the mobile hand-held terminal and changing the attitude of the mobile hand-held terminal. For example, when rotation about a left-right direction of the mobile hand-held terminal (i.e., a direction parallel to the long side of a display screen of the mobile hand-held terminal) has been detected in real space, the point of view toward a virtual world displayed on the display screen changes upward and downward in accordance with the direction of the rotation and the amount of the rotation of the mobile hand-held terminal.

The mobile hand-held terminal, however, detects the rotation of the mobile hand-held terminal, and controls the point of view in accordance with the direction of the rotation and the amount of the rotation of the mobile hand-held terminal. Thus, the point of view that changes depending on a change in the attitude of the mobile hand-held terminal is controlled so as to move in a direction corresponding to the detected direction of the rotation and at a distance based on the amount of the rotation. That is, when the user attempts to maintain a desired point of view, the user needs to maintain the attitude of the mobile hand-held terminal in order to maintain the desired point of view. This may increase a burden on the user for maintaining the attitude.

Therefore, it is an object of the exemplary embodiment to provide a storage medium having stored thereon an information processing program capable of, when an image of a virtual world is displayed on a display apparatus that allows a user to view a screen thereof while holding it and an operation is performed on the virtual world in accordance with the attitude and the motion of the display apparatus, facilitating the operation based on the attitude and the motion of the display apparatus, and an information processing apparatus, an information processing system, and an information processing method that are capable of, when an image of a virtual world is displayed on a display apparatus that allows a user to view a screen thereof while holding it and an operation is performed on the virtual world in accordance with the attitude and the motion of the display apparatus, facilitating the operation based on the attitude and the motion of the display apparatus.

To achieve the above object, the exemplary embodiment may employ, for example, the following configurations. It is understood that when the description of the scope of the appended claims is interpreted, the scope should be interpreted only by the description of the scope of the appended claims. If the description of the scope of the appended claims contradicts the description of these columns, the description of the scope of the appended claims has priority.

In an exemplary configuration of a computer-readable storage medium having stored thereon an information processing program according to the exemplary embodiment, the information processing program is executed by a computer of an information processing apparatus capable of displaying an image on a portable display apparatus that outputs at least data based on an attitude and/or a motion of the portable display apparatus body. The information processing program causes the computer to execute: calculating, on the basis of the data output from the portable display apparatus, at least a direction of rotation and an amount of rotation of the portable display apparatus about a predetermined direction in real space; calculating a corrected amount of rotation by offsetting the calculated amount of rotation by a predetermined amount; calculating, with respect to a direction that corresponds to the predetermined direction and is set in a virtual world, an operation indication direction based on the direction of rotation and the corrected amount of rotation; performing predetermined processing on the virtual world in accordance with the operation indication direction; generating a first image including at least a part of the virtual world subjected to the processing; and displaying the first image on the portable display apparatus.

It should be noted that the information processing apparatus may be an apparatus that performs game processing and generates an image based on the game processing, or may be a versatile apparatus such as a general personal computer. The portable display apparatus may have a size small enough to be carried by a user. Typically, the portable display apparatus may be a display apparatus that allows the user to view an image displayed thereon by holding it with both hands. Further, as in a terminal apparatus according to the embodiment described later, the portable display apparatus may or may not include components other than: means for outputting at least data based on the attitude and/or the motion of the portable display apparatus body; and means for displaying the first image.

Based on the above, it is possible to set an operation indication direction in a virtual world using a corrected amount of rotation obtained by offsetting the amount of rotation of a portable display apparatus in real space by a predetermined amount. For example, an amount of offset may be set such that the operation indication direction calculated when a user maintains the portable display apparatus while holding it in a comfortable position is a direction to be used mainly in a virtual world, whereby the user can operate the portable display apparatus while being in a relatively comfortable position.

In addition, in accordance with the operation indication direction, a process may be performed of controlling an attitude of a first virtual camera set in the virtual world. An image of the virtual world viewed from the first virtual camera may be generated as the first image.

Based on the above, when an operation on the point of view and/or the direction of the line of sight toward the virtual world displayed on the portable display apparatus is performed in accordance with the attitude and the motion of the portable display apparatus, it is possible to facilitate the operation based on the attitude and the motion of the portable display apparatus.

In addition, the attitude of the first virtual camera may be controlled such that the operation indication direction coincides with a direction of a line of sight of the first virtual camera.

Based on the above, the attitude of a virtual camera is controlled on the basis of the attitude of the portable display apparatus, whereby, in accordance with the user directing the portable display apparatus in the direction that they wish to view, it is possible to provide the user with, for example, an image as if peeping at the virtual world through the portable display apparatus. This makes it possible to provide the user with a feeling as if being in the virtual world.

In addition, using as the predetermined direction a horizontal direction in real space perpendicular to a perspective direction of a display screen of the portable display apparatus, a direction of rotation and an amount of rotation of the perspective direction may be calculated. The operation indication direction may be calculated so as to rotate about a horizontal direction in the virtual world on the basis of the direction of rotation and the corrected amount of rotation of the portable display apparatus.

In addition, the direction of rotation and the amount of rotation of the portable display apparatus about each of the predetermined direction, a direction of gravity in real space, and a horizontal direction in real space perpendicular to the predetermined direction may be calculated. The corrected amount of rotation may be calculated from the calculated amount of rotation about the predetermined direction. The operation indication direction may be calculated so as to: rotate about a horizontal direction in the virtual world on the basis of the direction of rotation and the corrected amount of rotation about the predetermined direction; rotate about a direction of gravity in the virtual world on the basis of the direction of rotation and the amount of rotation about the direction of gravity in real space; and rotate about a horizontal direction in the virtual world on the basis of the direction of rotation and the amount of rotation about the horizontal direction in real space perpendicular to the predetermined direction.

Based on the above, when an operation on the virtual world is performed in accordance with the attitude and the motion of the portable display apparatus in an up-down direction in real space, it is possible to facilitate the operation based on the attitude and the motion of the portable display apparatus in the up-down direction.

In addition, a direction of rotation and an amount of rotation of a perspective direction of a display screen of the portable display apparatus may be calculated, using as the predetermined direction a direction defined in the portable display apparatus body.

Based on the above, an amount of rotation is corrected with respect to the portable display apparatus body. This makes it possible to offset the amount of rotation, regardless of the attitude of the portable display apparatus in real space.

In addition, the corrected amount of rotation may be calculated by offsetting the calculated amount of rotation of the perspective direction about the predetermined direction, in an elevation direction and by the predetermined amount about the predetermined direction.

Based on the above, it is possible to set the operation indication direction in the virtual world, using the corrected amount of rotation obtained by offsetting the amount of rotation of the portable display apparatus in real space in an elevation direction or a depression direction and by a predetermined amount. For example, the amount of offset is set such that the operation indication direction calculated when the user maintains a comfortable position while holding the portable display apparatus is set to a horizontal direction in the virtual world. This enables the user to operate the portable display apparatus while being in a relatively comfortable position.

In addition, the corrected amount of rotation may be calculated by offsetting the calculated amount of rotation of the perspective direction about the predetermined direction, in a depression direction and by the predetermined amount about the predetermined direction.

Based on the above, it is possible to set the operation indication direction in the virtual world using the corrected amount of rotation obtained by offsetting in a depression direction the amount of rotation of the portable display apparatus in real space by a predetermined amount. For example, the amount of offset may be set such that the operation indication direction calculated when the user maintains the portable display apparatus while holding it in a comfortable position is set to the vertical direction in the virtual world, whereby the user can operate the portable display apparatus while being in a relatively comfortable position.

In addition, when, using as the predetermined amount an angle, between a horizontal direction in real space and the perspective direction, generated when the portable display apparatus is in a reference attitude in which a user views the first image displayed on the portable display apparatus while holding the portable display apparatus, an amount of rotation indicating the perspective direction of the portable display apparatus in the reference attitude is corrected to the corrected amount of rotation, the correction may be made so that a direction obtained by the corrected amount of rotation is a horizontal direction in the virtual world.

Based on the above, when the portable display apparatus is held in a reference attitude, a horizontal direction in the virtual world is set to the operation indication direction. This enables the user to operate the portable display apparatus while being in a relatively comfortable position when it is desired to set the operation indication direction to the horizontal direction in the virtual world.

In addition, when, using as the predetermined amount an angle, between a vertical direction in real space and the perspective direction, generated when the portable display apparatus is in a reference attitude in which a user views the first image displayed on the portable display apparatus while holding the portable display apparatus, an amount of rotation indicating the perspective direction of the portable display apparatus in the reference attitude is corrected to the corrected amount of rotation, the correction may be made so that a direction obtained by the corrected amount of rotation is a vertical direction in the virtual world.

Based on the above, when the portable display apparatus is held in a reference attitude, a vertical direction in the virtual world is set to the operation indication direction. This enables the user to operate the portable display apparatus while being in a relatively comfortable position when it is desired to set the operation indication direction to the vertical direction in the virtual world.

In addition, when the corrected amount of rotation indicates an amount of rotation beyond a vertically up direction in the virtual world, the corrected amount of rotation may be calculated so as to be limited to the vertically up direction. When the corrected amount of rotation indicates an amount of rotation beyond a vertically down direction in the virtual world, the corrected amount of rotation may be calculated so as to be limited to the vertically down direction.

Based on the above, the operation of setting an operation indication direction to a vertically up or vertically down direction in the virtual world is facilitated.

In addition, image data indicating the first image may be output to the portable display apparatus. The portable display apparatus may include an image data acquisition unit and a display unit. An image data acquisition unit acquires the image data output from the information processing apparatus. A display unit displays the first image indicated by the image data acquired by the image data acquisition unit.

Based on the above, the portable display apparatus can function as a so-called thin-client terminal, which does not perform information processing.

In addition, the information processing program may further cause the computer to execute generating compression image data by compressing the image data indicating the first image. In this case, the generated compression image data may be output to the portable display apparatus. The image data acquisition unit may acquire the compression image data output from the information processing apparatus. The portable display apparatus may further include a display image decompression unit. The display image decompression unit decompresses the compression image data to obtain the image data indicating the first image. The display unit may display the first image indicated by the image data that has been acquired by the image data acquisition unit and has been decompressed by the display image decompression unit.

Based on the above, the first image is decompressed before being output from the information processing apparatus to the portable display apparatus. This makes it possible to output the first image at a high speed, and reduce delay caused between the generation of the first image and the display of the first image on the portable display apparatus.

In addition, besides the first image, a second image representing the virtual world may be further displayed on another display apparatus connected to the information processing apparatus.

It should be noted that said another display apparatus described above is a display apparatus connected to the information processing apparatus, like a monitor 2 according to the embodiment described later. Said another display apparatus may be a component separate from the portable display apparatus, and may be any apparatus so long as it is capable of displaying the second image generated by the information processing apparatus. For example, said another display apparatus described above may be integrated with the game apparatus (in a single housing).

Based on the above, when processing based on the operation of moving and changing the attitude of the portable display apparatus is performed, it is possible to display the results of the processing not only on the portable display apparatus but also on said another display apparatus connected to the information processing apparatus. This enables the user to use, in accordance with the state of the operation or the user's preference, either one of images displayed on, for example, two apparatuses, and also view an image suitable for an operation of the user. Further, it is possible to use an image displayed on said another display apparatus connected to the information processing apparatus, as, for example, an image to be viewed by another person different from the user. This makes it possible to provide a viewing environment suitable also for the case where a plurality of people view the results of the processing.

In addition, the information processing program may further cause the computer to execute generating compression image data by compressing the image data indicating the first image. The generated compression image data may be output to the portable display apparatus, and, besides the compression image data, image data indicating the second image may be output to said another display apparatus without being compressed. The portable display apparatus may include an image data acquisition unit, a display image decompression unit, and a display unit. The image data acquisition unit acquires the compression image data output from the information processing apparatus. The display image decompression unit decompresses the compression image data to obtain the image data indicating the first image. The display unit displays the first image indicated by the image data that has been acquired by the image data acquisition unit and has been decompressed by the display image decompression unit.

Based on the above, the first image is decompressed and then output from the information processing apparatus to the portable display apparatus. This makes it possible to output the first image at a high speed, and reduce delay caused between the generation of the first image and the display of the first image on the portable display apparatus.

In addition, a point of view for generating the second image may be set at a position different from a position of a point of view for generating the first image.

Based on the above, the same virtual world, different in point of view, is displayed not only on the portable display apparatus but also on said another display apparatus, and images of the virtual world that are different in the point of view are displayed thereon. This enables the user to use, in accordance with the state of the operation or the user's preference, either one of the images displayed on the two apparatuses when operating the portable display apparatus.

In addition, a point of view for generating the second image may be set at a position in the virtual world including a point of view for generating the first image, and a range wider than a range of the virtual world represented by the first image may be displayed as the second image on said another display apparatus.

Based on the above, an image of the virtual world in a display range wider than that of an image of the virtual world displayed on the portable display apparatus is displayed on said another display apparatus connected to the information processing apparatus. This makes it possible to display on each display apparatus, for example, an image suitable for an operation of the user when the state of the virtual world is presented to the user.

In addition, a direction of a line of sight from a point of view for generating the second image may be set in a vertical direction in the virtual world, and the point of view for generating the second image may be set at a position of viewing from a bird's-eye view a point of view for generating the first image.

Based on the above, an image of the virtual world based on the attitude of the portable display apparatus is displayed on the portable display apparatus, and an image of the virtual world obtained by looking down upon it is displayed on another display apparatus connected to the information processing apparatus. This makes it possible to display on each display apparatus, for example, an image suitable for an operation of the user when the state of the virtual world is presented to the user.

In addition, the portable display apparatus may include at least one of a gyro sensor and an acceleration sensor, each of which outputs data based on the attitude and/or the motion of the portable display apparatus body. In this case, on the basis of the data output from the at least one of the gyro sensor and the acceleration sensor, the direction of rotation and the amount of rotation of the portable display apparatus may be calculated.

Based on the above, using the data that is output from the gyro sensor and indicates the angular velocity generated in the portable display apparatus and/or the data that is output from the acceleration sensor and indicates the acceleration generated in the portable display apparatus, it is possible to accurately calculate the attitude and the motion of the portable display apparatus.

In addition, the exemplary embodiment may be carried out in the forms of an information processing apparatus and an information processing system, each including units that perform the above processes, and an information processing method including the above operations.

The exemplary embodiment makes it possible to, when an image of a virtual world is displayed on a portable display apparatus that allows a user to view a screen thereof while holding it and an operation is performed on the virtual world in accordance with the attitude and the motion of the portable display apparatus, facilitate the operation based on the attitude and the motion of the portable display apparatus.

These and other objects, features, aspects and advantages of the exemplary embodiment will become more apparent from the following detailed description when taken in conjunction with the accompanying drawings.

BRIEF DESCRIPTION OF THE DRAWINGS

FIG. 4 is a diagram showing a non-limiting example of the state where a user holds the terminal apparatus 6;

FIG. 8 is a block diagram showing a non-limiting example of the electrical configuration of the board-type controller 9 of FIG. 6;

FIG. 11 is a diagram showing a non-limiting example of the attitude of the terminal apparatus 6 indicating a horizontal indication direction;

FIG. 12 is a diagram showing a non-limiting example of an operation indication direction set in the case where a terminal apparatus perspective direction is directed further in the elevation direction than in the horizontal indication direction;

FIG. 13 is a diagram showing a non-limiting example of the operation indication direction set in the case where the terminal apparatus perspective direction is directed further in the depression direction than in the horizontal indication direction;

FIG. 23 is a diagram illustrating a non-limiting example of the relationships among: a real space reference direction and the terminal apparatus perspective direction that are projected onto a horizontal plane in real space; and a virtual world reference direction and the operation indication direction that are projected onto a horizontal plane in the virtual world.

DETAILED DESCRIPTION OF NON-LIMITING EXAMPLE EMBODIMENTS

Figure 1:
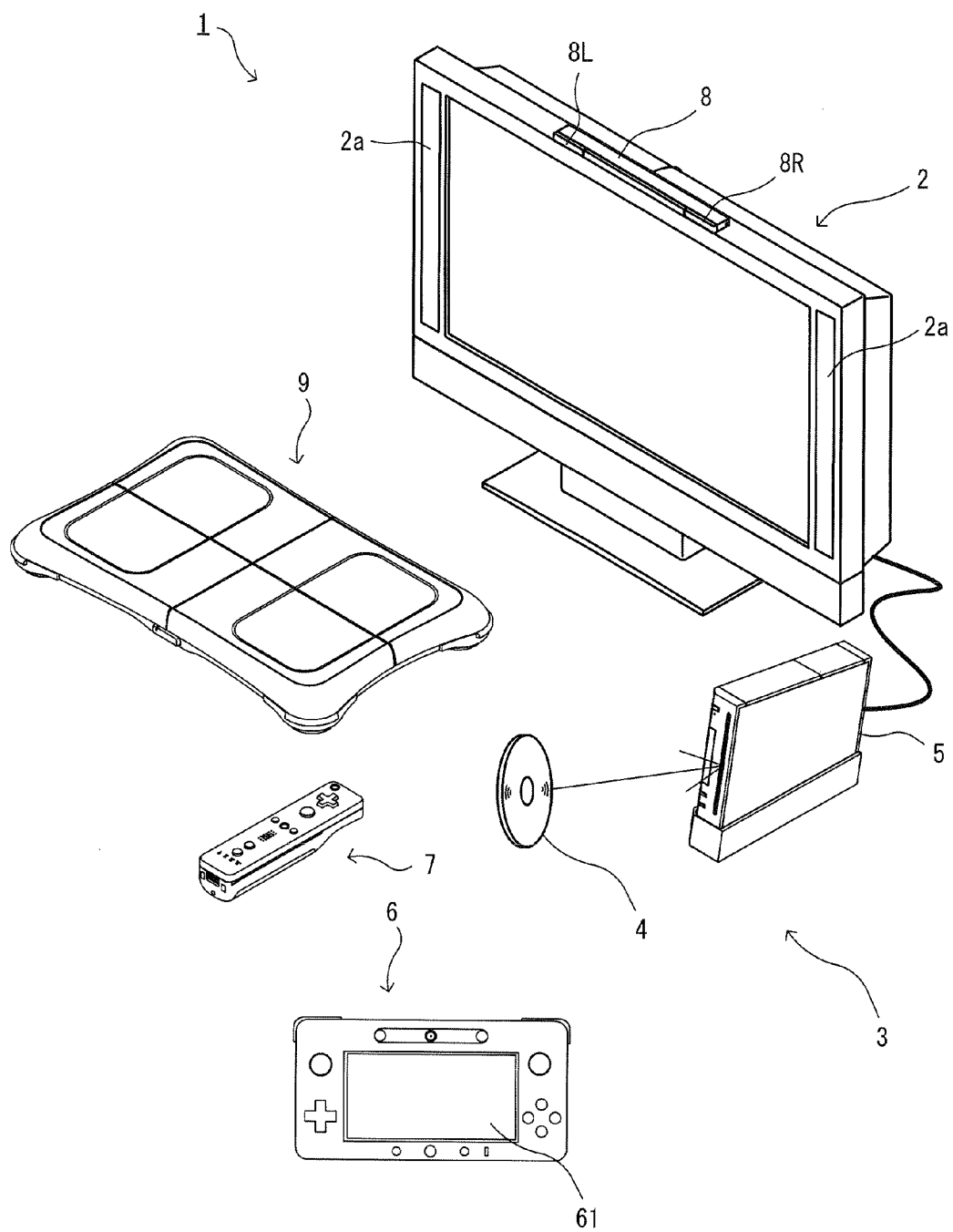
FIG. 1 is an external view showing a non-limiting example of a game system 1.
Figure 2:
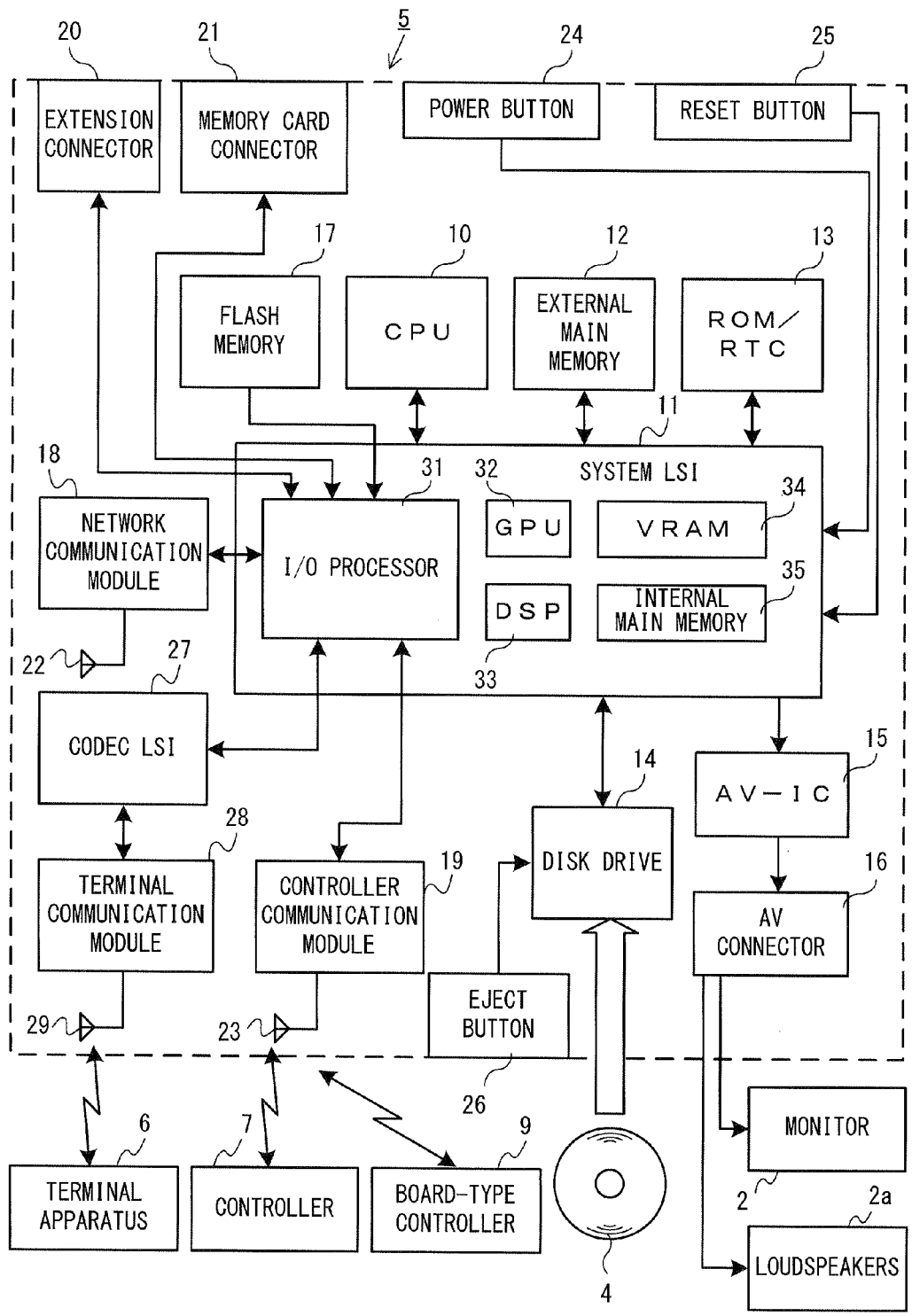
FIG. 2 is a functional block diagram showing a non-limiting example of a game apparatus body 5 of FIG. 1.

With reference to FIG. 1, an information processing apparatus for executing an information processing program according to an exemplary embodiment and an information processing system including the information processing apparatus is described. Hereinafter, in order to provide a specific description, a stationary game apparatus body 5 is used as an example of the information processing apparatus, and a game system including the game apparatus body 5 is described. FIG. 1 is an external view showing an example of the game system 1 including the stationary game apparatus body 5. FIG. 2 is a block diagram showing an example of the game apparatus body 5. Hereinafter, the game system 1 is described.

As shown in FIG. 1, the game system 1 includes a household television receiver (hereinafter referred to as a "monitor") 2 which is an example of display means, and the stationary game apparatus 3 connected to the monitor 2 via a connection cord. The monitor 2 includes loudspeakers 2a for outputting, in the form of sound, a sound signal outputted from the game apparatus 3. Further, the game apparatus 3 includes: an optical disk 4 having stored therein a program (e.g., a game program), which is an example of the information processing program according to the exemplary embodiment; the game apparatus body 5 having a computer for executing the program stored in the optical disk 4 to display a game screen on the monitor 2; a terminal apparatus 6; a controller 7 for providing the game apparatus body 5 with operation information used to operate, for example, objects displayed on the display screen; and a board-type controller 9. The game system 1 performs game processing on the game apparatus body 5 in accordance with a game operation using at least one of the terminal apparatus 6, the controller 7, and the board-type controller 9, and displays a game image obtained by the game processing on the monitor 2 and/or the terminal apparatus 6. The game apparatus body 5 is wirelessly connected to the terminal apparatus 6, the controller 7, and the board-type controller 9 so as to enable wireless communication therebetween. For example, the wireless communication is performed according to the Bluetooth (registered trademark) standard or the IEEE 802.11n standard. The wireless communication, however, may be performed in accordance with other standards such as standards for infrared communication.

The optical disk 4, typifying an information storage medium used for the game apparatus body 5 in an exchangeable manner, is detachably inserted in the game apparatus body 5. The optical disk 4 has stored therein the information processing program (typically, a game program) to be performed by the game apparatus body 5. The game apparatus body 5 has, on a front surface thereof, an insertion opening for the optical disk 4. The game apparatus body 5 reads and executes the information processing program stored in the optical disk 4 inserted into the insertion opening to perform the information processing.

The monitor 2 is connected to the game apparatus body 5 via a connection cord. The monitor 2 displays a game image obtained by the game processing performed by the game apparatus body 5. The monitor 2 includes the loudspeakers 2a. The loudspeakers 2a each output a game sound obtained as a result of the game processing. In another embodiment, the game apparatus body 5 and a stationary display apparatus may be integrated with each other. The communication between the game apparatus body 5 and the monitor 2 may be wireless communication.

The game apparatus body 5 has mounted thereto a flash memory 17 (see FIG. 2) which functions as a backup memory for fixedly storing data such as saved data. The game apparatus body 5 executes the game program or the like stored in the optical disk 4, and displays a result thereof as a game image on the monitor 2 and/or the terminal apparatus 6. The game program or the like to be executed may be stored in advance in the flash memory 17 as well as in the optical disk 4. Further, the game apparatus body 5 may reproduce a state of a game played in the past, using the saved data stored in the flash memory 17, and display an image of the game state on the monitor 2 and/or the terminal apparatus 6. A user of the game apparatus 3 can enjoy the game progress by operating at least one of the terminal apparatus 6, the controller 7, and the board-type controller 9 while viewing the game image displayed on the monitor 2 and/or the terminal apparatus 6.

The controller 7 and the board-type controller 9 each wirelessly transmit transmission data such as operation information, using, for example, the Bluetooth technology, to the game apparatus body 5 having a controller communication module 19. The controller 7 is operation means for performing, for example, selection of options displayed on the display screen of the monitor 2. The controller 7 includes a housing which is small enough to be held by one hand, and a plurality of operation buttons (including a cross key and the like) which are exposed at the surface of the housing. In addition, as is described later, the controller 7 includes an imaging information calculation section for taking an image viewed from the controller 7. As exemplary imaging targets of the imaging information calculation section, two LED modules (hereinafter referred to as "markers") 8L and 8R are provided in the vicinity of the display screen of the monitor 2 (above the screen in FIG. 1). Although details will be described later, a user (player) is allowed to perform a game operation while moving the controller 7, and the game apparatus body 5 uses a marker 8 to calculate the movement, position, attitude and the like of the controller 7. The marker 8 has two markers 8L and 8R at both ends thereof. Specifically, the marker 8L (as well as the marker 8R) includes one or more infrared LEDs (Light Emitting Diodes), and emits infrared light forward from the monitor 2. The marker 8 is connected to the game apparatus body 5, so that the game apparatus body 5 can control the infrared LEDs included in the marker 8 to be lit on or off. The marker 8 is a portable unit, so that the user is allowed to place the marker 8 in a given position. Although FIG. 1 shows a case where the marker 8 is placed on the monitor 2, the location and direction of the marker 8 may be appropriately selected. Further, the controller 7 is capable of receiving, at a communication section, transmission data wirelessly transmitted from the controller communication module 19 of the game apparatus body 5, to generate a sound or vibration based on the transmission data.

In another embodiment, the controller 7 and/or the board-type controller 9 may be wire-connected to the game apparatus body 5. Further, in the exemplary embodiment, the game system 1 includes a controller 7 and a board-type controller 9. The game apparatus body 5, however, is capable of communicating with a plurality of controllers 7 and a plurality of board-type controllers 9. Therefore, a plurality of players can play a game using a predetermined number of controllers 7 and board-type controller 9 simultaneously.

The controller 7 includes a housing which is formed by, for example, plastic molding, and has a plurality of operation sections (operation buttons) in the housing 71. Then, the controller 7 transmits, to the game apparatus body 5, operation data indicating the states of inputs provided to the operation sections (indicating whether or not each operation button has been pressed).

In addition, the controller 7 has the imaging information calculation section that analyzes image data of an image captured by capturing means and determines an area having a high brightness, and thereby calculates the position of the center of gravity, the size, and the like of the area. For example, the imaging information calculation section has capturing means fixed in the housing of the controller 7, and uses as an imaging target a marker that outputs infrared light, such as a marker section 65 of the terminal apparatus 6 and/or the marker 8. The imaging information calculation section calculates the position of the imaging target in a captured image captured by the capturing means, and transmits, to the game apparatus body 5, marker coordinate data indicating the calculated position. The marker coordinate data varies depending on the direction (the angle of tilt) or the position of the controller 7, and therefore, the game apparatus body 5 can calculate the direction and the position of the controller 7 using the marker coordinate data.

In addition, the controller 7 includes therein an acceleration sensor and/or a gyro sensor. The acceleration sensor detects the acceleration generated in the controller 7 (including the gravitational acceleration), and transmits, to the game apparatus body 5, data indicating the detected acceleration. The acceleration detected by the acceleration sensor varies depending on the direction (the angle of tilt) or the movement of the controller 7, and therefore, the game apparatus body 5 can calculate the direction and the movement of the controller 7 using the acquired acceleration data. The gyro sensor detects the angular velocities generated about three axes set in the controller 7, and transmits, to the game apparatus body 5, angular velocity data indicating the detected angular velocities. The acceleration detected by the gyro sensor varies depending on the direction (the angle of tilt) or the movement of the controller 7, and therefore, the game apparatus body 5 can calculate the direction and the movement of the controller 7 using the acquired acceleration data. As described above, the user is allowed to perform a game operation by pressing any of the operation sections 72 provided on the controller 7, and moving the controller 7 so as to change the position and the attitude (tilt) thereof.

The controller 7 has a loudspeaker and a vibrator. The controller 7 processes sound data transmitted from the game apparatus body 5, and outputs sound corresponding to the sound data from the loudspeaker. Further, the controller 7 processes vibration data transmitted from the game apparatus body 5, and generates vibration by actuating the vibrator in accordance with the vibration data. It should be noted that in the exemplary embodiment described later, it is possible to play a game without using the controller 7. A detailed configuration of the board-type controller 9 will be described later.

The terminal apparatus 6 is a portable apparatus that is small enough to be held by the user, and the user is allowed to move the terminal apparatus 6 with hands, or place the terminal apparatus 6 at any location. Although a detailed configuration of the terminal apparatus 6 will be described later, the terminal apparatus 6 includes an LCD (Liquid Crystal Display) 61 as display means, and input means (a touch panel 62, a gyro sensor 604, and the like described later). The terminal apparatus 6 and the game apparatus body 5 (a terminal communication module 28 (see FIG. 2)) are capable of communicating with each other wirelessly or wired. The terminal apparatus 6 receives, from the game apparatus body 5, data of an image (e.g., a game image) generated in the game apparatus body 5, and displays the image represented by the data on an LCD 61. Although the LCD 61 is used as a display apparatus in the exemplary embodiment, the terminal apparatus 6 may include a given other display apparatus, such as a display apparatus utilizing EL (Electro Luminescence), for example. Further, the terminal apparatus 6 transmits, to the game apparatus body 5 having the terminal communication module 28, operation data representing the content of an operation performed on the terminal apparatus 6.

Next, with reference to FIG. 2, the internal configuration of the game apparatus body 5 is described. FIG. 2 is a block diagram showing an example of the internal configuration of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disk drive 14, an AV-IC (Audio Video-Integrated Circuit) 15 and the like.

The CPU 10, serving as a game processor, executes a program stored in the optical disk 4 to perform a process. The CPU 10 is connected to the system LSI 11. In addition to the CPU 10, the external main memory 12, the ROM/RTC 13, the disk drive 14, and the AV-IC 15 are connected to the system LSI 11. The system LSI 11 performs processes such as control of data transmission between the respective components connected thereto, generation of an image to be displayed, and acquisition of data from an external apparatus. The internal configuration of the system LSI 11 will be described later. The external main memory 12, which is a volatile memory, stores programs loaded from the optical disk 4 or the flash memory 17, and stores various data. The external main memory 12 is used as a work area and a buffer area for the CPU 10. The ROM/RTC 13 includes a ROM (so-called boot ROM) incorporating a program for booting the game apparatus body 5, and a clock circuit (RTC) for counting time. The disk drive 14 reads, from the optical disk 4, program data, texture data and the like, and writes the read data into an internal main memory 35 described below or the external main memory 12.

The system LSI 11 includes an input/output processor (I/O processor) 31, a GPU (Graphics Processor Unit) 32, a DSP (Digital Signal Processor) 33, a VRAM (Video RAM)

34, and the internal main memory 35. These components 31 to 35 are connected to each other via an internal bus (not shown).

The GPU 32, which is a part of rendering means, generates an image in accordance with a graphics command (draw command) supplied from the CPU 10. The VRAM 34 stores data (such as polygon data and texture data) used by the GPU 32 to execute the graphics command. When an image is generated, the GPU 32 generates image data using the data stored in the VRAM 3. In the exemplary embodiment, the game apparatus body 5 may generate both a game image to be displayed on the monitor 2 and a game image to be displayed on the terminal apparatus 6. Hereinafter, the game image to be displayed on the monitor 2 may be referred to as a "monitor game image", and the game image to be displayed on the terminal apparatus 6 may be referred to as a "terminal game image".

The DSP 33, serving as an audio processor, generates sound data using sound data and sound waveform (tone quality) data stored in the internal main memory 35 and the external main memory 12. In the exemplary embodiment, similarly to the game images, both a game sound to be output from the loudspeakers 2a of the monitor 2 and a game sound to be output from the loudspeakers of the terminal apparatus 6 may be generated. Hereinafter, the game sound to be output from the monitor 2 may be referred to as a "monitor game sound", and the game sound to be output from the terminal apparatus 6 may be referred to as a "terminal game sound".

Among the image data and sound data generated by the game apparatus body 5, the image data and sound data to be output to the monitor 2 are read by the AV-IC 15. The AV-IC 15 outputs the read image data to the monitor 2 via an AV connector 16, and outputs the read sound data to the loudspeakers 2a included in the monitor 2. Thereby, an image is displayed on the monitor 2, and a sound is output from the loudspeakers 2a.

Further, among the image data and sound data generated by the game apparatus body 5, the image data and sound data to be output to the terminal apparatus 6 are transmitted to the terminal apparatus 6 by the I/O processor 31 or the like. Data transmission to the terminal apparatus 6 by the I/O processor 31 or the like will be described later.

The I/O processor 31 performs data reception and transmission with the components connected thereto, and download of data from an external apparatus. The I/O processor 31 is connected to the flash memory 17, the network communication module 18, the controller communication module 19, an extension connector 20, a memory card connector 21, and a codec LSI 27. An antenna 23 is connected to the controller communication module 19. The codec LSI 27 is connected to the terminal communication module 28, and an antenna 29 is connected to the terminal communication module 28.

The game apparatus body 5 is connected to a network such as the Internet so as to communicate with external information processing apparatuses (for example, other game apparatuses or various servers). That is, the I/O processor 31 is connected to a network via the network communication module 18 and the antenna 22 so as to communicate with external information processing apparatuses connected to the network. The I/O processor 31 accesses the flash memory 17 at regular intervals so as to detect for data to be transmitted to the network. When data to be transmitted is detected, the data is transmitted to the network via the network communication module 18 and the antenna 22. Further, the I/O processor 31 receives, via the network, the antenna 22 and the network communication module 18, data transmitted from the external information processing apparatuses or data downloaded from a download server, and stores the received data in the flash memory 17. The CPU 10 executes a program, and reads the data stored in the flash memory 17 to use the data for execution of the program. The flash memory 17 may store not only the data transmitted and received between the game apparatus body 5 and the external information processing apparatuses, but also saved data (result data or progress data of the process) of the game played with the game apparatus body 5. Further, the flash memory 17 may store programs such as a game program.

The game apparatus body 5 can receive operation data from the controller 7 and/or the board-type controller 9. That is, the I/O processor 31 receives, via the antenna 23 and the controller communication module 19, operation data or the like transmitted from the controller 7 and/or the board-type controller 9, and stores (temporarily) the data in a buffer region of the internal main memory 35 or the external main memory 12. Similarly to the external main memory 12, the internal main memory 35 may store a program loaded from the optical disk 4 or a program loaded from the flash memory 17, and various data. The internal main memory 35 may be used as a work region or buffer region of the CPU 10.

The game apparatus body 5 is capable of transmitting/receiving image data, sound data and the like to/from the terminal apparatus 6. When transmitting a game image (terminal game image) to the terminal apparatus 6, the I/O processor 31 outputs data of a game image generated by the GPU 32 to the codec LSI 27. The codec LSI 27 performs a predetermined compression process on the image data supplied from the I/O processor 31. The terminal communication module 28 performs wireless communication with the terminal apparatus 6. Accordingly, the image data compressed by the codec LSI 27 is transmitted by the terminal communication module 28 to the terminal apparatus 6 via the antenna 29. In the exemplary embodiment, the codec LSI 27 compresses the image data using a highly efficient compression technique, for example, the H.264 standard. The codec LSI 27 may adopt other compression techniques. When the communication rate is sufficiently high, uncompressed image data may be transmitted. The terminal communication module 28 is, for example, a Wi-Fi certified communication module. The terminal communication module 28 may perform wireless communication with the terminal apparatus 6 at a high speed using, for example, the technique of MIMO (Multiple Input Multiple Output) adopted in the IEEE 802.11n standard, or may use other communication techniques.

The game apparatus body 5 transmits, to the terminal apparatus 6, sound data as well as the image data. That is, the I/O processor 31 outputs sound data generated by the DSP 33 to the terminal communication module 28 via the codec LSI 27. The codec LSI 27 performs a compression process on the sound data in a similar manner to that for the image data. Any compression technique may be adopted for the sound data. In another embodiment, uncompressed sound data may be transmitted. The terminal communication module 28 transmits the compressed image data and sound data to the terminal apparatus 6 via the antenna 29.

The game apparatus body 5 transmits, in addition to the image data and sound data, various control data to the terminal apparatus 6, where necessary. The control data represent control instructions for the components included in the terminal apparatus 6, such as an instruction to control on/off of a marker section (a marker section 65 shown in FIG. 5), and an instruction to control image taking of a camera (a camera 66 shown in FIG. 10). The I/O processor 31 transmits the control data to the terminal apparatus 6 in response to an instruction from the CPU 5. In the exemplary embodiment, the codec LSI 27 does not perform a data compression process on the control data. Alternatively, in another embodiment, the codec LSI 27 may perform a compression process on the control data. The above data transmitted from the game apparatus body 5 to the terminal apparatus 6 may be encrypted where necessary, or may not be encrypted.

The game apparatus body 5 can receive various data from the terminal apparatus 6. Although details will be described later, in the exemplary embodiment, the terminal apparatus 6 transmits operation data, image data, and sound data. The respective data transmitted from the terminal apparatus 6 are received by the terminal communication module 28 via the antenna 29. The image data and sound data transmitted from the terminal apparatus 6 have been subjected to a similar compression process to that for the image data and sound data transmitted from the game apparatus body 5 to the terminal apparatus 6. Accordingly, these image data and sound data are transmitted from the terminal communication module 28 to the codec LSI 27, and subjected to a decompression process by the codec LSI 27. The decompressed data are output to the I/O processor 31. On the other hand, the operation data transmitted from the terminal apparatus 6 is smaller in amount than the image data and sound data, and therefore, the operation data does not need to be compressed. The operation data may be encrypted where necessary, or may not be encrypted. Accordingly, the operation data, which has been received by the terminal communication module 28, is output to the I/O processor 31 via the codec LSI 27. The I/O processor 31 stores (temporarily) the data received from the terminal apparatus 6 in the buffer region of the internal main memory 35 or the external main memory 12.

The game apparatus body 5 is connectable to other devices and external storage media. That is, an extension connector 20 and a memory card connector 21 are connected to the I/O processor 31. The expansion connector 20 is an interface connector as typified by a USB and an SCSI, and is capable of performing communication with the network, instead of the network communication module 18, by connecting thereto a medium such as an external storage medium, a peripheral device such as another controller, or a wired communication connector. The memory card connector 21 is a connector for connecting thereto an external storage medium such as a memory card. For example, the I/O processor 31 accesses the external storage medium via the expansion connector 20 or the memory card connector 21 to save or read data.

The game apparatus body 5 includes (on the front main surface thereof, for example) a power button 24, a reset button 25, an insertion slot in which the optical disk 4 is inserted, an eject button 26 for ejecting the optical disk 4 from the insertion slot of the game apparatus body 5, and the like. The power button 24 and the reset button 25 are connected to the system LSI 11. When the power button 24 is turned on, the respective components of the game apparatus body 5 are supplied with power. When the reset button 25 is pressed, the system LSI 11 re-executes the boot program of the game apparatus body 5. The eject button 26 is connected to the disk drive 14. When the eject button 26 is pressed, the optical disk 4 is ejected from the disk drive 14.

In another embodiment, some of the components of the game apparatus body 5 may be constituted as an extension device separated from the game apparatus body 5. At this time, the extension device may be connected to the game apparatus body 5 via the extension connector 20. Specifically, the extension device may include, for example, the codec LSI 27, the terminal communication module 28, and the antenna 29, and may be detachably connected to the extension connector 20. Thus, by connecting the extension device to the game apparatus body which does not have the above components, the game apparatus body can be made capable of communicating with the terminal apparatus 6.

Figure 3:
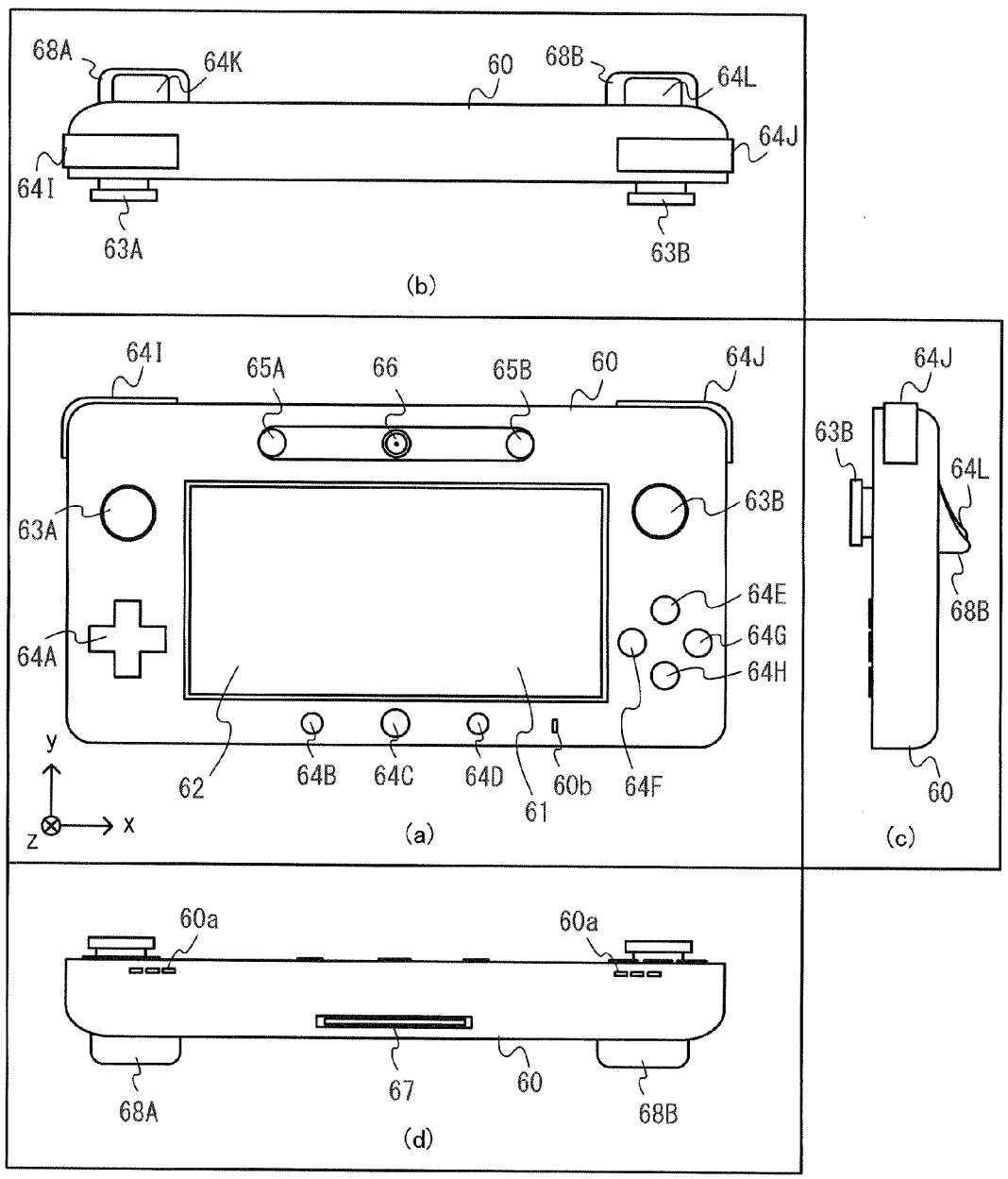
FIG. 3 is a diagram showing a non-limiting example of the external configuration of a terminal apparatus 6 of FIG. 1.
Figure 5:
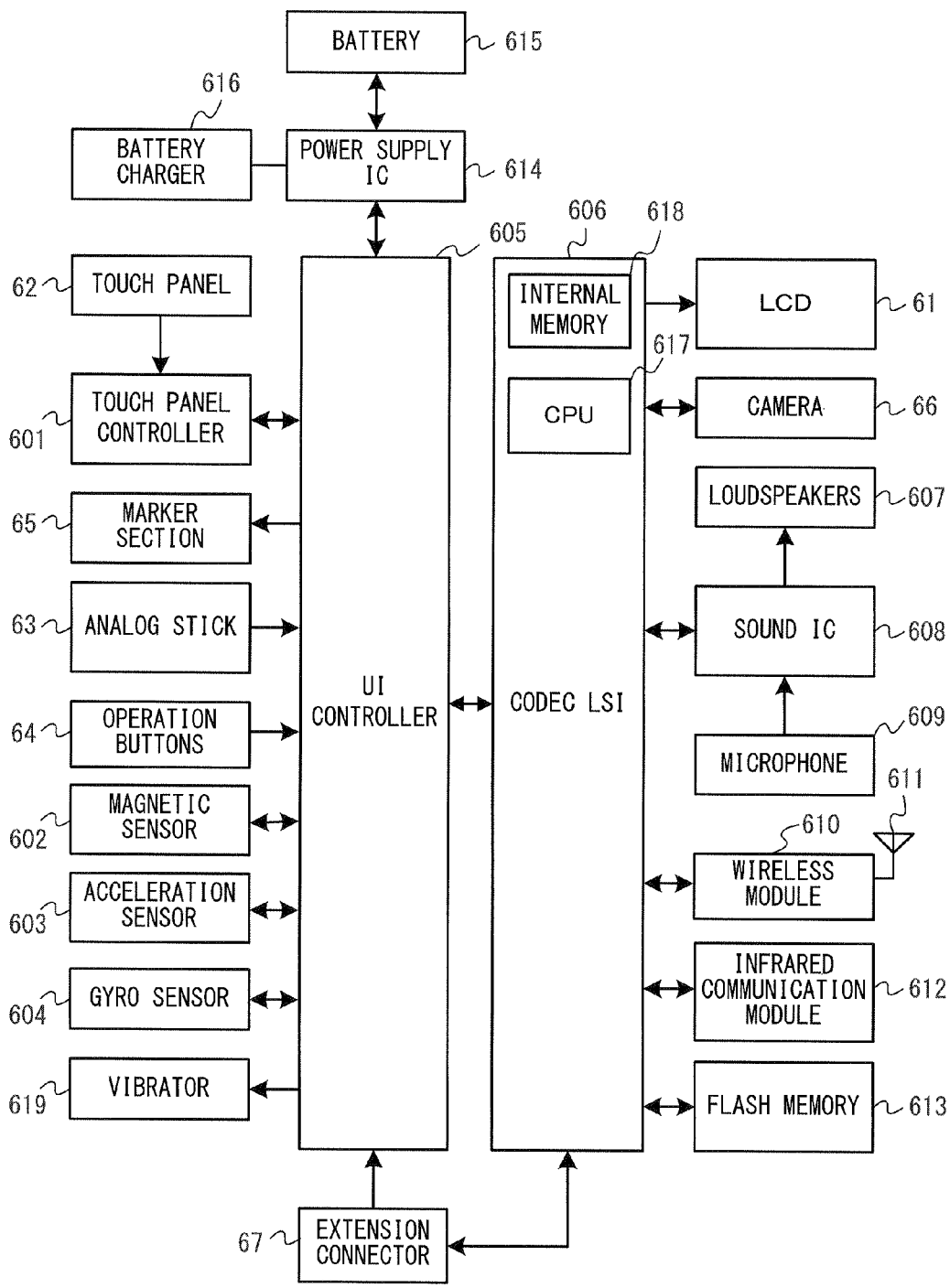
FIG. 5 is a block diagram showing a non-limiting example of the internal configuration of the terminal apparatus 6 of FIG. 3.

Next, with reference to FIGS. 3 through 5, the configuration of the terminal apparatus 6 is described. FIG. 3 is a diagram showing an example of the external configuration of the terminal apparatus 6. More specifically, (a) of FIG. 3 is a front view of the terminal apparatus 6, (b) of FIG. 3 is a top view, (c) of FIG. 3 is a right side view, and (d) of FIG. 3 is a bottom view. FIG. 4 shows an example of the state where a user holds the terminal apparatus 6 with both hands.

As shown in FIG. 3, the terminal apparatus 6 includes a housing 60 which generally has a horizontally long plate-like rectangular shape. The housing 60 is small enough to be held by the user. Therefore, the user is allowed to move the terminal apparatus 6 with hands, and change the location of the terminal apparatus 6.

The terminal apparatus 6 includes an LCD 61 on a front surface of the housing 60. The LCD 61 is provided near the center of the front surface of the housing 60. Therefore, as shown in FIG. 4, the user, holding the housing 60 at portions to the left and right of the LCD 61, is allowed to move the terminal apparatus 6 while viewing a screen of the LCD 61. FIG. 4 shows an example where the user holds the terminal apparatus 6 horizontally (i.e., with the long side of the terminal apparatus 6 oriented horizontally) by holding the housing 60 at portions to the left and right of the LCD 61. The user, however, may hold the terminal apparatus 6 vertically (i.e., with the long side of the terminal apparatus 6 oriented vertically).

As shown in (a) of FIG. 3, the terminal apparatus 6 includes, as operation means, a touch panel 62 on the screen of the LCD 61. In the exemplary embodiment, the touch panel 62 is, but is not limited to, a resistive film type touch panel. However, a touch panel of a given type, such as electrostatic capacitance type, may be used. The touch panel 62 may be of single touch type or multiple touch type. In the exemplary embodiment, the touch panel 62 has the same resolution (detection accuracy) as that of the LCD 61. The resolution of the touch panel 62 and the resolution of the LCD 61, however, do not need to be the same. Although an input to the touch panel 62 is usually performed using a touch pen, in addition to the touch pen, a finger of the user may be used to perform an input to the touch panel 62. The housing 60 may have an opening for accommodating the touch pen used to perform an operation to the touch panel 62. The terminal apparatus 6 has the touch panel 62, and therefore, the user is allowed to operate the touch panel 62 while moving the terminal apparatus 6. That is, the user is allowed to directly (using the touch panel 62) perform an input to the screen of the LCD 61 while moving the LCD 61.

As shown in FIG. 3, the terminal apparatus 6 has, as operation means, two analog sticks 63A and 63B, and a plurality of operation buttons 64A through 64L. The analog sticks 63A and 63B are each a device for designating a direction. The analog sticks 63A and 63B are each configured such that a stick part thereof to be operated by a finger of the user is slidable or tiltable in a given direction (at a given angle in a given direction such as the upward, the downward, the leftward, the rightward, or the diagonal direction) with respect to the front surface of the housing 60. The left analog stick 63A is provided to the left of the screen of the LCD 61, and the right analog stick 63B is provided to the right of the screen of the LCD 61. Therefore, the user is allowed to perform an input for designating a direction using the analog stick 63A or 63B with either the left or right hand. Further, as shown in FIG. 4, the analog sticks 63A and 63B are positioned so as to be operated by the user holding the left and right portions of the terminal apparatus 6. Therefore, the user is allowed to easily operate the analog sticks 63A and 63B when the user holds and moves the terminal apparatus 6.

The operation buttons 64A through 64L are each operation means for performing a predetermined input. As described below, the operation buttons 64A through 64L are positioned so as to be operated by the user holding the left and right portions of the terminal apparatus 6 (see FIG. 4). Accordingly, the user is allowed to easily operate the operation means when the user holds and moves the terminal apparatus 6.

As shown in (a) of FIG. 3, among the operation buttons 64A through 64L, the cross button (direction input button) 64A and the operation buttons 64B through 64H are provided on the front surface of the housing 60. The operation buttons 64A through 64H are positioned so as to be operated by a thumb of the user (see FIG. 4).

The cross button 64A is provided to the left of the LCD 61 and beneath the left analog stick 63A. That is, the cross button 64A is positioned so as to be operated by the left hand of the user. The cross button 64A is cross-shaped, and is capable of indicating an upward, a downward, a leftward, or a rightward direction. The operation buttons 64B through 64D are provided beneath the LCD 61. The three operation buttons 64B through 64D are positioned so as to be operated by the right and left hands of the user. The four operation buttons 64E through 64H are provided to the right of the LCD 61 and beneath the right analog stick 63B. That is, the four operation buttons 64E through 64H are positioned so as to be operated by the right hand of the user. Further, the four operation buttons 64E through 64H are positioned upward, downward, leftward, and rightward, respectively, with respect to a center position of the four operation buttons. Accordingly, the terminal apparatus 6 may cause the four operation buttons 64E through 64H to function as buttons which allow the user to designate an upward, a downward, a leftward, or a rightward direction.

As shown in (a), (b), and (c) of FIG. 3, a first L button 64I and a first R button 64J are provided on diagonal upper portions (an upper left portion and an upper right portion) of the housing 60. Specifically, the first L button 64I is provided on the left end of the upper side surface of the plate-shaped housing 60 so as to protrude from the upper and left side surfaces. The first R button 64J is provided on the right end of the upper side surface of the housing 60 so as to protrude from the upper and right side surfaces. In this way, the first L button 64I is positioned so as to be operated by the index finger of the left hand of the user, and the first R button 64J is positioned so as to be operated by the index finger of the right hand of the user (see FIG. 4).

As shown in (b) and (c) of FIG. 3, leg parts 68A and 68B are provided so as to protrude from a rear surface (i.e., a surface reverse of the front surface on which the LCD 61 is provided) of the plate-shaped housing 60, and a second L button 64K and a second R button 64L are provided so as to protrude from the leg parts 68A and 68B, respectively. Specifically, the second L button 64K is provided at a slightly upper position on the left side (the left side as viewed from the front surface side) of the rear surface of the housing 60, and the second R button 64L is provided at a slightly upper position on the right side (the right side as viewed from the front-surface side) of the rear surface of the housing 60. In other words, the second L button 64K is provided at a position substantially opposite to the left analog stick 63A provided on the front surface, and the second R button 64L is provided at a position substantially opposite to the right analog stick 63B provided on the front surface. The second L button 64K is positioned so as to be operated by the middle finger of the left hand of the user, and the second R button 64L is positioned so as to be operated by the middle finger of the right hand of the user (see FIG. 4). Further, as shown in (c) of FIG. 3, the leg parts 68A and 68B each have a surface facing obliquely upward, and the second L button 64K and the second R button 64L are provided on the oblique surfaces of the leg parts 68A and 68B, respectively. Thus, the second L button 64K and the second R button 64L have button surfaces facing obliquely upward. It is supposed that the middle finger of the user moves vertically when the user holds the terminal apparatus 6, and therefore, the upward facing button surfaces allow the user to easily press the second L button 64K and the second R button 64L. Further, the leg parts 68A and 68B provided on the rear surface of the housing 60 allow the user to easily hold the housing 60. Moreover, the operation buttons provided on the leg parts 68A and 68B allow the user to easily perform operation while holding the housing 60.

In the terminal apparatus 6 shown in FIG. 3, the second L button 64K and the second R button 64L are provided on the rear surface of the housing 60. Therefore, if the terminal apparatus 6 is placed with the screen of the LCD 61 (the front surface of the housing 60) facing upward, the screen of the LCD 61 may not be perfectly horizontal. Accordingly, in another embodiment, three or more leg parts may be provided on the rear surface of the housing 60. In this case, if the terminal apparatus 6 is placed on a floor with the screen of the LCD 61 facing upward, the three or more leg parts contact the floor. Thus, the terminal apparatus 6 can be placed with the screen of the LCD 61 being horizontal. Such a horizontal placement of the terminal apparatus 6 may be achieved by providing detachable leg parts on the rear surface of the housing 60.

The respective operation buttons 64A through 64L are assigned functions, where necessary, in accordance with a game program. For example, the cross button 64A may be used for direction designation operation, selection operation, and the like, and the operation buttons 64E through 64H may be used for determination operation, cancellation operation, and the like.

The terminal apparatus 6 includes a power button (not shown) for turning on/off the power of the terminal apparatus 6. The terminal apparatus 6 may include an operation button for turning on/off screen display of the LCD 61, an operation button for performing connection setting (pairing) with the game apparatus body 5, and an operation button for adjusting the volume of loudspeakers (loudspeakers 607 shown in FIG. 5).

As shown in (a) of FIG. 3, the terminal apparatus 6 includes a marker section (a marker section 65 shown in FIG. 5) including a marker 65A and a marker 65B, on the front surface of the housing 60. For example, the marker section 65 is provided above the LCD 61. The markers 65A and 65B are each constituted by one or more infrared LEDs, like the markers 8L and 8R of the marker 8. The marker section 65 is used, like the marker 8, for causing the game apparatus body 5 to calculate a movement or the like of the controller 7 with respect to the marker section 65. The game apparatus body 5 is capable of controlling the infrared LEDs of the marker section 65 to be on or off.

The terminal apparatus 6 includes a camera 66 as imaging means. The camera 66 includes an image pickup element (e.g., a CCD image sensor or a CMOS image sensor) having a predetermined resolution, and a lens. For example, the camera 66 is provided on the front surface of the housing 60. Accordingly, the camera 66 is capable of taking an image of the face of the user holding the terminal apparatus 6. For example, the camera 66 is capable of taking an image of the user playing a game while viewing the LCD 61.

The terminal apparatus 6 has a microphone (a microphone 609 shown in FIG. 5) as sound input means. A microphone hole 60b is provided in the front surface of the housing 60. The microphone 609 is embedded in the housing 60 at a position inside the microphone hole 60b. The microphone 609 detects for a sound, such as user's voice, around the terminal apparatus 6.

The terminal apparatus 6 has loudspeakers (loudspeakers 607 shown in FIG. 5) as sound output means. As shown in (d) of FIG. 3, speaker holes 60a are provided in the lower side surface of the housing 60. A sound is output through the speaker holes 60a from the loudspeakers 607. In the exemplary embodiment, the terminal apparatus 6 has two loudspeakers, and the speaker holes 60a are provided at positions corresponding to a left loudspeaker and a right loudspeaker.

The terminal apparatus 6 includes an extension connector 67 for connecting another device to the terminal apparatus 6. In the exemplary embodiment, as shown in (d) of FIG. 3, the extension connector 67 is provided in the lower side surface of the housing 60. Any device may be connected to the extension connection 67. For example, a controller (a gun-shaped controller or the like) used for a specific game or an input device such as a keyboard may be connected to the extension connector 67. If another device does not need to be connected, the extension connector 67 does not need to be provided.

In the terminal apparatus 6 shown in FIG. 3, the shapes of the operation buttons and the housing 60, the number of the respective components, and the positions in which the components are provided are merely examples. The shapes, numbers, and positions may be different from those described above.

Next, with reference to FIG. 5, the internal configuration of the terminal apparatus 6 is described. FIG. 5 is a block diagram showing an example of the internal configuration of the terminal apparatus 6. As shown in FIG. 5, the terminal apparatus 6 includes, in addition to the components shown in FIG. 3, a touch panel controller 601, a magnetic sensor 602, a gyro sensor 604, a user interface controller (UI controller) 605, a codec LSI 606, loudspeakers 607, a sound IC 608, a microphone 609, a wireless module 610, an antenna 611, an infrared communication module 612, a flash memory 613, a power supply IC 614, a battery 615, and a vibrator 619. These electronic components are mounted on an electronic circuit board and accommodated in the housing 60.

The UI controller 605 is a circuit for controlling data input to various input/output sections and data output from various input/output sections. The UI controller 605 is connected to the touch panel controller 601, the analog stick 63 (the analog sticks 63A and 63B), the operation button 64 (the operation buttons 64A through 64L), the marker section 65, the magnetic sensor 602, the acceleration sensor 603, the gyro sensor 604, and the vibrator 619. Further, the UI controller 605 is connected to the codec LSI 606 and the extension connector 67. The power supply IC 614 is connected to the UI controller 605, so that power is supplied to the respective components through the UI controller 605. The internal battery 615 is connected to the power supply IC 614, so that power is supplied from the battery 615. Further, a battery charger 616 or a cable, which is supplied with power from an external power supply, may be connected to the power supply IC 614 via a connector or the like. In this case, the terminal apparatus 6 can be supplied with power and charged from the external power supply using the battery charger 616 or the cable. Charging of the terminal apparatus 6 may be performed by setting the terminal apparatus 6 on a cradle (not shown) having a charging function.

The touch panel controller 601 is a circuit which is connected to the touch panel 62 and controls the touch panel 62. The touch panel controller 601 generates a predetermined form of touch position data, on the basis of a signal from the touch panel 62, and outputs the touch position data to the UI controller 605. The touch position data represents coordinates of a position at which an input is performed on an input surface of the touch panel 62. The touch panel controller 601 reads a signal from the touch panel 62 and generates touch position data every predetermined period of time. Further, various control instructions on the touch panel 62 are output from the UI controller 605 to the touch panel controller 601.

The analog stick 63 outputs, to the UI controller 605, stick data representing a direction in which the stick part operated by a finger of the user slides (or tilts), and the amount of the sliding (tilting). The operation button 64 outputs, to the UI controller 605, operation button data representing an input state of each of the operation buttons 64A through 64L (whether or not the operation button is pressed).

The magnetic sensor 602 detects the magnitude and direction of a magnetic field to detect an orientation. Orientation data representing the detected orientation is output to the UI controller 605. The UI controller 605 outputs, to the magnetic sensor 602, a control instruction for the magnetic sensor 602. Examples of the magnetic sensor 602 include: an MI (Magnetic Impedance) sensor, a fluxgate sensor, a hall sensor, a GMR (Giant Magneto Resistance) sensor, a TMR (Tunneling Magneto Resistance) sensor, and an AMR (Anisotropic Magneto Resistance) sensor. Any sensor, however, may be adopted as long as the sensor can detect an orientation. Strictly speaking, the obtained orientation data does not represent an orientation in a place where a magnetic field is generated in addition to the geomagnetism. Even in such a case, it is possible to calculate a change in the attitude of the terminal apparatus 6 because the orientation data changes when the terminal apparatus 6 moves.

The acceleration sensor 603 is provided inside the housing 60. The acceleration sensor 603 detects the magnitudes of linear accelerations along three axial directions (the x-axis, y-axis, and z-axis directions shown in (a) of FIG. 3). Specifically, in the acceleration sensor 603, the long side direction of the housing 60 is defined as the x-axis direction (in the state where the marker section 65 is placed above the LCD 61, the right direction along the long side direction when facing the display screen of the LCD 61 is defined as an x-axis positive direction), the short side direction of the housing 60 is defined as the y-axis direction (in the state where the marker section 65 is placed above the LCD 61, the up direction along the short side direction when facing the display screen of the LCD 61 is a y-axis positive direction), and the direction orthogonal to the front surface of the housing 60 is defined as the z-axis direction (the perspective direction of the display screen of the LCD 61 is defined as a z-axis positive direction), thereby detecting the magnitudes of the linear accelerations in the respective axis directions. Acceleration data representing the detected accelerations is output to the UI controller 605. The UI controller 605 outputs, to the acceleration sensor 603, a control instruction for the acceleration sensor 603. In the exemplary embodiment, the acceleration sensor 603 is, for example, an electrostatic capacitance type MEMS acceleration sensor. In another embodiment, however, another type of acceleration sensor may be used. Further, the acceleration sensor 603 may be an acceleration sensor for detecting the magnitude of acceleration in one axial direction or two axial directions.

The gyro sensor 604 is provided inside the housing 60. The gyro sensor 604 detects the angular velocities about the three axes (the x, y, and z axes described above). Angular velocity data representing the detected angular velocities is output to the UI controller 605. The UI controller 605 outputs, to the gyro sensor 604, a control instruction for the gyro sensor 604. Any number and any combination of gyro sensors may be used as long as the angular velocities about three axes are detected. The gyro sensor 604 may be constituted by a two-axis gyro sensor and a one-axis gyro sensor. Alternatively, the gyro sensor 604 may be a gyro sensor for detecting the angular velocity about one axis or two axes.

The vibrator 619 is, for example, a vibration motor or a solenoid. The vibrator 619 is connected to the UI controller 605. The terminal apparatus 6 is vibrated by actuating the vibrator 619 in accordance with a control instruction outputted from the UI controller 605 to the vibrator 619. The vibration of the terminal apparatus 6 is transmitted to the user's hand holding the terminal apparatus 6. Thus, a so-called vibration-feedback game is achieved.

The UI controller 605 outputs, to the codec LSI 606, the operation data including the touch position data, the stick data, the operation button data, the orientation data, the acceleration data, and the angular velocity data, which have been received from the respective components. If another device is connected to the terminal apparatus 6 through the extension connector 67, data representing operation to said another device may be included in the operation data.

The codec LSI 606 is a circuit for performing a compression process on data to be transmitted to the game apparatus body 5, and a decompression process on data transmitted from the game apparatus body 5. The LCD 61, the camera 66, the sound IC 608, the wireless module 610, the flash memory 613, and the infrared communication module 612 are connected to the codec LSI 606. The codec LSI 606 includes a CPU 617 and an internal memory 618. Although the terminal apparatus 6 is configured not to perform game processing, the terminal apparatus 6 may execute a program for managing the terminal apparatus 6 or a program for communication. For example, a program stored in the flash memory 613 is loaded into the internal memory 618 and executed by the CPU 617 when the terminal apparatus 6 is powered on, thereby starting up the terminal apparatus 6. A part of the area of the internal memory 618 is used as a VRAM for the LCD 61.

The camera 66 takes an image in accordance with an instruction from the game apparatus body 5, and outputs data of the taken image to the codec LSI 606. The codec LSI 606 outputs, to the camera 66, a control instruction for the camera 66, such as an instruction to take an image. The camera 66 is also capable of taking a moving picture. That is, the camera 66 is capable of repeatedly performing image taking, and repeatedly outputting image data to the codec LSI 606.

The sound IC 608 is connected to the loudspeakers 607 and the microphone 609. The sound IC 608 is a circuit for controlling input of sound data from the microphone 609 to the codec LSI 606 and output of sound data from the codec LSI 606 to the loudspeakers 607. Specifically, when the sound IC 608 receives sound data from the codec LSI 606, the sound IC 608 performs D/A conversion on the sound data, and outputs a resultant sound signal to the loudspeakers 607 to cause the loudspeakers 607 to output a sound. The microphone 609 detects sound (such as user's voice) propagated to the terminal apparatus 6, and outputs a sound signal representing the sound to the sound IC 608. The sound IC 608 performs A/D conversion on the sound signal from the microphone 609, and outputs a predetermined form of sound data to the codec LSI 606.

The codec LSI 606 transmits the image data from the camera 66, the sound data from the microphone 609, and the operation data from the UI controller 605 (terminal operation data), to the game apparatus body 5 through the wireless module 610. In the exemplary embodiment, the codec LSI 606 subjects the image data and the sound data to a compression process similar to that performed by the codec LSI 27. The compressed image data and sound data, and the terminal operation data are output to the wireless module 610 as transmission data. The antenna 611 is connected to the wireless module 610, and the wireless module 610 transmits the transmission data to the game apparatus body 5 through the antenna 611. The wireless module 610 has the same function as the terminal communication module 28 of the game apparatus body 5. That is, the wireless module 610 has a function of connecting to a wireless LAN by a method based on, for example, the IEEE 802.11n standard. The data transmitted from the wireless module 610 may be encrypted where necessary, or may not be encrypted.

As described above, the transmission data transmitted from the terminal apparatus 6 to the game apparatus body 5 includes the operation data (terminal operation data), the image data, and the sound data. If another device is connected to the terminal apparatus 6 through the extension connector 67, data received from said another device may be included in the transmission data. The infrared communication module 612 performs, with another device, infrared communication based on, for example, the IRDA standard. The codec LSI 606 may include, in the transmission data, data received by the infrared communication, and transmit the transmission data to the game apparatus body 5, where necessary.

As described above, the compressed image data and sound data are transmitted from the game apparatus body 5 to the terminal apparatus 6. These data are received by the codec LSI 606 through the antenna 611 and the wireless module 610. The codec LSI 606 decompresses the received image data and sound data. The decompressed image data is output to the LCD 61, and an image according to the image data is displayed on the LCD 61. On the other hand, the decompressed sound data is output to the sound IC 608, and a sound based on the sound data is output from the loudspeakers 607.

When control data is included in the data received from the game apparatus body 5, the codec LSI 606 and the UI controller 605 make control instructions for the respective components, according to the control data. As described above, the control data represents control instructions for the respective components (in the exemplary embodiment, the camera 66, the touch panel controller 601, the marker section 65, the sensors 602 to 604, the vibrator 619, and the infrared communication module 612) included in the terminal apparatus 6. In the exemplary embodiment, the control instructions represented by the control data are considered to be instructions to start and halt (stop) the operations of the above components. That is, some components which are not used for a game may be halted to reduce power consumption. In this case, data from the halted components are not included in the transmission data transmitted from the terminal apparatus 6 to the game apparatus body 5. The marker section 65 is constituted by infrared LEDs, and therefore, the marker section 65 is controlled by simply turning on/off the supply of power thereto.

As described above, the terminal apparatus 6 includes the operation means such as the touch panel 62, the analog sticks 63, and the operation buttons 64. Alternatively, in another embodiment, the terminal apparatus 6 may include other operation means instead of or in addition to these operation means.

The terminal apparatus 6 includes the magnetic sensor 602, the acceleration sensor 603, and the gyro sensor 604 as sensors for calculating the movement (including the position and the attitude, or a change in the position or the attitude) of the terminal apparatus 6. Alternatively, in another embodiment, the terminal apparatus 6 may include one or two of these sensors. In still another embodiment, the terminal apparatus 6 may include other sensors instead of or in addition to these sensors.

The terminal apparatus 6 includes the camera 66 and the microphone 609. Alternatively, in another embodiment, the terminal apparatus 6 may not include the camera 66 and the microphone 609, or may include either of the cameral 66 and the microphone 609.

The terminal apparatus 6 includes the marker section 65 as a component for calculating the positional relation between the terminal apparatus 6 and the controller 7 (such as the position and/or the attitude of the terminal apparatus 6 as viewed from the controller 7). Alternatively, in another embodiment, the terminal apparatus 6 may not include the marker section 65. In still another embodiment, the terminal apparatus 6 may include other means as a component for calculating the above positional relation. For example, the controller 7 may include a marker section, and the terminal apparatus 6 may include an image pickup element. In this case, the marker 8 may include an image pickup element instead of an infrared LED.

Figure 6:
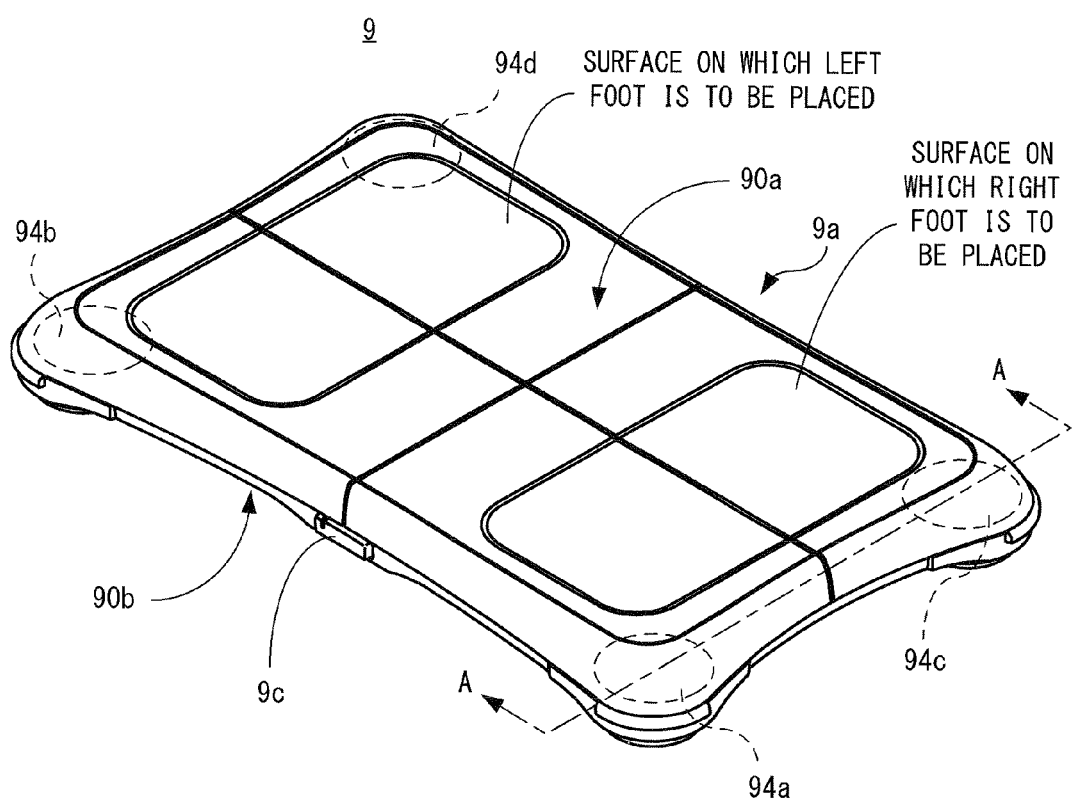
FIG. 6 is a perspective view showing a non-limiting example of the appearance of a board-type controller 9 of FIG. 1.
Figure 7:
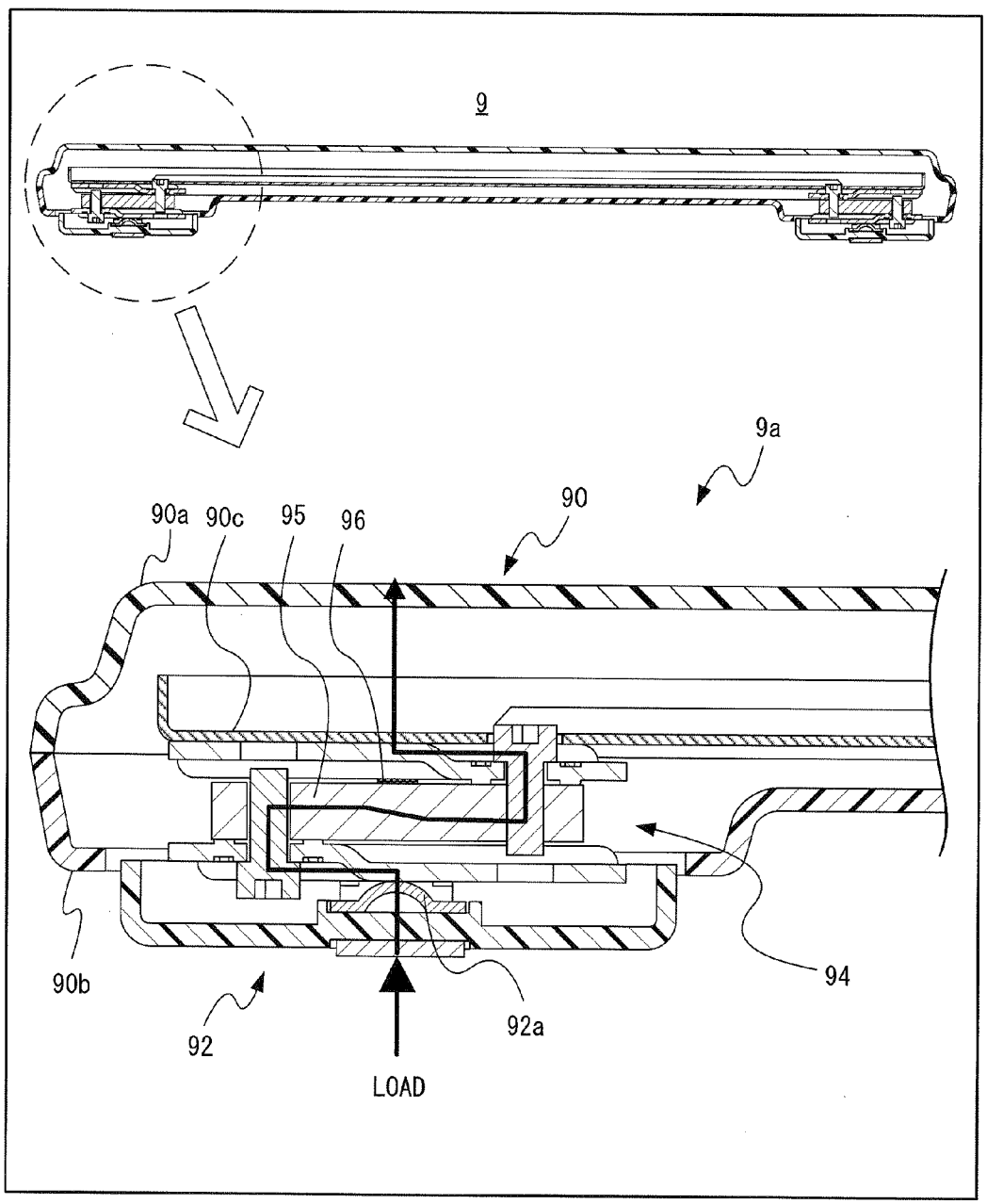
FIG. 7 is a diagram showing a non-limiting example of a cross-sectional view of the board-type controller 9 shown in FIG. 6 taken along line A-A, and a non-limiting example of an enlarged view of a corner portion where a load sensor 94 is arranged.

Next, with reference to FIGS. 6 through 8, the configuration of the board-type controller 9 is described. FIG. 6 is a perspective view illustrating an example of the appearance of the board-type controller 9 shown in FIG. 1. As shown in FIG. 6, the board-type controller 9 includes a platform 9a on which a user stands (on which the user places their feet), and at least four load sensors 94a through 94d for detecting a load applied to the platform 9a. Each of the load sensors 94a through 94d is embedded in the platform 9a (see FIG. 7), and the positions where the load sensors 94a through 94d are provided are indicated by dotted lines in FIG. 6. In the following description, the four load sensors 94a through 94d may be collectively referred to as a load sensor 94.

The platform 9a is formed in the shape of substantially a rectangular parallelepiped, and is in the shape of substantially a rectangle as viewed from the top. For example, the short side of the rectangular shape of the platform 9a is approximately 30 cm, and the long side thereof is approximately 50 cm. The upper surface of the platform 9a is flat, and has a pair of planes on which the user stands with the bottoms of their feet contacting thereto. Specifically, the upper surface of the platform 9a has a plane (a back-left region enclosed with a double line in FIG. 6) on which the user's right foot is placed, and a plane (a front-right region enclosed with a double line in FIG. 6) on which the user's right foot is placed. The platform 9a has, at four corners thereof, side surfaces each partially projecting outward in a cylindrical shape.

In the platform 9a, the four load sensors 94a through 94d are arranged at predetermined intervals. In the exemplary embodiment, the four load sensors 94a through 94d are arranged on the periphery of the platform 9a, more specifically, at the four corners of the platform 9a. The intervals of the load sensors 94a through 94d are appropriately set such that the load sensors 94a through 94d can accurately detect the intention of a game operation which is expressed by a manner of applying a load to the platform 9a by the user.

FIG. 7 shows an example of a cross-sectional view of the board-type controller 9, taken along line A-A in FIG. 6, and an example of an enlarged view of a corner part where a load sensor 94 is arranged. In FIG. 7, the platform 9a includes a support plate 90 on which the user stands, and legs 92. The load sensors 94a through 94d are provided in positions where the legs 92 are provided. In the exemplary embodiment, the four legs 92 are provided at the four corners, and therefore, the four load sensors 94a through 94d are also provided at the corresponding four corners. Each leg 92 is formed by plastic molding in the shape of substantially a cylinder with a base. Each load sensor 94 is located on a spherical part 92a provided on the base of the corresponding leg 92. The support plate 90 is supported by the legs 92 via the load sensors 94.

The support plate 90 includes an upper plate 90a forming an upper surface and an upper side surface portion, a lower plate 90b forming a lower surface and a lower side surface portion, and an intermediate plate 90c provided between the upper plate 90a and the lower plate 90b. The upper plate 90a and the lower plate 90b are formed by, for example, plastic molding, and are integrated using an adhesive or the like. The intermediate plate 90c is, for example, formed of a single metal plate by press forming. The intermediate plate 90c is fixed onto the four load sensors 94a through 94d. The upper plate 90a has, on a lower surface thereof, a grid-patterned rib (not shown), and is supported by the intermediate plate 90c via the rib. Therefore, when the user stands on the platform 9a, the load is transferred to the four legs 92 via the support plate 90 and the load sensors 94a through 94d. As indicated by arrows in FIG. 7, a reaction from a floor, which is generated by the input load, is transferred from the legs 92 through the spherical parts 92a, the load sensors 94a through 94d and the intermediate plate 90c to the upper plate 90a.

Each load sensor 94 is, for example, a strain gauge (strain sensor) load cell, which is a load converter for converting an input load to an electrical signal. In the load sensor 94, a strain-generating body 95 is deformed according to an input load, resulting in a strain. The strain is converted into a change of electrical resistance and then converted into a change of voltage by a strain sensor 96 attached to the strain-generating body 95. Therefore, the load sensor 94 outputs, from an output terminal thereof, a voltage signal indicating the input load.

The load sensor 94 may be of other types, such as a tuning fork type, a string vibration type, an electrostatic capacitance type, a piezoelectric type, a magnetostrictive type, and a gyroscopic type.

Referring back to FIG. 6, the board-type controller 9 further includes a power button 9*c*. When the power button 9*c* is operated (e.g., when the power button 9*c* is pressed) in the state where the board-type controller 9 is not activated, power is supplied to each of circuit components (see FIG. 8) of the board-type controller 9. There are, however, cases in which the board-type controller 9 is powered on in accordance with an instruction from the game apparatus body 5 and thereby supply of power to the circuit components is started. The board-type controller 9 may be automatically powered off when a state where the user does not stand thereon continues for a predetermined period of time (e.g., 30 sec) or more. Further, when the power button 9*c* is again operated in the state where the board-type controller 9 is in the active state, the board-type controller 9 may be powered off to stop supply of power to the circuit components.

FIG. 8 is a block diagram showing an example of an electrical configuration of the board-type controller 9. In FIG. 8, flows of signals and data are indicated by solid arrows, and supply of power is indicated by dotted arrows.

As shown in FIG. 8, the board-type controller 9 includes a microcomputer 100 for controlling the operation thereof. The microcomputer 100 includes a CPU, a ROM, a RAM, and the like, which are not shown. The CPU controls the operation of the board-type controller 9 in accordance with a program stored in the ROM.

The power button 9*c*, an AD converter 102, a DC-DC converter 104, and a wireless module 106 are connected to the microcomputer 100. An antenna 106*a* is connected to the wireless module 106. The four load sensors 94*a* through 94*d* are connected to the AD converter 102 via amplifiers 108.

Further, the board-type controller 9 includes a battery 110 for supplying power to the circuit components. In another embodiment, an AC adapter may be connected to the board-type controller 9 instead of the battery 110 so that commercial power is supplied to the circuit components. In this case, instead of the DC-DC converter 104, a power circuit, which converts alternating current into direct current and lowers and rectifies a direct-current voltage, needs to be provided in the board-type controller 9. In the exemplary embodiment, power is supplied directly from the battery 110 to the microcomputer 100 and the wireless module 106. In other words, power is constantly supplied from the battery 110 to the wireless module 106 and some components (such as the CPU) in the microcomputer 100 to detect whether or not the power button 9*c* is turned on and whether or not a command that instructs power-on is transmitted from the game apparatus body 5. On the other hand, power is supplied from the battery 110 through the DC-DC converter 104 to the load sensors 94*a* through 94*d*, the AD converter 102, and the amplifiers 108. The DC-DC converter 104 converts a voltage value of direct current supplied from the battery 110 into a different voltage value, and supplies the resultant direct current to the load sensors 94*a* through 94*d*, the AD converter 102, and the amplifiers 108.

Supply of power to the load sensors 94*a* through 94*d*, the A/D converter 102 and the amplifiers 108 may be performed where necessary by the microcomputer 100 that controls the DC-DC converter 104. Specifically, when the microcomputer 100 determines that it is necessary to operate the load sensors 94*a* through 94*d* to detect a load, the microcomputer 100 may control the DC-DC converter 104 to supply power to the load sensors 94*a* through 94*d*, the A/D converter 102 and the amplifiers 108.

When power is supplied to the load sensors 94*a* through 94*d*, the load sensors 94*a* through 94*d* each output a signal indicating a load inputted thereto. These signals are amplified by the respective amplifiers 108, and converted from analog signals into digital data by the A/D converter 102. The digital data is input to the microcomputer 100. The detected values of the load sensors 94*a* through 94*d* are given identification information of the load sensors 94*a* through 94*d*, so that the load sensors 94*a* through 94*d* can be identified from the corresponding detected values. Thus, the microcomputer 100 can acquire the data indicating the detected load values of the four load sensors 94*a* through 94*d* at the same time.

On the other hand, when the microcomputer 100 determines that it is not necessary to operate the load sensors 94*a* through 94*d*, i.e., when it is not the time for load detection, the microcomputer 100 controls the DC-DC converter 104 to stop supply of power to the load sensors 94*a* through 94*d*, the A/D converter 102, and the amplifiers 108. Thus, the board-type controller 9 can operate the load sensors 94*a* through 94*d* to detect a load or a distance only when it is required, resulting in a reduction in power consumption for load detection.

Load detection is typically required when the game apparatus body 5 (FIG. 1) needs to acquire load data. For example, when game apparatus body 5 requires load information, the game apparatus body 5 transmits an information acquisition command to the board-type controller 9. When the microcomputer 100 receives the information acquisition command from the game apparatus body 5, the microcomputer 100 controls the DC-DC converter 104 to supply power to the load sensors 94*a* through 94*d* and the like, thereby detecting a load. On the other hand, when the microcomputer 100 does not receive a load acquisition command from the game apparatus body 5, the microcomputer 100 controls the DC-DC converter 104 to stop supply of power to the load sensors 94*a* through 94*d* and the like.

The microcomputer 100 may control the DC-DC converter 104 on the basis of a determination that the time of load detection arrives at predetermined intervals. When such periodic load detection is performed, information regarding the constant time period may be supplied and stored from the game apparatus body 5 to the microcomputer 100 of the board-type controller 9 when the game is started, or it may be preinstalled in the microcomputer 100.

The data indicating the detected values from the load sensors 94*a* through 94*d* are transmitted as board operation data (input data) for the board-type controller 9 from the microcomputer 100 via the radio module 106 and an antenna 106*b* to the game apparatus body 5. For example, when the microcomputer 100 has performed load detection according to a command from the game apparatus body 5, the microcomputer 100 transmits the detected value data of the load sensors 94*a* through 94*d* to the game apparatus body 5 on receipt of the detected value data from the A/D converter 102. The microcomputer 100 may transmit the detected value data to the game apparatus body 5 at predetermined intervals. If the interval of the data transmission is longer than the interval of the load detection, data containing load values which have been detected at a plurality of detection times up to the subsequent time of transmission may be transmitted.

The wireless module 106 is set so as to perform communication according to the same wireless standard (the Bluetooth, wireless LAN, and the like) as that for the controller communication module 19 of the game apparatus body 5. Accordingly, the CPU 10 of the game apparatus body 5 is allowed to transmit an information acquisition command to the board-type controller 9 through the controller communication module 19 and the like. Thus, the board-type controller 9 is allowed to receive the command from the game apparatus body 5 through the wireless module 106 and the antenna 106a. Further, the board-type controller 9 is allowed to transmit the board operation data including the load detection values (or load calculation values) of the load sensors 94a through 94d to the game apparatus body 5.

For example, in a game which is performed on the basis of a simple sum of four load values detected by the four load sensors 94a through 94d, the user is allowed to stand at a given position with respect to the four load sensors 94a through 94d of the board-type controller 9. That is, the user is allowed to stand on the platform 9a at a given position and in a given direction to play a game. In some kinds of games, however, the direction of a load value detected by each of the four load sensors 94 viewed from the user needs to be identified. That is, a positional relation between the four load sensors 94 of the board-type controller 9 and the user needs to be recognized. In this case, for example, the positional relation between the four load sensors 94 and the user may be defined in advance, and the user may be supposed to stand on the platform 9a in a manner which allows the predetermined positional relation. Typically, a positional relation in which two of the load sensors 94a through 94d are present in front of, behind, to the right of, and to the left of the user standing in the center of the platform 9a, i.e., a positional relation in which the user stands in the center of the platform 9a of the board-type controller 9, is defined. In this case, the platform 9a of the board-type controller 9 is rectangular in shape as viewed from the top, and the power button 9c is provided at one side (long side) of the rectangle. Therefore, it is ruled in advance that the user, using the power button 9c as a guide, stands on the platform 9a such that the long side at which the power button 9c is provided is located in a predetermined direction (front, rear, left or right). In this case, each of the load values detected by the load sensors 94a through 94d is a load value of a predetermined direction (front right, front left, rear right, or rear left) as viewed from the user. Therefore, the board-type controller 9 and the game apparatus body 5 can find out a direction to which each detected load value corresponds as viewed from the user, on the basis of the identification information of the load sensors 94 contained in the detected load value data, and arrangement data indicating the positions or the directions of the load sensors 94 with respect to the user that is set (stored) in advance. As a result, it is possible to understand the intention of a game operation performed by the user, such as an operating direction, for example, a forward, a backward, a leftward, or a rightward direction, or a user's foot being lifted.

Figure 9:
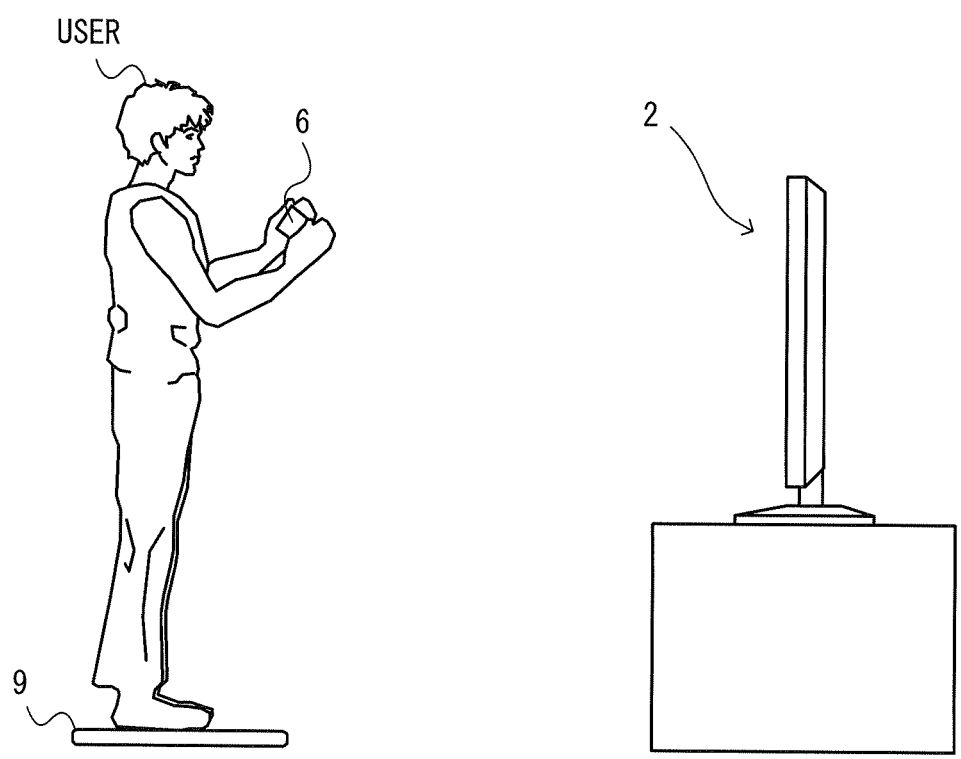
FIG. 9 is a diagram showing a non-limiting example of the state of a user performing an operation using the terminal apparatus 6 and the board-type controller 9.
Figure 15A:
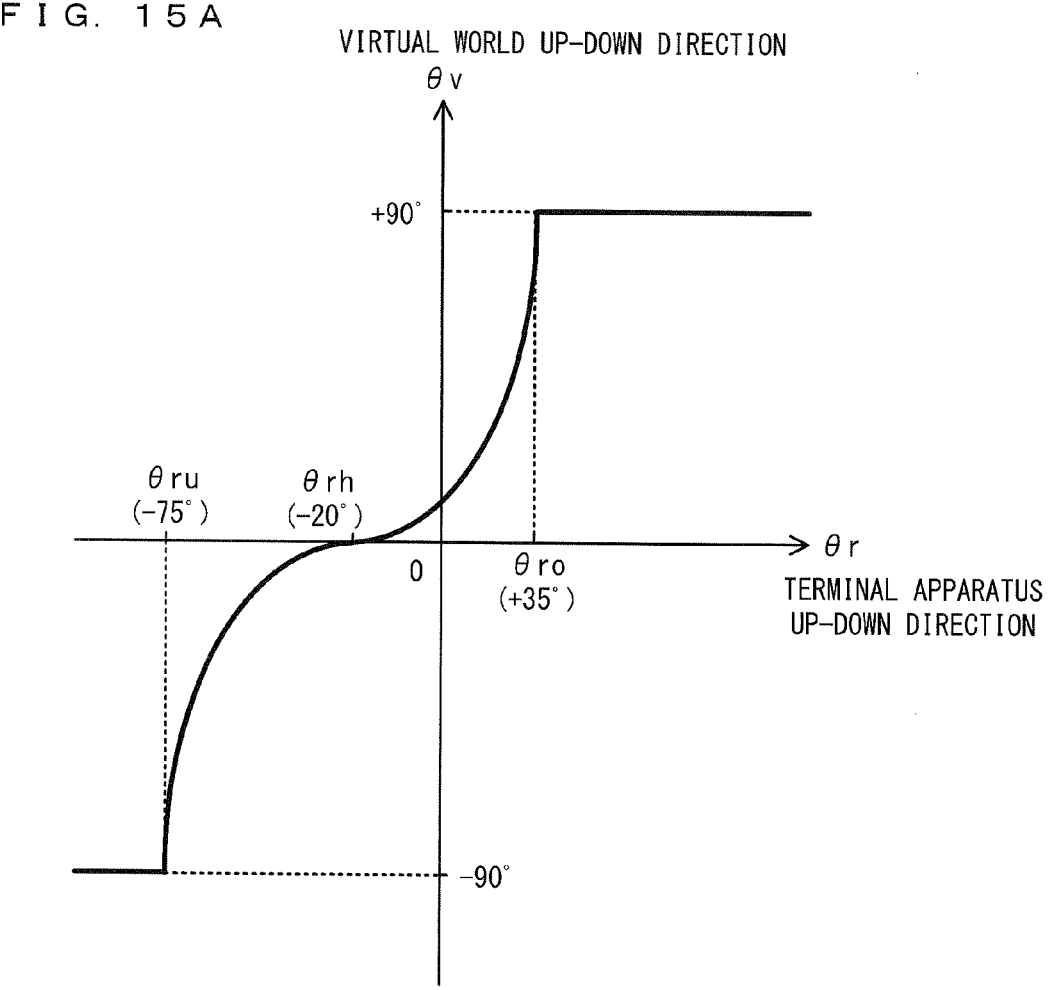
FIG. 15A is a part of a graph showing a non-limiting second example where an offset correction and a scaling correction are made on the up-down angle of the terminal apparatus 6.
Figure 15B:
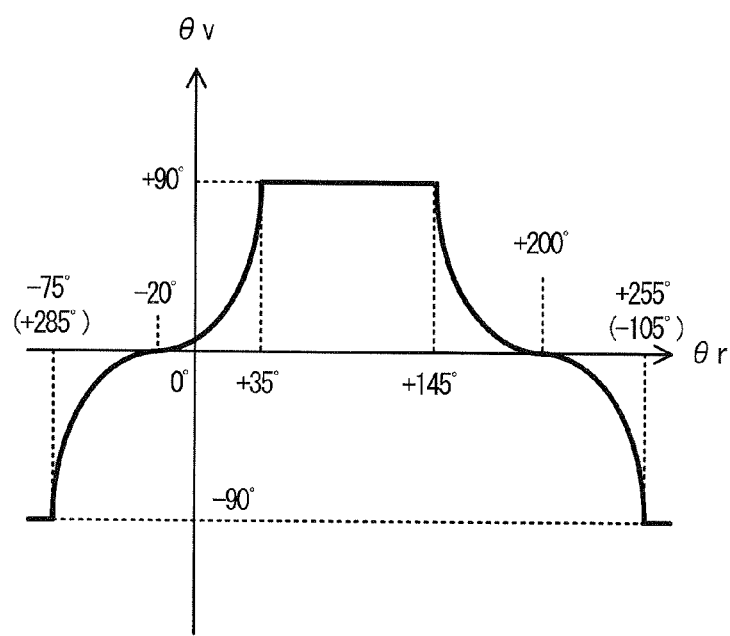
FIG. 15B is the entirety of the graph showing the non-limiting second example where the offset correction and the scaling correction are made on the up-down angle of the terminal apparatus 6.
Figure 16A:
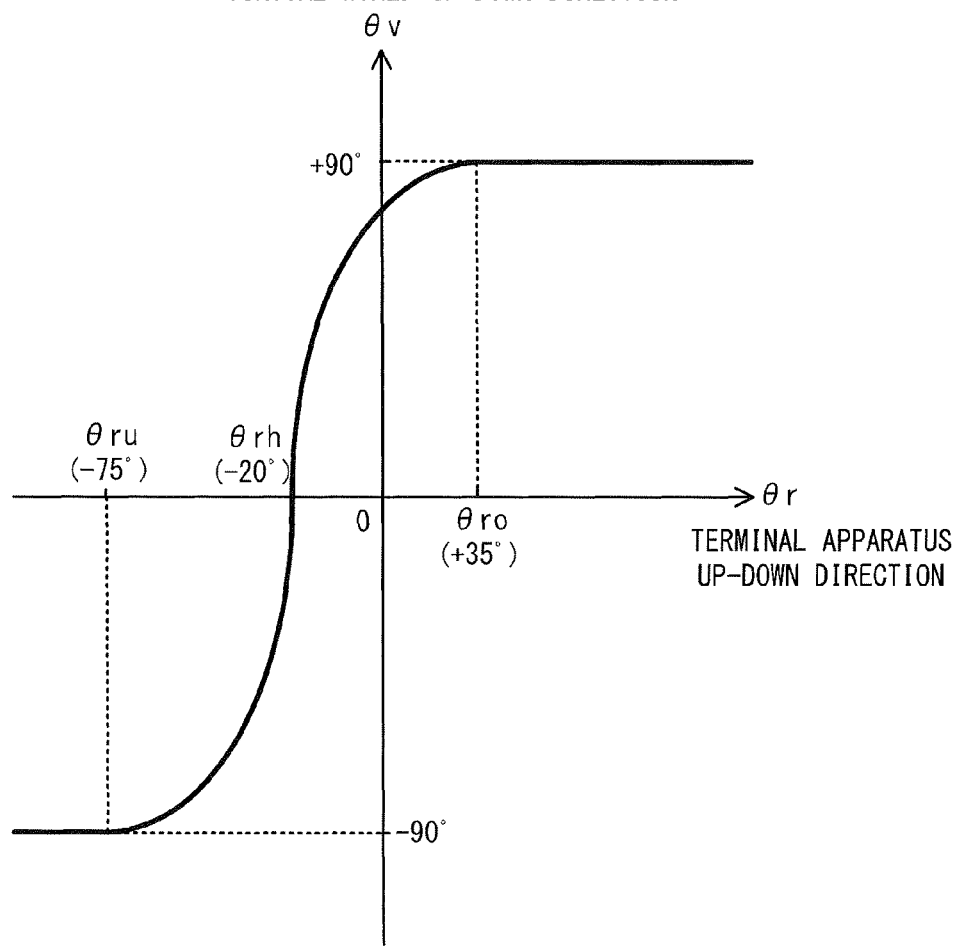
FIG. 16A is a part of a graph showing a non-limiting third example where an offset correction and a scaling correction are made on the up-down angle of the terminal apparatus 6.
Figure 16B:
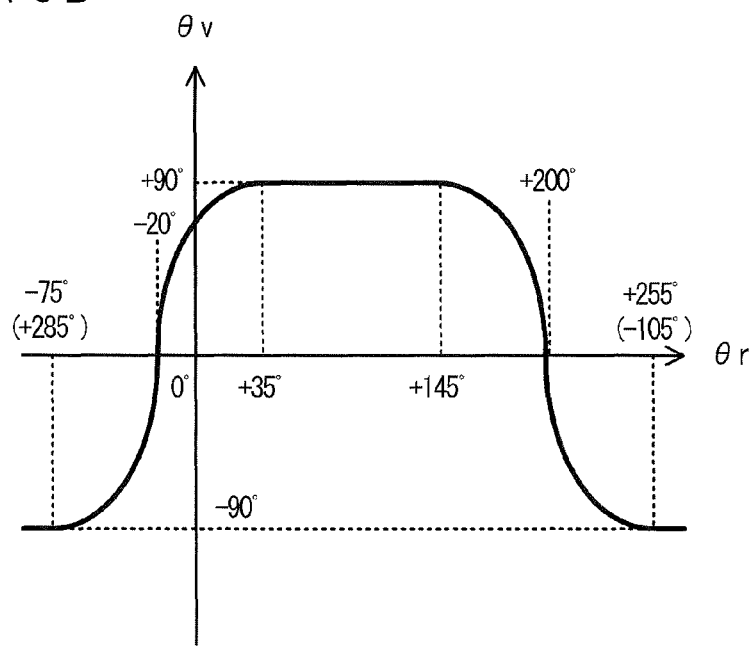
FIG. 16B is the entirety of the graph showing the non-limiting third example where the offset correction and the scaling correction are made on the up-down angle of the terminal apparatus 6.
Figure 17A:
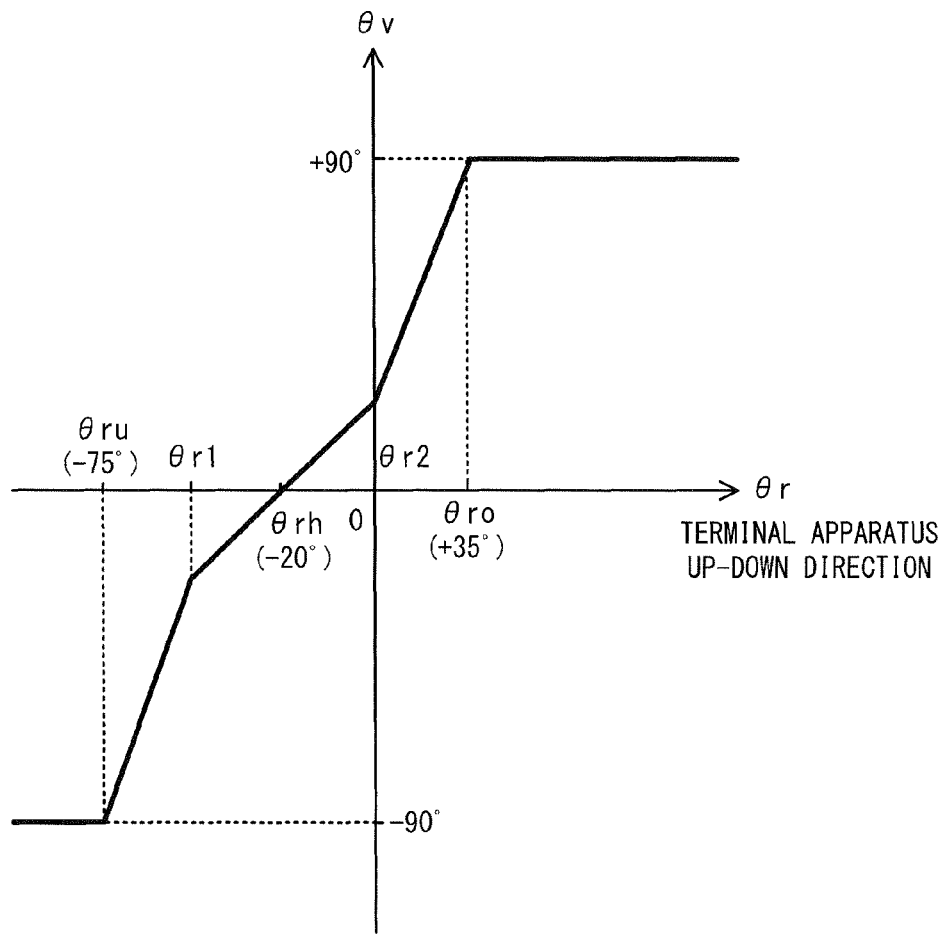
FIG. 17A is a part of a graph showing a non-limiting fourth example where an offset correction and a scaling correction are made on the up-down angle of the terminal apparatus 6.
Figure 17B:
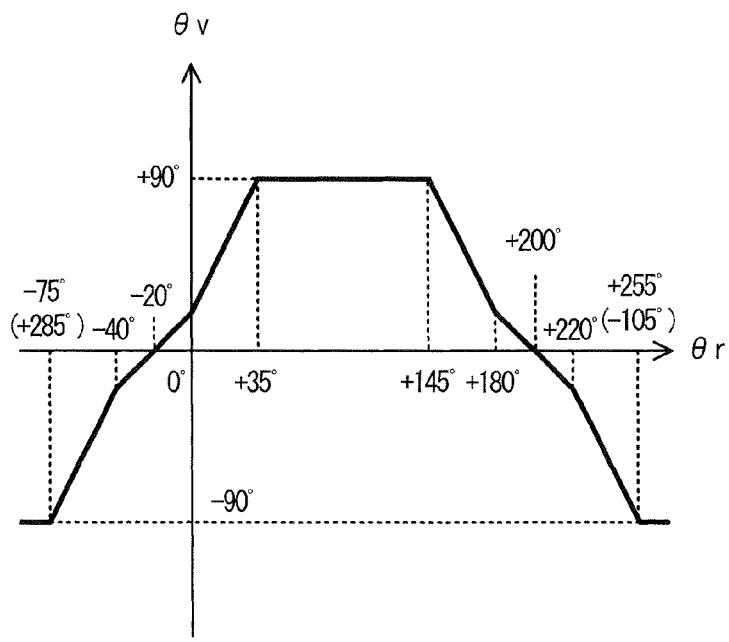
FIG. 17B is the entirety of the graph showing the non-limiting fourth example where the offset correction and the scaling correction are made on the up-down angle of the terminal apparatus 6.

Next, with reference to FIGS. 9 through 17B, a description is given of an overview of the information processing performed by the game apparatus body 5, before descriptions are given of specific processes performed by the game apparatus body 5. It should be noted that FIG. 9 is a diagram showing an example of the state of a user performing an operation using the terminal apparatus 6 and the board-type controller 9. FIG. 10A is a diagram showing an example of an image displayed on the LCD 61 of the terminal apparatus 6. FIG. 10B is a diagram showing an example of an image displayed on the monitor 2. FIG. 11 is a diagram showing an example of the attitude of the terminal apparatus 6 indicating a horizontal indication direction. FIG. 12 is a diagram showing an example of an operation indication direction set in the case where a terminal apparatus perspective direction is directed further in the elevation direction than in the horizontal indication direction. FIG. 13 is a diagram showing an example of the operation indication direction set in the case where the terminal apparatus perspective direction is directed further in the depression direction than in the horizontal indication direction. FIG. 14A is a part of a graph showing a first example where an offset correction and a scaling correction are made on the up-down angle of the terminal apparatus 6. FIG. 14B is the entirety of the graph showing the first example where the offset correction and the scaling correction are made on the up-down angle of the terminal apparatus 6. FIG. 15A is a part of a graph showing a second example where an offset correction and a scaling correction are made on the up-down angle of the terminal apparatus 6. FIG. 15B is the entirety of the graph showing the second example where the offset correction and the scaling correction are made on the up-down angle of the terminal apparatus 6. FIG. 16A is a part of a graph showing a third example where an offset correction and a scaling correction are made on the up-down angle of the terminal apparatus 6. FIG. 16B is the entirety of the graph showing the third example where the offset correction and the scaling correction are made on the up-down angle of the terminal apparatus 6. FIG. 17A is a part of a graph showing a fourth example where an offset correction and a scaling correction are made on the up-down angle of the terminal apparatus 6. FIG. 17B is the entirety of the graph showing the fourth example where the offset correction and the scaling correction are made on the up-down angle of the terminal apparatus 6.

As shown in FIG. 9, the user performs an operation using the terminal apparatus 6 and the board-type controller 9. Specifically, the user operates the terminal apparatus 6 and the board-type controller 9 while mounted on the board-type controller 9 and holding the terminal apparatus 6. Then, the user plays by taking action (e.g., a step action and a leg bending and extending action) on the board-type controller 9 while viewing an image displayed on the monitor 2 or an image displayed on the LCD 61 of the terminal apparatus 6, and also performing the operation of moving the terminal apparatus 6. Then, on the LCD 61 and the monitor 2 of the terminal apparatus 6, game images are represented such that a player object Po takes action in a virtual world (e.g., the action of changing its attitude, and the action of moving its direction, and the action of changing its moving velocity) in accordance with the direction and the attitude of the terminal apparatus 6 held by the user and the action taken by the user on the board-type controller 9, and the position and the attitude of a virtual camera that are set in the virtual world are changed in accordance with the position and the attitude of the player object Po.

Figure 10A:
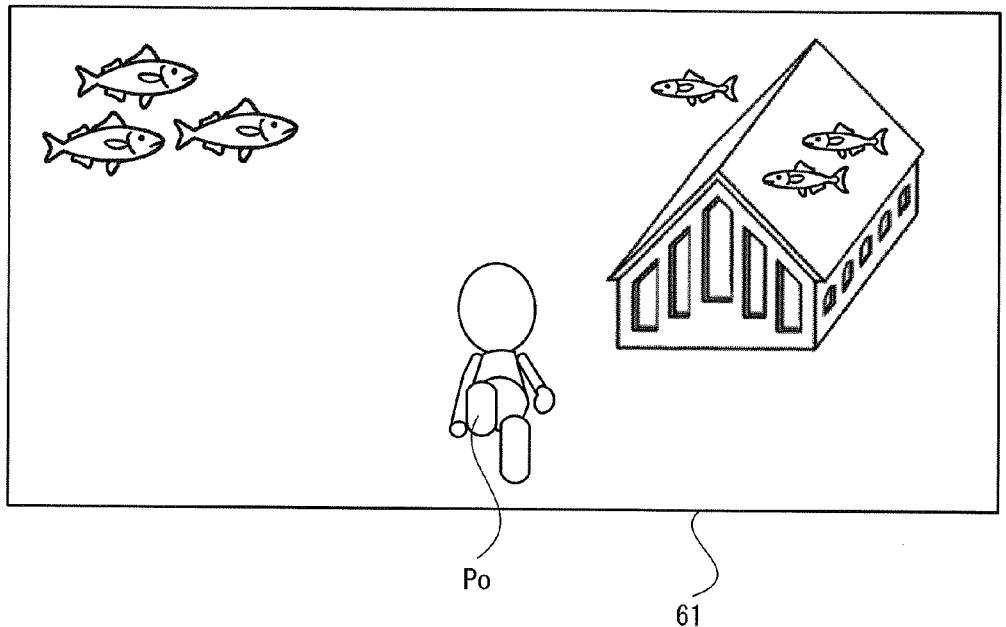
FIG. 10A is a diagram showing a non-limiting example of an image displayed on a LCD 61 of the terminal apparatus 6.

As shown in FIG. 10A, on the LCD 61 of the terminal apparatus 6, a player object Po moving in a virtual world is displayed. In the example shown in FIG. 10A, a virtual camera is set behind and close to the player object Po swimming under the sea, and the state of the virtual world viewed from the virtual camera is displayed together with the player object Po. The virtual world viewed from behind and close to the player object Po is thus displayed on the LCD 61, whereby it is possible to provide the user, holding the terminal apparatus 6, with a sense of presence in the virtual world, and it is also possible to allow the user to understand the moving direction and the moving velocity of the player object Po in an intuitive manner. Further, the attitude and the moving direction of the player object Po change by changing (pitching) the attitude of the terminal apparatus 6 upward and downward, rotationally moving (yawing) the terminal apparatus 6 so as to change the direction of the terminal apparatus 6, and rotating (rolling) the terminal apparatus 6 about the perspective direction of the display screen of the terminal apparatus 6 (the z-axis direction). Also the position and the attitude of the virtual camera change in accordance with the change in the attitude of the player object Po. For example, the attitude and the direction of the terminal apparatus 6 may be brought into conjunction with the attitude and the direction of the virtual camera, whereby the user can enjoy a feeling as if peeping at the virtual world through the LCD 61 of the terminal apparatus 6.

Figure 10B:
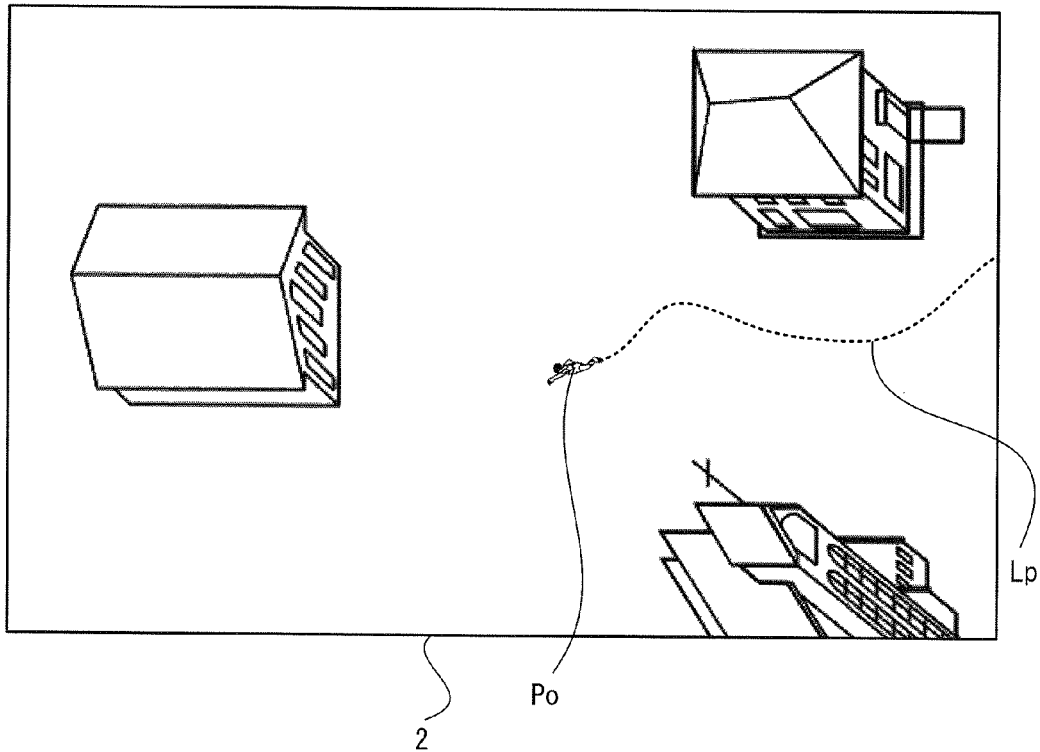
FIG. 10B is a diagram showing a non-limiting example of an image displayed on a monitor 2.

In addition, as shown in FIG. 10B, also on the monitor 2, the same virtual world as the virtual world displayed on the LCD 61 is displayed. In the example shown in FIG. 10B, the state of the virtual world viewed from a distant bird's-eye view is displayed together with the player object Po swimming under the sea. In the example shown in FIG. 10B, a movement path Lp of the player object Po having swum under the sea is displayed on the virtual world. The state of the virtual world in which the player object Po is viewed from a distant bird's-eye view is thus displayed on the monitor 2, whereby the user can easily understand the circumstance of the player object Po, and another person viewing the state of the user playing can also enjoy viewing the state of the player object Po moving in the virtual world.

As an example, when the user has taken action so as to step on the board-type controller 9, the player object Po takes the action of swimming under the sea by flutter-kicking at a velocity based on the step action. Further, when the user has taken action so as to perform leg bending and extending on the board-type controller 9, the player object Po takes the action of swimming under the sea by dolphin-kicking at a velocity based on the leg bending and extending action. By thus taking action on the board-type controller 9, the user can change the swimming style and the moving velocity of the player object Po.

For example, as described above, the board-type controller 9 outputs detected load values based on the action taken by the user on the board-type controller 9. Then, the use of the detected load values makes it possible to calculate the total load applied to the board-type controller 9 and the position of the center of gravity of the load applied to the board-type controller 9. Further, the use of the total load makes it possible to estimate the type of action that is being taken by the user on the board-type controller 9. The swimming style and the moving velocity of the player object Po are set in accordance with the action of the user thus estimated on the board-type controller 9.

In addition, in accordance with the direction and the attitude of the terminal apparatus 6 held by the user, the attitude and the moving direction of the player object Po swimming under the sea change. As an example, as a result of the user directing (i.e., pitching and yawing) the terminal apparatus 6 upward, downward, leftward, and rightward, in accordance with the change in the direction of the terminal apparatus 6, the attitude of the player object Po swimming under the sea (the direction in which the player object Po is directed in the virtual world) changes in conjunction with the change in the direction of the terminal apparatus 6, and also the swimming direction of the player object Po changes. Further, when the user has rotated (i.e., rolled) the terminal apparatus 6, held by the user, about the perspective direction of the LCD 61 (the z-axis direction), the attitude of the player object Po swimming under the sea changes in accordance with the direction and the attitude of the terminal apparatus 6. Specifically, when the user has changed the direction of the terminal apparatus 6 so as to direct the back surface of the terminal apparatus 6 upward (i.e., pitch the terminal apparatus 6 in the elevation direction), the attitude of the player object Po swimming is changed such that the player object Po is directed in the direction of rising in the direction of the sea surface, and also the swimming direction of the player object Po is changed such that the player object Po rises in the direction of the sea surface. Further, when the user has changed the direction of the terminal apparatus 6 so as to direct the back surface of the terminal apparatus 6 leftward (i.e., yaw the terminal apparatus 6 to the left), the attitude of the player object Po swimming is changed to the left of the player object Po, and also the swimming direction of the player object Po is changed to the left. The user can thus change the attitude and the moving direction of the player object Po on the basis of the direction and the attitude of the terminal apparatus 6 held by the user. For example, the attitude and the direction of the terminal apparatus 6 may be brought into conjunction with the attitude and the moving direction of the player object Po, whereby the user can perform, using the terminal apparatus 6, an operation having verisimilitude as if the user themselves were the player object Po. Further, as described above, a virtual camera is set behind and close to the player object Po swimming under the sea. Thus, changes in the attitude and the moving direction of the player object Po cause the attitude and the position of the virtual camera to change. For example, the attitude and the direction of the terminal apparatus 6 may be brought into conjunction with the attitude and the direction of the virtual camera, whereby the user can enjoy a feeling as if peeping at the virtual world through the LCD 61 of the terminal apparatus 6.

As described above, the attitude and the moving direction of the player object Po swimming under the sea change in accordance with the direction and the attitude of the terminal apparatus 6 held by the user. In the exemplary game, an operation indication direction is calculated that corresponds to the perspective direction of the LCD 61 of the terminal apparatus 6 in real space (the z-axis positive direction; occasionally referred to as a "terminal apparatus perspective direction") and is included in the virtual world, and the attitude (the direction in which the player object Po is directed in the virtual world) and the moving direction of the player object Po are set on the basis of the operation indication direction. This makes it possible to set the perspective direction in the virtual world displayed on the LCD 61 of the terminal apparatus 6, to the facing direction and the moving direction of the player object Po. This enables the user to set the operation indication direction in the virtual world, corresponding to the terminal apparatus perspective direction in real space, to the moving direction of the player object Po. Also, the virtual world is displayed on the LCD 61 such that the moving direction is the perspective direction. This enables the operation of setting the moving direction in an intuitive manner, which facilitates the setting of the moving direction to the direction desired by the user. Further, it is also possible to set the moving direction of the player object Po and the direction of the line of sight of the virtual camera in accordance with the operation of rotating the terminal apparatus 6 in three directions. This makes it possible to set the moving direction and the direction of the line of sight that are desired in the virtual world by the user as they are.

Here, generally, the moving direction of the player object Po and the direction of the line of sight of the virtual camera are often set near a horizontal direction in the virtual world. Meanwhile, to set the operation indication direction near the horizontal direction in the virtual world, the user holding the terminal apparatus 6 directs the terminal apparatus perspective direction in a horizontal direction in real space, and therefore needs to maintain the state where the LCD 61 of the terminal apparatus 6 stands vertically in real space. The position of holding the terminal apparatus 6 so as to maintain the state where the LCD 61 stands vertically in real space, however, is a great burden on the user, and therefore may not be suitable for a long-time game play. To solve such a problem, in the exemplary game, when the terminal apparatus 6 is held by the user in a position relatively comfortable for them, such as when the terminal apparatus perspective direction is directed downward in the depression direction and by a predetermined angle with respect to the horizontal direction in real space, an offset correction is made so that the operation indication direction is the horizontal direction in the virtual world.

For example, as shown in FIG. 11, the operation indication direction in the virtual world is set to correspond to the terminal apparatus perspective direction of the terminal apparatus 6 in real space (the z-axis positive direction). Then, an offset correction is made so that the operation indication direction calculated so as to correspond to the attitude of the terminal apparatus 6 that allows the user to hold it in an operation position relatively comfortable even while maintaining it in the same attitude for a long time (e.g., in the state where the terminal apparatus perspective direction is directed in the depression direction and by an angle A (e.g., 20°) with respect to the horizontal direction in real space; occasionally referred to as a "reference attitude") is the horizontal direction in the virtual world. Hereinafter, the terminal apparatus perspective direction, on the basis of which the offset correction is made so that the operation indication direction is the horizontal direction in the virtual world, is occasionally referred to as a "horizontal indication direction".

In addition, to set the operation indication direction to the vertically up and vertically down directions in the virtual world, the user holding the terminal apparatus 6 directs the terminal apparatus perspective direction vertically upward and vertically downward in real space. The terminal apparatus 6, however, is used also as display means for displaying the virtual world. Thus, the position of directing the terminal apparatus perspective direction vertically upward and vertically downward in real space while viewing the LCD 61 of the terminal apparatus 6 is a great burden on the user, which makes it difficult for the user to operate the terminal apparatus 6. To solve such a problem, in the exemplary game, when the terminal apparatus perspective direction in real space is transformed into the operation indication direction so as to correspond to the virtual world, a predetermined scaling is performed to reduce the burden on the user.

For example, as shown in FIG. 12, the terminal apparatus 6 is in the state where the terminal apparatus perspective direction is directed in the elevation direction and by an angle B with respect to the horizontal indication direction (i.e., the direction in which the terminal apparatus 6 is directed in the depression direction and by the angle A with respect to the horizontal direction in real space). Then, the operation indication direction into which the terminal apparatus perspective direction is transformed is set to each of the moving direction of the player object Po and the direction of the line of sight of the virtual camera (the Z-axis positive direction). In such a state of the terminal apparatus 6, the operation indication direction is set so as to be directed in the elevation direction and by an angle C with respect to the horizontal direction in the virtual world. Here, the angle C is a value obtained by making a predetermined scaling correction on the angle B, and is calculated by a function f(B) of the angle B. It should be noted that in the example shown in FIG. 12, the angle C is set to be greater than the angle B. Thus, even if the terminal apparatus 6 has such an attitude that the angle between the horizontal indication direction and the terminal apparatus perspective direction is relatively small, the operation indication direction is set so as to be at a great elevation angle with respect to the horizontal direction in the virtual world.

In addition, as shown in FIG. 13, the terminal apparatus 6 is in the state where the terminal apparatus perspective direction is directed in the depression direction and by an angle D with respect to the horizontal indication direction. Then, the operation indication direction into which the terminal apparatus perspective direction is transformed is set to each of the moving direction of the player object Po and the direction of the line of sight of the virtual camera (the Z-axis positive direction). In such a state of the terminal apparatus 6, the operation indication direction is set so as to be directed in the depression direction and by an angle E with respect to the horizontal direction in the virtual world. Here, the angle E is a value obtained by making a predetermined scaling correction on the angle D, and is calculated by a function f(D) of the angle D. It should be noted that in the example shown in FIG. 13, the angle E is set to be greater than the angle D. Thus, even if the terminal apparatus 6 has such an attitude that the angle between the horizontal indication direction and the terminal apparatus perspective direction is relatively small, the operation indication direction is set so as to be at a great depression angle with respect to the horizontal direction in the virtual world.

Figure 14A:
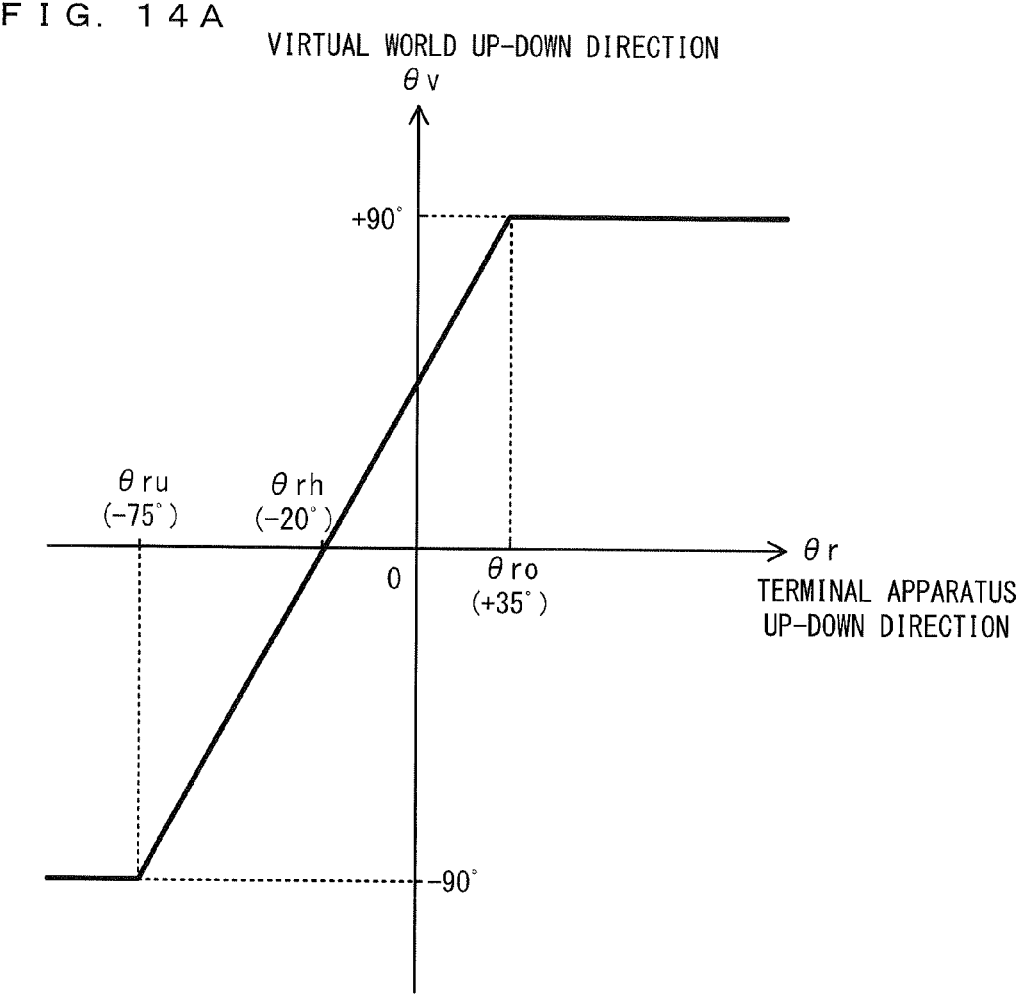
FIG. 14A is a part of a graph showing a non-limiting first example where an offset correction and a scaling correction are made on the up-down angle of the terminal apparatus 6.
Figure 14B:
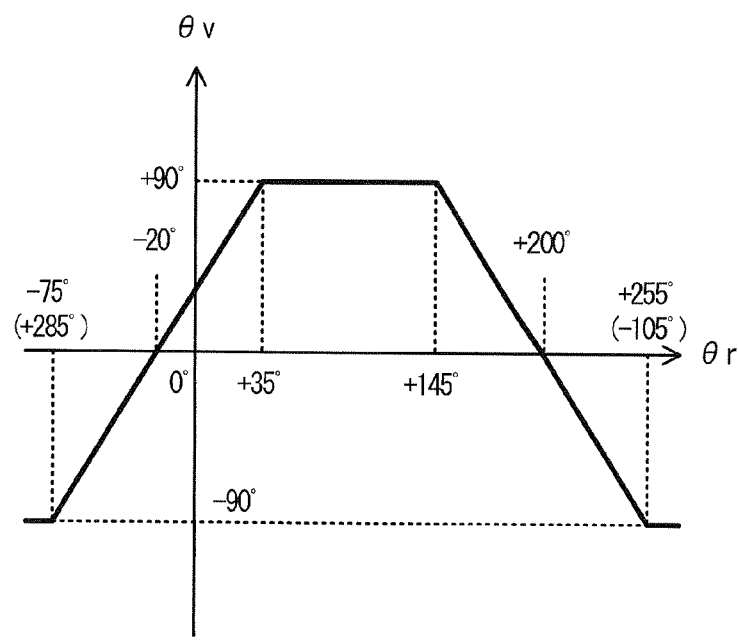
FIG. 14B is the entirety of the graph showing the non-limiting first example where the offset correction and the scaling correction are made on the up-down angle of the terminal apparatus 6.

It is possible to, in accordance with the operation environment used in the game, appropriately set the functions to be used to transform the terminal apparatus perspective direction in real space into the operation indication direction by making the offset correction and the scaling correction on the terminal apparatus perspective direction in real space so as to correspond to the virtual world. For example, as a first example, as shown in FIGS. 14A and 14B, the operation indication direction (a virtual world up-down angle $\theta v$) is calculated by linearly transforming the terminal apparatus perspective direction (a terminal apparatus up-down angle $\theta r$). Here, the graph of FIGS. 14A and 14B shows the relationship, when the terminal apparatus perspective direction is transformed into the operation indication direction, between: the angle of the terminal apparatus perspective direction (the terminal apparatus up-down angle $\theta r$) on the assumption that the horizontal direction in real space is at an angle of 0°; and the angle of the operation indication direction (the virtual world up-down angle $\theta v$) on the assumption that the horizontal direction in the virtual world is at an angle of 0°. In the graph, an elevation angle with respect to the horizontal direction is represented by a positive value, and a depression angle with respect to the horizontal direction is represented by a negative value. It should be noted that an angle $\theta rh$ shown in FIG. 14A is the terminal apparatus up-down angle $\theta r$ indicating the horizontal indication direction described above, and indicates the angle (a depression angle; e.g., −20°) of the horizontal indication direction from the horizontal direction in real space. An angle $\theta ro$ indicates the terminal apparatus up-down angle $\theta r$ (e.g., +35°) of the terminal apparatus perspective direction (a vertically up indication direction) on the basis of which the operation indication direction is set to the vertically up direction in the virtual world (the virtual world up-down angle $\theta v=+90°$). An angle $\theta ru$ indicates the terminal apparatus up-down angle $\theta r$ (e.g., −75°) of the terminal apparatus perspective direction (a vertically down indication direction) on the basis of which the operation indication direction is set to the vertically down direction in the virtual world (the virtual world up-down angle θv=−90°).

In the first example shown in FIG. 14A, the terminal apparatus perspective direction is transformed (subjected to an offset correction) into the operation indication direction so that the virtual world up-down angle θv is horizontal (0°) when the terminal apparatus up-down angle θr is θrh (e.g., −20°). Further, the terminal apparatus perspective direction is linearly transformed (subjected to a scaling correction) into the operation indication direction using a linear function whose slope (scaling factor) is greater than 1 in the range of the angle θru to the angle θro (i.e., θro−θrh<90° and θrh−θru<90°). Thus, the angle obtained by making a magnification correction on the angle between the horizontal indication direction and the terminal apparatus perspective direction by a predetermined factor is the angle between the horizontal direction in the virtual world and the operation indication direction. For example, even when the user has changed the terminal apparatus perspective direction from the horizontal indication direction (e.g., θr=−20°) to the vertically up indication direction (e.g., θr=+35°), the amount of rotation of the terminal apparatus perspective direction is less than 90° (e.g., 55°). By the scaling correction, however, the amount of rotation of the terminal apparatus perspective direction in real space that is less than 90° is corrected to substantially 90°. This makes it possible to set the operation indication direction to the vertically up and vertically down directions in the virtual world without directing the terminal apparatus perspective direction vertically upward and vertically downward in real space.

In addition, in the example of FIGS. 14A and 14B, when the terminal apparatus perspective direction is set in a range further in the elevation direction than in the vertically up indication direction (a range in which θr>θro and which is used until the operation indication direction starts to change to the depression direction again; e.g., +35°<θr<+145°), the operation indication direction is set fixedly to the vertically up direction in the virtual world. Further, in the example of FIGS. 14A and 14B, when the terminal apparatus perspective direction is set in a range further in the depression direction than in the vertically down indication direction (a range in which θr<θru and which is used until the operation indication direction starts to change to the elevation direction again; e.g., −105°<θr<−75°), the operation indication direction is set fixedly to the vertically down direction in the virtual world. That is, when the user has operated the terminal apparatus 6 so as to direct the terminal apparatus perspective direction in a range further in the elevation direction than in the vertically up indication direction, or in a range further in the depression direction than in the vertically down indication direction, the vertically up direction or the vertically down direction in the virtual world is set as the operation indication direction.

It should be noted that as shown in FIG. 14B, when the terminal apparatus 6 has further pitch-rotated beyond the range where the operation indication direction is set fixedly to the vertically up direction in the virtual world (e.g., θr>+145°), the terminal apparatus perspective direction is linearly transformed into the operation indication direction using a linear function obtained by converting the slope of the linear function described above to negative (i.e., a slope symmetric with respect to a straight line (e.g., θr=+90°) parallel to the θv-axis and passing through the center of the range where the operation indication direction is set fixedly to the vertically up direction in the virtual world, the slope (scaling factor) being less than −1). Then, if the terminal apparatus 6 further pitch-rotates, the terminal apparatus 6 reaches an angle at which the operation indication direction is set to the vertically down direction in the virtual world again (e.g., θr=+255°, i.e., θr=−105°), and at and beyond this angle, the range is one where the operation indication direction described above is set fixedly to the vertically down direction in the virtual world (i.e., −105°<θr<−75°, for example). If the terminal apparatus 6 is thus continuously rotated in the pitch direction, the terminal apparatus perspective direction is transformed into the operation indication direction by looping 360° the transformation of the operation indication direction that is symmetric with respect to a straight line (e.g., θr=+90°) parallel to the θv-axis and passing through the center of the range where the operation indication direction is set fixedly to the vertically up direction in the virtual world.

As a second example, as shown in FIG. 15A, the terminal apparatus perspective direction is transformed (subjected to an offset correction) into the operation indication direction so that the virtual world up-down angle θv is horizontal (0°) when the terminal apparatus up-down angle θr is θrh (e.g., −20°). Further, the operation indication direction (the virtual world up-down angle θv) is calculated by nonlinearly transforming (making a scaling correction on) the terminal apparatus perspective direction (the terminal apparatus up-down angle θr). In the second example shown in FIG. 15A, the terminal apparatus perspective direction is transformed into the operation indication direction using a nonlinear function, such as a quadratic function, a high-dimensional function, a sine function, or a logarithmic function, in the range of the angle θru to the angle θro. Here, in the second example, the nonlinear function to be used is such that in accordance with the shift from the angle θrh of the horizontal indication direction to the angle θro of the vertically up indication direction or the angle θru of the vertically down indication direction, the slope (scaling factor) incrementally increases to greater than 1 in the range of the angle θru to the angle θro. For example, the nonlinear function to be used is such that: the scaling factor is relatively small near the angle θrh of the horizontal indication direction; and the scaling factor is relatively great near the angle θro of the vertically up indication direction and the angle θru of the vertically down indication direction, and that θro−θrh<90° and θrh−θru<90°. Thus, in the second example, the scaling factor is relatively small near the angle θrh of the horizontal indication direction. This achieves an operation environment where it is likely to set the operation indication direction near the horizontal direction in the virtual world. Also in the second example, even when the user has changed the terminal apparatus perspective direction from the horizontal indication direction (e.g., θr=−20°) to the vertically up indication direction (e.g., θr=+35°), the amount of rotation of the terminal apparatus perspective direction is less than 90° (e.g., 55°). By the scaling correction, however, the amount of rotation of the terminal apparatus perspective direction in real space that is less than 90° is corrected to substantially 90°. This makes it possible to set the operation indication direction to the vertically up and vertically down directions in the virtual world without directing the terminal apparatus perspective direction vertically upward and vertically downward in real space.

In addition, the scaling factor is relatively great near the angle θro of the vertically up indication direction and the angle θru of the vertically down indication direction. Thus, the angle obtained by making a magnification correction on the angle between the horizontal indication direction and the terminal apparatus perspective direction by a predetermined factor is the angle between the horizontal direction in the virtual world and the operation indication direction. Also in the example of FIGS. 15A and 15B, when the terminal apparatus perspective direction is set in a range further in the elevation direction than in the vertically up indication direction (a range in which θr>θro and which is used until the operation indication direction starts to change to the depression direction again; e.g., +35°<θr<+145°), the operation indication direction is set fixedly to the vertically up direction in the virtual world. Also in the example of FIGS. 15A and 15B, when the terminal apparatus perspective direction is set in a range further in the depression direction than in the vertically down indication direction (a range in which θr<θru and which is used until the operation indication direction starts to change to the elevation direction again; e.g., −105°<θr<−75°), the operation indication direction is set fixedly to the vertically down direction in the virtual world. That is, when the user has operated the terminal apparatus 6 so as to direct the terminal apparatus perspective direction in a range further in the elevation direction than in the vertically up indication direction, or in a range further in the depression direction than in the vertically down indication direction, the vertically up direction or the vertically down direction in the virtual world is set as the operation indication direction.

It should be noted that as shown in FIG. 15B, when, as in the first example, the terminal apparatus 6 has further pitch-rotated beyond the range where the operation indication direction is set fixedly to the vertically up direction in the virtual world (e.g., θr>+145°), the terminal apparatus perspective direction is nonlinearly transformed into the operation indication direction using a nonlinear function obtained by converting the slope of the nonlinear function described above to negative (i.e., a slope symmetric with respect to a straight line (e.g., θr=+90°) parallel to the θv-axis and passing through the center of the range where the operation indication direction is set fixedly to the vertically up direction in the virtual world). Then, if the terminal apparatus 6 further pitch-rotates, the terminal apparatus 6 reaches an angle at which the operation indication direction is set to the vertically down direction in the virtual world again (e.g., θr=+255°, i.e., θr=−105°), and at and beyond this angle, the range is one where the operation indication direction described above is set fixedly to the vertically down direction in the virtual world (i.e., −105°<θr<−75°, for example). If the terminal apparatus 6 is thus continuously rotated in the pitch direction, the terminal apparatus perspective direction is transformed into the operation indication direction by looping 360° the transformation of the operation indication direction that is symmetric with respect to a straight line (e.g., θr=+90°) parallel to the θv-axis and passing through the center of the range where the operation indication direction is set fixedly to the vertically up direction in the virtual world.

As a third example, as shown in FIG. 16A, the terminal apparatus perspective direction is transformed (subjected to an offset correction) into the operation indication direction so that the virtual world up-down angle θv is horizontal (0°) when the terminal apparatus up-down angle θr is θrh (e.g., −20°). Further, the operation indication direction (the virtual world up-down angle θv) is calculated by nonlinearly transforming (making a scaling correction on) the terminal apparatus perspective direction (the terminal apparatus up-down angle θr) as in the second example. In the third example shown in FIG. 16A, the terminal apparatus perspective direction is transformed into the operation indication direction using a nonlinear function, such as a quadratic function, a high-dimensional function, a sine function, or a logarithmic function, in the range of the angle θru to the angle θro. Here, in the third example, the nonlinear function to be used is such that in accordance with the shift from the angle θrh of the horizontal indication direction to the angle θro of the vertically up indication direction or the angle θru of the vertically down indication direction, the slope (scaling factor), which is greater than 1, decrementally decreases in the range of the angle θru to the angle θro. For example, the nonlinear function to be used is such that: the scaling factor is relatively great near the angle θrh of the horizontal indication direction; and the scaling factor is relatively small near the angle θro of the vertically up indication direction and the angle θru of the vertically down indication direction, and that θro−θrh<90° and θrh−θru<90°. Thus, in the third example, the scaling factor is relatively great near the angle θrh of the horizontal indication direction. Consequently, the velocity at which the operation indication direction changes from near the horizontal direction in the virtual world is relatively great, and the angle obtained by making a magnification correction on the angle between the horizontal indication direction and the terminal apparatus perspective direction by a predetermined factor is the angle between the horizontal direction in the virtual world and the operation indication direction. Also in the third example, even when the user has changed the terminal apparatus perspective direction from the horizontal indication direction (e.g., θr=−20°) to the vertically up indication direction (e.g., θr=+35°), the amount of rotation of the terminal apparatus perspective direction is less than 90° (e.g., 55°). By the scaling correction, however, the amount of rotation of the terminal apparatus perspective direction in real space that is less than 90° is corrected to substantially 90°. This makes it possible to set the operation indication direction to the vertically up and vertically down directions in the virtual world without directing the terminal apparatus perspective direction vertically upward and vertically downward in real space.

In addition, also in the example of FIGS. 16A and 16B, when the terminal apparatus perspective direction is set in a range further in the elevation direction than in the vertically up indication direction (a range in which θr>θro and which is used until the operation indication direction starts to change to the depression direction again; e.g., +35°<θr<+145°), the operation indication direction is set fixedly to the vertically up direction in the virtual world. Also in the example of FIGS. 16A and 16B, when the terminal apparatus perspective direction is set in a range further in the depression direction than in the vertically down indication direction (a range in which θr<θru and which is used until the operation indication direction starts to change to the elevation direction again; e.g., −105°<θr<−75°), the operation indication direction is set fixedly to the vertically down direction in the virtual world. That is, when the user has operated the terminal apparatus 6 so as to direct the terminal apparatus perspective direction in a range further in the elevation direction than in the vertically up indication direction, or in a range further in the depression direction than in the vertically down indication direction, the vertically up direction or the vertically down direction in the virtual world is set as the operation indication direction.

It should be noted that as shown in FIG. 16B, when, as in the first example, the terminal apparatus 6 has further pitch-rotated beyond the range where the operation indication direction is set fixedly to the vertically up direction in the virtual world (e.g., θr>+145°), the terminal apparatus perspective direction is nonlinearly transformed into the operation indication direction using a nonlinear function obtained by converting the slope of the nonlinear function described above to negative (i.e., a slope symmetric with respect to a straight line (e.g., θr=+90°) parallel to the θv-axis and passing through the center of the range where the operation indication direction is set fixedly to the vertically up direction in the virtual world). Then, if the terminal apparatus 6 further pitch-rotates, the terminal apparatus 6 reaches an angle at which the operation indication direction is set to the vertically down direction in the virtual world again (e.g., θr=+255°, i.e., θr=−105°), and at and beyond this angle, the range is one where the operation indication direction described above is set fixedly to the vertically down direction in the virtual world (i.e., −105°<θr<−75°, for example). If the terminal apparatus 6 is thus continuously rotated in the pitch direction, the terminal apparatus perspective direction is transformed into the operation indication direction by looping 360° the transformation of the operation indication direction that is symmetric with respect to a straight line (e.g., θr=+90°) parallel to the θv-axis and passing through the center of the range where the operation indication direction is set fixedly to the vertically up direction in the virtual world.

As a fourth example, as shown in FIG. 17A, the terminal apparatus perspective direction is transformed (subjected to an offset correction) into the operation indication direction so that the virtual world up-down angle θv is horizontal (0°) when the terminal apparatus up-down angle θr is θrh (e.g., −20°). Further, the terminal apparatus perspective direction (the terminal apparatus up-down angle θr) is transformed (subjected to a scaling correction) into the operation indication direction (the virtual world up-down angle θv) using a function varying depending on the value of the terminal apparatus up-down angle θr. In the fourth example shown in FIG. 17A, a function switch angle θr1 is provided between the angle θru and the angle θrh, and a function switch angle θr2 is provided between the angle θrh and the angle θro. Here, typically, the angle θrh is set to be halfway between the angle θr1 and the angle θr2, and θr2−θrh=θrh−θr1. Then, in the range of the angle θr1 to the angle θr2, the terminal apparatus perspective direction is transformed into the operation indication direction using a linear function whose slope (scaling factor) is relatively small (e.g., slope=1). Further, in the range of the angle θru to the angle θr1 and in the range of the angle θr2 to the angle θro, the terminal apparatus perspective direction is transformed into the operation indication direction using a linear function whose slope (scaling factor) is relatively great (e.g., slope>1). Thus, in the fourth example, the scaling factor is relatively small near the angle θrh of the horizontal indication direction. This achieves an operation environment where it is likely to set the operation indication direction near the horizontal direction in the virtual world. Further, the scaling factor is relatively great near the angle θro of the vertically up indication direction and the angle θru of the vertically down indication direction. Thus, the angle obtained by making a magnification correction on the angle between the horizontal indication direction and the terminal apparatus perspective direction by a predetermined factor is the angle between the horizontal direction in the virtual world and the operation indication direction. Also in the fourth example, even when the user has changed the terminal apparatus perspective direction from the horizontal indication direction (e.g., θr=−20°) to the vertically up indication direction (e.g., θr=+35°), the amount of rotation of the terminal apparatus perspective direction is less than 90° (e.g., 55°). By the scaling correction, however, the amount of rotation of the terminal apparatus perspective direction in real space that is less than 90° is corrected to substantially 90°. This makes it possible to set the operation indication direction to the vertically up and vertically down directions in the virtual world without directing the terminal apparatus perspective direction vertically upward and vertically downward in real space.

In addition, also in the example of FIGS. 17A and 17B, when the terminal apparatus perspective direction is set in a range further in the elevation direction than in the vertically up indication direction (a range in which θr>θro and which is used until the operation indication direction starts to change to the depression direction again; e.g., +35°<θr<+145°), the operation indication direction is set fixedly to the vertically up direction in the virtual world. Also in the example of FIGS. 17A and 17B, when the terminal apparatus perspective direction is set in a range further in the depression direction than in the vertically down indication direction (a range in which θr<θru and which is used until the operation indication direction starts to change to the elevation direction again; e.g., −105°<θr<−75°), the operation indication direction is set fixedly to the vertically down direction in the virtual world. That is, when the user has operated the terminal apparatus 6 so as to direct the terminal apparatus perspective direction in a range further in the elevation direction than in the vertically up indication direction, or in a range further in the depression direction than in the vertically down indication direction, the vertically up direction or the vertically down direction in the virtual world is set as the operation indication direction.

It should be noted that as shown in FIG. 17B, when, as in the first example, the terminal apparatus 6 has further pitch-rotated beyond the range where the operation indication direction is set fixedly to the vertically up direction in the virtual world (e.g., θr>+145°), the terminal apparatus perspective direction is linearly transformed into the operation indication direction using a linear function obtained by converting the slope of the linear function described above to negative (i.e., a slope symmetric with respect to a straight line (e.g., θr=+90°) parallel to the θv-axis and passing through the center of the range where the operation indication direction is set fixedly to the vertically up direction in the virtual world). Then, if the terminal apparatus 6 further pitch-rotates, the terminal apparatus 6 reaches an angle at which the operation indication direction is set to the vertically down direction in the virtual world again (e.g., θr=+255°, i.e., θr=−105°), and at and beyond this angle, the range is one where the operation indication direction described above is set fixedly to the vertically down direction in the virtual world (i.e., −105°<θr<−75°, for example). If the terminal apparatus 6 is thus continuously rotated in the pitch direction, the terminal apparatus perspective direction is transformed into the operation indication direction by looping 360° the transformation of the operation indication direction that is symmetric with respect to a straight line (e.g., θr=+90°) parallel to the θv-axis and passing through the center of the range where the operation indication direction is set fixedly to the vertically up direction in the virtual world.

In addition, at least one of the functions to be used in the fourth example may not need to be a linear function. For example, the functions to be used in the fourth example may be configured using a combination of a linear function and a nonlinear function such as a quadratic function, a high-dimensional function, a sine function, or a logarithmic function, or using only the nonlinear functions.

In addition, in the first through fourth examples, the difference in angle between the angle θro and the angle θrh (e.g., 55°) is, by way of example, the same as the difference in angle between the angle θrh and the angle θru (e.g., 55°). Alternatively, these differences in angle may be set to be different from each other.

In addition, in the first through fourth examples, the vertically up direction in the virtual world is set such that the virtual world up-down angle θv=+90°, and the vertically down direction in the virtual world is set such that the virtual world up-down angle θv=−90°. Alternatively, another angle may be used as the virtual world up-down angle θv indicating the vertically up direction or the vertically down direction in the virtual world into which the terminal apparatus perspective direction set to the vertically up indication direction or the vertically down indication direction is transformed. The virtual world up-down angle θv indicating the vertically up direction or the vertically down direction in the virtual world may be another angle indicating substantially +90° or −90°. Alternatively, at least one of the angles may be set to be different from +90° or −90° in accordance with the setting of the virtual world.

Here, acceleration data or angular velocity data based on a change in the attitude of the terminal apparatus 6 is output from the terminal apparatus 6. Then, the direction of the gravitational acceleration applied to the terminal apparatus 6 can be calculated using the acceleration indicated by the acceleration data. This makes it possible to estimate the attitude of the terminal apparatus 6 with respect to the vertical direction in real space, that is, the x-axis, y-axis, and z-axis directions of the terminal apparatus 6 with respect to the vertical direction. Further, the use of the angular velocity and/or the dynamic acceleration applied to the terminal apparatus 6 using the angular velocity indicated by the angular velocity data and/or the acceleration indicated by the acceleration data, makes it possible to estimate a change in the attitude of the terminal apparatus from its initial attitude in real space (i.e., changes in the x-axis, y-axis, and z-axis directions) using the angular velocity and/or the dynamic acceleration. A scaling correction as described above may be made on the thus estimated attitude of the terminal apparatus 6 (the x-axis, y-axis, and z-axis directions), whereby the terminal apparatus perspective direction and the terminal apparatus up direction (the y-axis positive direction) that are subjected to the scaling correction are obtained, and the attitude and the moving direction of the player object Po and the attitude and the position of the virtual camera are set using the corrected terminal apparatus perspective direction and terminal apparatus up direction.

Next, the information processing performed by the game system 1 is described in detail. First, with reference to FIG. 18, main data used in the information processing is described. It should be noted that FIG. 18 is a diagram showing an example of main data and programs that are stored in the external main memory 12 and/or the internal main memory 35 (hereinafter, these two main memories will be collectively referred to simply as a "main memory") of the game apparatus body 5.

Figure 18:
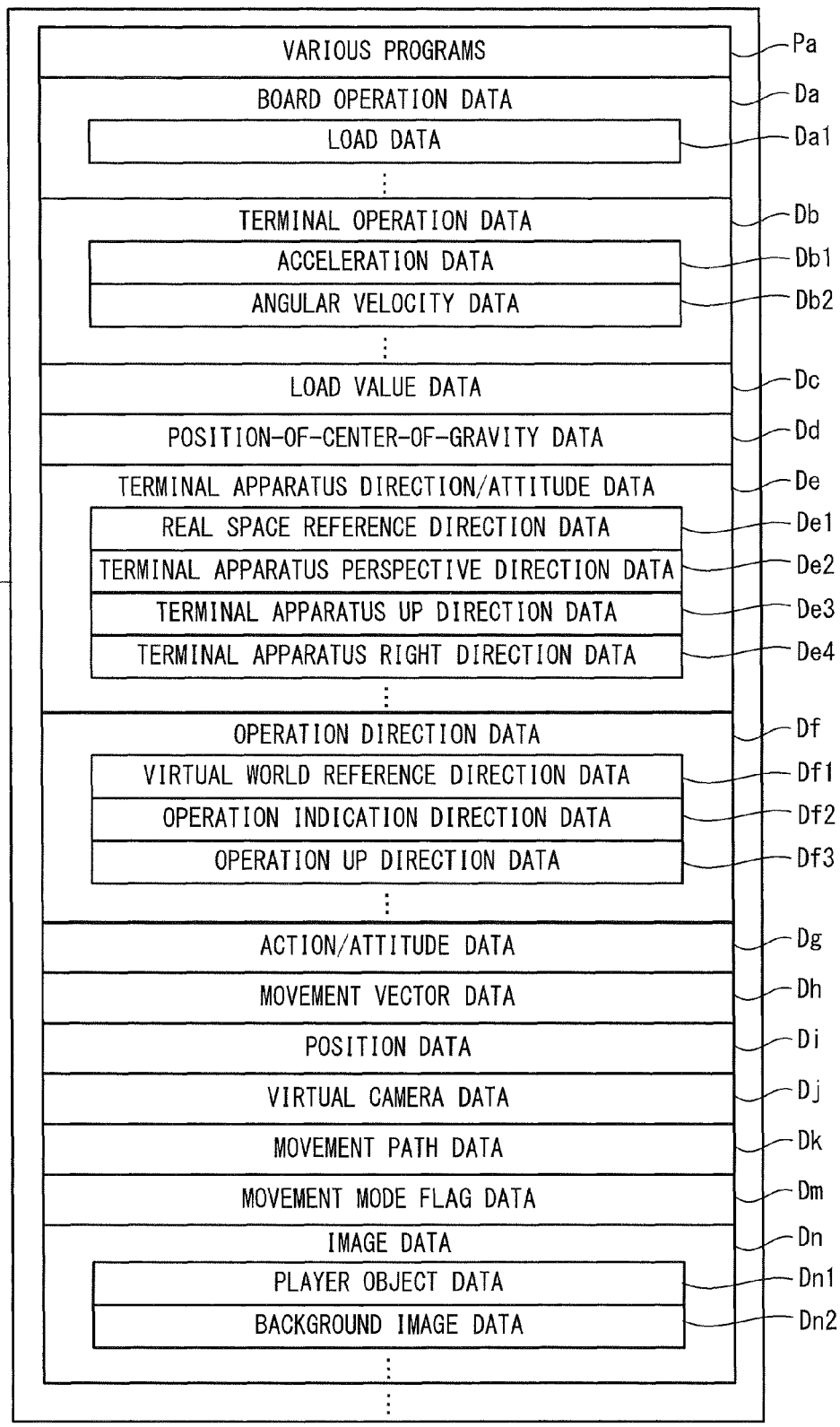
FIG. 18 is a diagram showing a non-limiting example of data and programs that are stored in a main memory of the game apparatus body 5 of FIG. 1.

As shown in FIG. 18, in a data storage area of the main memory, the following are stored: board operation data Da; terminal operation data Db; load value data Dc; position-of-center-of-gravity data Dd; terminal apparatus direction/attitude data De; operation direction data Df; action/attitude data Dg; movement vector data Dh; position data Di; virtual camera data Dj; movement path data Dk; movement mode flag data Dm; image data Dn; and the like. It should be noted that the main memory appropriately stores, as well as the data shown in FIG. 18, data used for the game processing, such as image data of various objects displayed on the monitor 2 and the LCD 61, and sound data used for the game. Further, in a program storage area of the main memory, various programs Pa included in the information processing program are stored.

As the board operation data Da, a series of operation information (board operation data) transmitted as transmission data from the board-type controller 9 is stored, and updated to the latest board operation data. For example, the board operation data Da includes load data Da1 and the like. The load data Da1 is data indicating load values detected by the load sensors 94a through 94d of the board-type controller 9.

As the terminal operation data Db, a series of operation information (terminal operation data) transmitted as transmission data from the terminal apparatus 6 is stored, and updated to the latest terminal operation data. For example, the terminal operation data Db includes acceleration data Db1, angular velocity data Db2, and the like. The acceleration data Db1 is data indicating an acceleration (an acceleration vector) detected by the acceleration sensor 603. For example, the acceleration data Db1 represents a three-dimensional acceleration vector whose components are accelerations in the three axial (x-axis, y-axis, and z-axis) directions shown in FIG. 3. In another embodiment, the acceleration data Db1 may represent accelerations in given one or more directions. The angular velocity data Db2 is data representing an angular velocity detected by the gyro sensor 604. For example, the angular velocity data Db2 represents angular velocities about the three axes (x-axis, y-axis, and z-axis) shown in FIG. 3. In another example, the angular velocity data Db2 may represent angular velocities about given one or more axes.

It should be noted that the game apparatus body 5 sequentially receives the data (e.g., the data indicating the detected load values, the acceleration, and the angular velocity) included in the operation information transmitted from the controller 7, the board-type controller 9, and the terminal apparatus 6 at predetermined intervals (e.g., at intervals of 1/200 seconds). For example, the received data is sequentially stored in the main memory by the I/O processor 31. In a processing flow described later, the CPU 10 reads the latest board operation data and the latest terminal operation data from the main memory every frame period (e.g., 1/60 seconds), to thereby update the board operation data Da and the terminal operation data Db.

In addition, the operation information transmitted from the controller 7, the board-type controller 9, and the terminal apparatus 6 at the predetermined intervals may be temporarily stored in the buffer (not shown) included in the controller communication module 19 or the terminal communication module 28. In this case, the data stored in the buffer is read every frame period, and the board operation data Da (e.g., the load data Da1) or the terminal operation data Db (e.g., the acceleration data Db1 and the angular velocity data Db2) in the main memory is updated for use. At this time, the cycle of receiving the operation information is different from the processing cycle, and therefore, a plurality of pieces of information received at a plurality of times are stored in the buffer. The processing may be performed using only the latest operation information among the plurality of pieces of operation information received at the plurality of times. Alternatively, the processing may be performed using a representative value (e.g., an average value) of the pieces of operation information received at the plurality of times. Yet alternatively, the processing may be performed multiple times so as to correspond to the number of the pieces of operation information received at the plurality of times.

The load value data Dc is an aggregate of data indicating the load values detected by the board-type controller 9. For example, the load value data Dc is an aggregate of data indicating the sum of the load values (the total load value) detected by the load sensors 94a through 94d. Specifically, the load value data Dc is an array of data indicating the total load values within a predetermined period that are chronologically calculated, and the data indicating the total load values is chronologically stored in the elements of the array.

The position-of-center-of-gravity data Dd is an aggregate of data indicating the position of the center of gravity of the load applied to the board-type controller 9. For example, the position-of-center-of-gravity data Dd is an aggregate of data indicating the position of the center of gravity calculated, using a predetermined formula, from the load values detected by the load sensors 94a through 94d. Specifically, the position-of-center-of-gravity data Dd is an array of data indicating the position of the center of gravity within a predetermined period that are chronologically calculated, and the data indicating the position of the center of gravity is chronologically stored in the elements of the array.

The terminal apparatus direction/attitude data De includes real space reference direction data De1, terminal apparatus perspective direction data De2, terminal apparatus up direction data De3, terminal apparatus right direction data De4, and the like. The real space reference direction data De1 is data indicating a reference direction (the attitude; a real space reference direction) of the terminal apparatus 6 in real space that is subjected to a scaling correction. The terminal apparatus perspective direction data De2 is data indicating the current perspective direction of the terminal apparatus 6 in real space (the z-axis positive direction; the terminal apparatus perspective direction) that is subjected to a scaling correction. The terminal apparatus up direction data De3 is data indicating the current up direction of the terminal apparatus 6 in real space (the y-axis positive direction; the terminal apparatus up direction) that is subjected to a scaling correction. The terminal apparatus right direction data De4 is data indicating the current right direction of the terminal apparatus 6 in real space (the x-axis positive direction; the terminal apparatus right direction) that is subjected to a scaling correction. For example, the real space reference direction data De1, the terminal apparatus perspective direction data De2, the terminal apparatus up direction data De3, and the terminal apparatus right direction data De4 are calculated on the basis of the acceleration data Db1 and the angular velocity data Db2. The method of calculating the real space reference direction, the terminal apparatus perspective direction, the terminal apparatus up direction, and the terminal apparatus right direction will be described later.

The operation direction data Df includes virtual world reference direction data Df1, operation indication direction data Df2, operation up direction data Df3, and the like. The virtual world reference direction data Df1 is data indicating the virtual world reference direction set in the virtual world. The operation indication direction data Df2 is data indicating an operation indication direction currently indicated in the virtual world by the user. The operation up direction data Df3 is data indicating an operation up direction currently indicated in the virtual world by the user. The method of calculating the virtual world reference direction, the operation indication direction, and the operation up direction will be described later.

The action/attitude data Dg is data indicating the action and the attitude of the player object Po in the virtual world. The movement vector data Dh is data indicating the moving velocity and the moving direction of the player object Po in the virtual world (e.g., data indicating the movement vector in the virtual world). The position data Di is data indicating the position of the player object Po in the virtual world. The virtual camera data Dj is data concerning virtual cameras set in the virtual world. For example, the virtual camera data Dj includes data concerning a first virtual camera for generating a game image to be displayed on the LCD 61 of the terminal apparatus 6, and data concerning a second virtual camera for generating a game image to be displayed on the monitor 2. The movement path data Dk is data indicating the path of the player object Po having moved in the virtual world.

The movement mode flag data Dm is data indicating an action mode flag that is set in accordance with the action (e.g., swimming style) set for the player object Po. As an example, when the user has taken action so as to perform leg bending and extending on the board-type controller 9, the action of the player object Po is set to the action of swimming under the sea by dolphin-kicking, and the action mode flag is set to on.

The image data Dn includes player object data Dn1, background image data Dn2, and the like. The player object data Dn1 is data for placing the player object Po in the virtual world, to generate a game image. The background image data Dn2 is data for placing a background in the virtual world to generate a game image.

Figure 19:
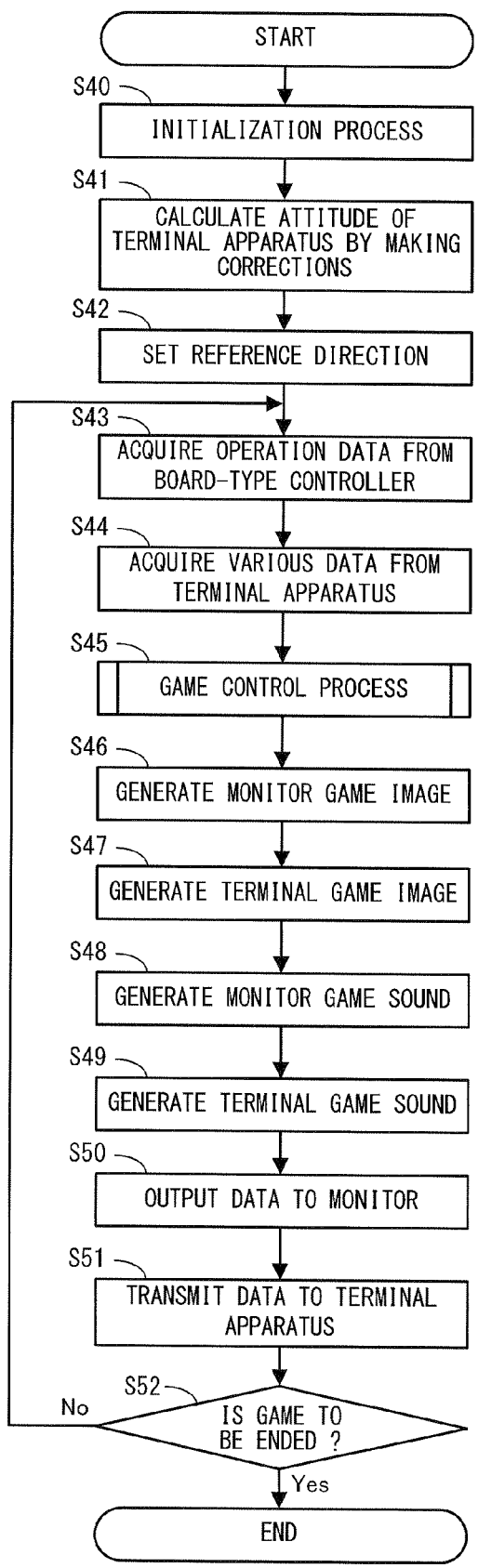
FIG. 19 is a flow chart showing a non-limiting example of information processing performed by the game apparatus body 5 of FIG. 1.
Figure 20:
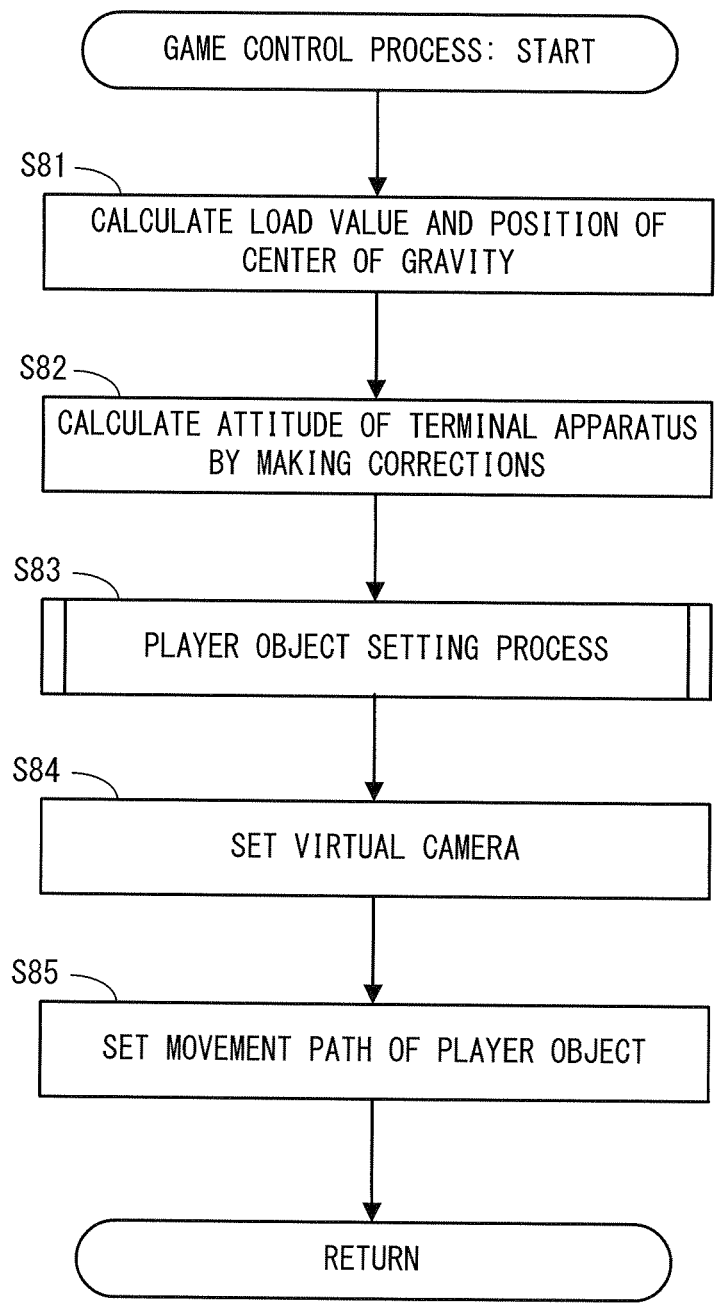
FIG. 20 is a subroutine flow chart showing a non-limiting example of a game control process in step 45 in FIG. 19.
Figure 21:
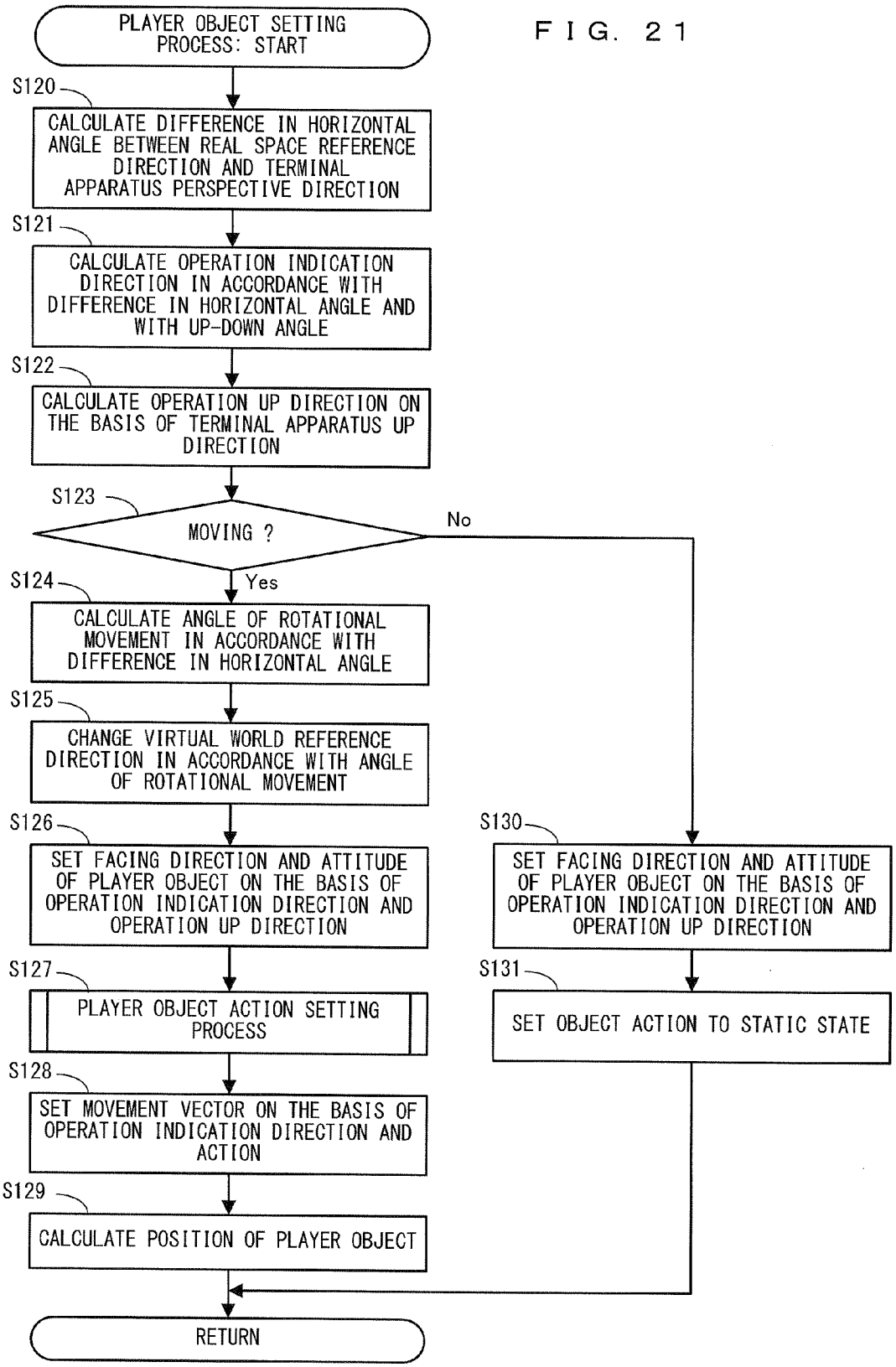
FIG. 21 is a subroutine flow chart showing a non-limiting example of a player object setting process in step 83 in FIG. 20.
Figure 22:
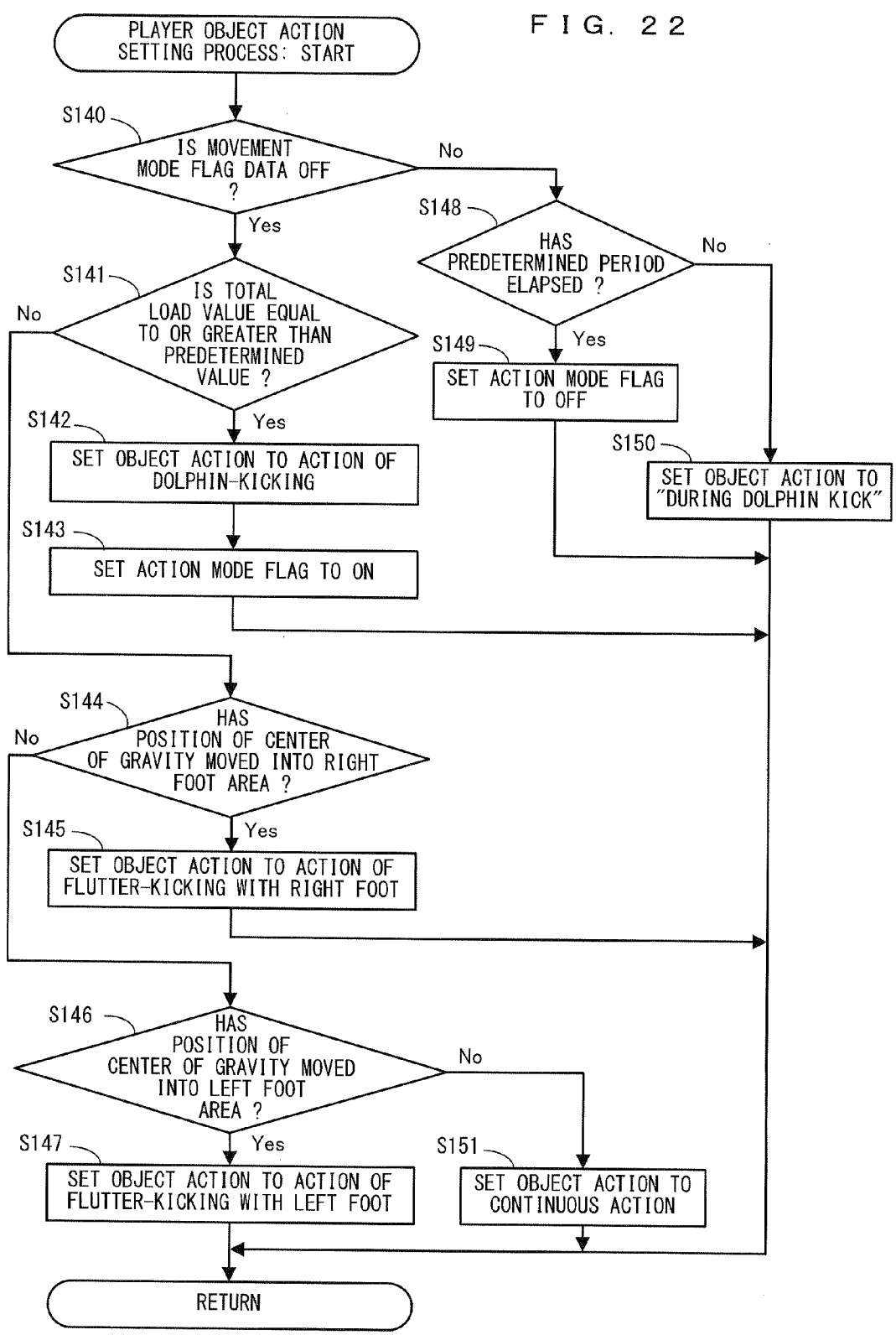
FIG. 22 is a subroutine flow chart showing a non-limiting example of a player object action setting process in step 127 in FIG. 21.
Figure 24:
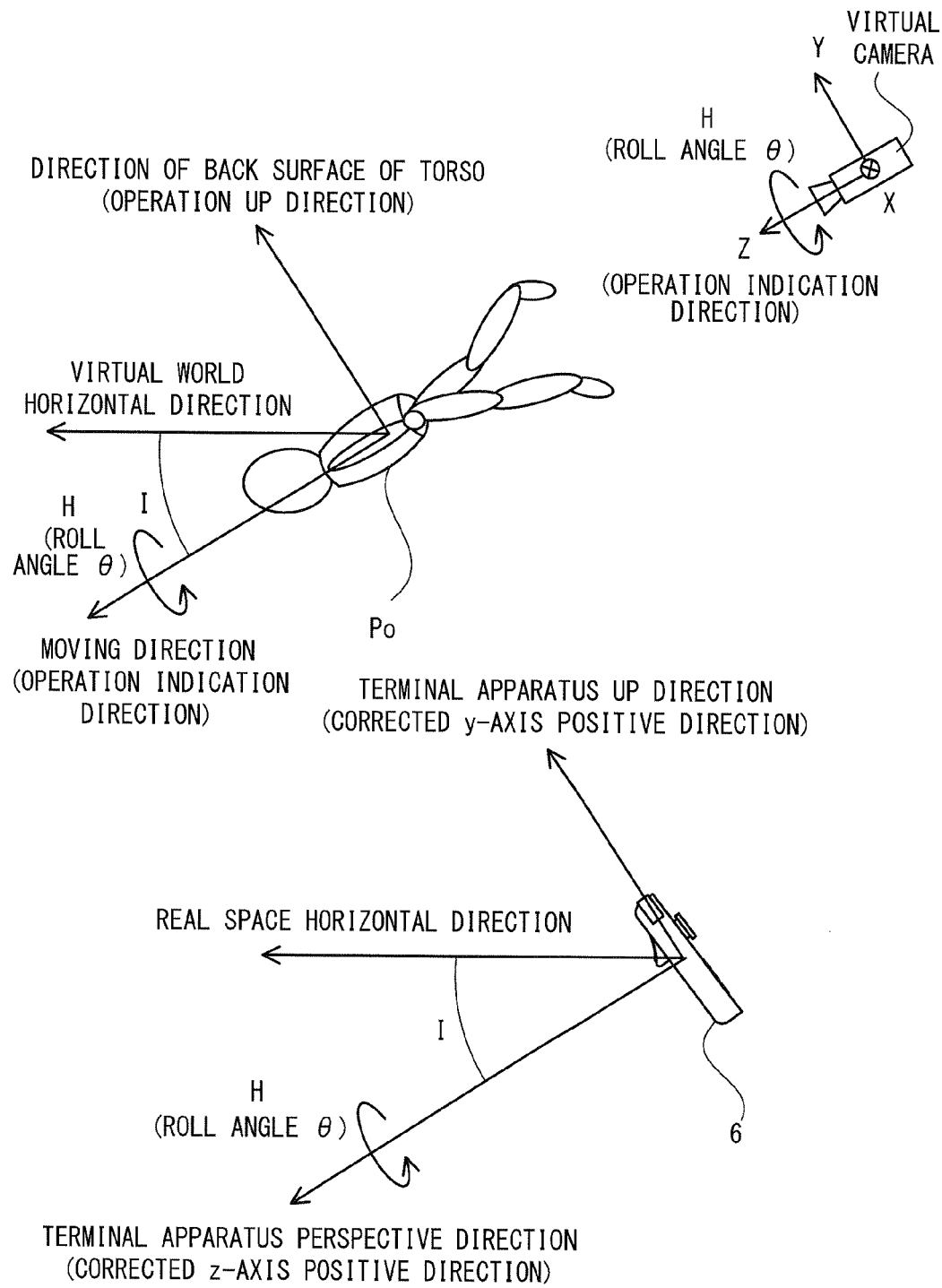
FIG. 24 is a diagram illustrating non-limiting examples of the relationship between the terminal apparatus perspective direction projected onto a vertical plane in real space and the operation indication direction projected onto a vertical plane in the virtual world; and a rotational movement corresponding to a terminal apparatus up direction (a roll angle).

Next, with reference to FIGS. 19 through 23, the information processing performed by the game apparatus body 5 is described in detail. It should be noted that FIG. 19 is a flow chart showing an example of the information processing performed by the game apparatus body 5. FIG. 20 is a subroutine flow chart showing an example of a game control process in step 45 in FIG. 19. FIG. 21 is a subroutine flow chart showing an example of a player object setting process in step 83 in FIG. 20. FIG. 22 is a subroutine flow chart showing an example of a player object action setting process in step 127 in FIG. 21. FIG. 23 is a diagram illustrating an example of the relationships among: the real space reference direction and the terminal apparatus perspective direction that are projected onto a horizontal plane in real space; and the virtual world reference direction and the operation indication direction that are projected onto a horizontal plane in the virtual world. FIG. 24 is a diagram illustrating examples of: the relationship between the terminal apparatus perspective direction projected onto a vertical plane in real space and the operation indication direction projected onto a vertical plane in the virtual world; and a rotational movement corresponding to the terminal apparatus up direction (a roll angle). Here, in the flow charts shown in FIGS. 19 through 22, descriptions are given mainly of, among the processes of the processing, a process where the player object Po is displayed so as to move in accordance with the operation performed by the user using the terminal apparatus 6 and the board-type controller 9, while detailed descriptions of the other processes not directly related to the exemplary embodiment are omitted. Further, in FIGS. 19 through 22, each step performed by the CPU 10 is abbreviated as "S".

When the game apparatus body 5 has been powered on, the CPU 10 of the game apparatus body 5 executes a boot program stored in the ROM/RTC 13 to initialize each unit such as the main memory. Then, the information processing program stored in the optical disk 4 is loaded to the main memory, and the CPU 10 starts to execute the program. The flow charts shown in FIGS. 19 through 22 show processes to be performed after the above processes are completed.

Referring to FIG. 19, the CPU 10 performs an initialization process (step 40), and proceeds to the subsequent step. For example, in the initialization process in step 40, the CPU 10 constructs the virtual world, places at initial positions the player object Po and objects that appear in a game space, and sets the initial values of various parameters used for the game processing.

Next, the CPU 10 calculates, on the basis of data transmitted from the terminal apparatus 6, the attitude and the motion of the terminal apparatus 6 that are subjected to an offset correction and a scaling correction (step 41), and proceeds to the subsequent step. A description is given below of an example where the CPU 10 makes a scaling correction.

The terminal apparatus 6 repeatedly transmits data as described above to the game apparatus body 5. In the game apparatus body 5, the terminal communication module 28 sequentially receives the data described above, and the I/O processor 31 sequentially stores terminal operation data, camera image data, and microphone sound data in the main memory. In step 41 described above, the CPU 10 reads the most recent terminal operation data from the main memory, to thereby update the acceleration data Db1 and the angular velocity data Db2.

Next, the CPU 10 makes a scaling correction on the attitude and the motion of the terminal apparatus 6 in real space that are obtained from the acceleration data Db1 and the angular velocity data Db2, to thereby update the terminal apparatus direction/attitude data De using data indicating the attitude and the motion of the terminal apparatus 6 subjected to the scaling correction. For example, the CPU 10 can calculate the amount of rotation (the amount of change in the direction) of the terminal apparatus 6 in real space per unit time, using the angular velocity indicated by the angular velocity data Db2. Further, in the state where the terminal apparatus 6 is substantially stationary (in a static state) in real space, the acceleration applied to the terminal apparatus 6 is the gravitational acceleration. This makes it possible to calculate the direction of gravity applied to the terminal apparatus 6 (i.e., the attitude of the terminal apparatus 6 with respect to the vertical direction in real space), using the acceleration indicated by the acceleration data Db1. This enables the CPU 10 to calculate the attitude and the motion of the terminal apparatus 6 in real space on the basis of the acceleration indicated by the acceleration data Db1 and the angular velocity indicated by the angular velocity data Db2. It should be noted that in the following descriptions, the x-axis positive direction of the terminal apparatus 6 in real space is represented by a vector Vax having a length of 1; the y-axis positive direction is represented by a vector Vay having a length of 1; and the z-axis positive direction is represented by a vector Vaz having a length of 1.

Next, the CPU 10 makes an offset correction and a scaling correction on the attitude of the terminal apparatus 6 in real space. First, the CPU 10 calculates the angle of the vector Vaz with respect to a horizontal plane in real space, and transforms the angle on the basis of a correction function set in advance. For example, in the case of the linear function of the first example shown in FIG. 14A, if the vector Vaz is directed 20° downward relative to the horizontal plane in real space (i.e., the terminal apparatus up-down angle θr=−20°), the angle of the direction of the vector Vaz is transformed into 0°. Further, if the vector Vaz is directed 35° upward relative to the horizontal plane in real space (i.e., the terminal apparatus up-down angle θr=+35°), the angle of the direction of the vector Vaz is transformed into 90°. Then, an offset correction and a scaling correction are made by changing the length of a vertical direction component vector Vgz, which is a vertical direction component of the vector Vaz, to thereby update the vertical direction component vector Vgz so that the direction of the vector Vaz is at the angle after the transformation with respect to the horizontal plane in real space. Then, to set the length of the vector Vaz to 1, the length of a horizontal direction component vector Vhz of the vector Vaz is updated to the length of the horizontal direction component vector Vhz calculated by the following formula. Then, the corrected horizontal direction component vector Vhz is added to the corrected vertical direction component vector Vgz, whereby a corrected vector Vazc is obtained.

$$\text{length of } Vhz = \sqrt{1-(\text{length of } Vgz)^2}$$

Next, the CPU 10 newly calculates a vector Vaxc on the basis of the exterior product of the corrected vector Vazc and the vector Vay. Then, the CPU 10 newly calculates a vector Vayc on the basis of the exterior product of the newly calculated vector Vaxc and vector Vazc. Consequently, the vectors Vax, Vay, and Vaz indicating the attitude of the terminal apparatus 6 in real space are subjected to an offset correction and a scaling correction to obtain vectors Vaxc, Vayc, and Vazc, respectively. Then, the CPU 10 updates the terminal apparatus right direction data De4, the terminal apparatus up direction data De3, and the terminal apparatus perspective direction data De2, using the vectors Vaxc, Vayc, and Vazc subjected to the offset correction and the scaling correction, as the terminal apparatus right direction, the terminal apparatus up direction, and the terminal apparatus perspective direction, respectively.

Next, the CPU 10 sets a reference direction (step 42), and proceeds to the subsequent step. For example, the CPU 10 sets, as a reference direction (initial attitude) in real space, the terminal apparatus perspective direction indicated by the terminal apparatus perspective direction data De2, to thereby update the real space reference direction data De1 using data indicating the terminal apparatus perspective direction. In addition, in step 42 described above, the CPU calculates, as a reference direction (initial attitude) in the virtual world, the current direction of the player object Po in which it is directed in the virtual world (e.g., the direction that serves as the moving direction of the player object Po if it moves as it is), to thereby update the virtual world reference direction data Df1 using data indicating the calculated reference direction in the virtual world.

It should be noted that the initial attitude of the terminal apparatus 6 may be calculated on the basis of the acceleration indicated by the acceleration data Db1, or may be calculated on the basis of the direction of magnetism detected by the magnetic sensor 602. Alternatively, as a result of the user performing a predetermined operation in the state where the terminal apparatus 6 is in a specific attitude, the specific attitude when the predetermined operation has been performed may be used as the initial attitude. It should be noted that the initial attitude needs to be calculated if the attitude of the terminal apparatus 6 is calculated as an absolute attitude with respect to a predetermined direction in real space. Timing may be set such that the setting of the initial attitude, that is, step 42 described above, is performed at the start of the game, or is performed in accordance with a predetermined operation performed by the user using the terminal apparatus 6 (e.g., the operation of pressing a predetermined operation button 64).

Subsequent to step 42 described above, the process in step 43 is performed. Thereafter, the processing loop of a series of processes 43 through 52 is performed every predetermined period (one frame period) and repeated.

In step 43, the CPU 10 acquires board operation data transmitted from the board-type controller 9, and proceeds to the subsequent step. Here, the board-type controller 9 repeatedly transmits the board operation data to the game apparatus body 5. Accordingly, in the game apparatus body 5, the controller communication module 19 sequentially receives the board operation data, and the I/O processor 31 sequentially stores the received board operation data in the main memory. The interval of transmission of the board operation data from the board-type controller 9 may be shorter than the game processing period (one frame period), and it is 1/200 seconds, for example. In step 43, the CPU 10 reads the latest board operation data from the main memory, to thereby update the board operation data Da. The board operation data includes data indicating identification information of the load sensors 94a through 94d, and data indicating the load values detected by the load sensors 94a through 94d. The load data Da1 is updated using the data identified by the identification information.

Next, the CPU 10 acquires various data transmitted from the terminal apparatus 6 (step 44), and proceeds to the subsequent step. The terminal apparatus 6 repeatedly transmits the data to the game apparatus body 5. Accordingly, in the game apparatus body 5, the terminal communication module 28 sequentially receives the data, and the codec LSI 27 sequentially performs a decompression process on the camera image data and the microphone sound data. Then, the I/O processor 31 sequentially stores the terminal operation data, the camera image data, and the microphone sound data in the main memory. In step 44 described above, the CPU 10 reads the latest terminal operation data from the main memory, to thereby update the acceleration data Db1 and the angular velocity data Db2.

Next, the CPU 10 performs a game control process (step 45), and proceeds to the subsequent step. The game control process is the process of, for example, causing the player object Po in the virtual world to move in accordance with a game operation performed by the user, to thereby advance the game. In this exemplary game, the user is allowed to play various games using the terminal apparatus 6 and the board-type controller 9. With reference to FIG. 20, a description is given below of the game control process in step 45 described above.

In FIG. 20, the CPU 10 calculates a load value and the position of the center of gravity (step 81), and proceeds to the subsequent step. For example, the CPU 10 calculates a total load value by summing up the detected load values indicated by the load data Da1, to thereby update the latest data in the chronological data array of the load value data Dc, using the data indicating the calculated total load value. Specifically, the load data Da1 indicates the latest load values detected by the load sensors 94a through 94d, and therefore, the total load value is calculated by summing up the detected load values. Further, the CPU 10 calculates the position of the center of gravity using the detected load values indicated by the load data Da1, to thereby update the latest data in the chronological data array of the position-of-center-of-gravity data Dd using data indicating the position of the center of gravity. A description is given below of an example of the method of calculating the position of the center of gravity.

The position of the center of gravity described above is the position of the center of gravity of the load applied to the platform 9a of the board-type controller 9, and is defined by the load values detected by the load sensors 94a through 94d (see FIG. 6). For example, the position of the center of gravity is represented by a coordinate value based on a predetermined coordinate system corresponding to positions on the platform 9a of the board-type controller 9 (e.g., an X1-Y1 coordinate system where: the origin is the center of the platform 9a; an X1-axis direction is the long side direction of the platform 9a; and a Y1-axis direction is the short side direction). Then, in the case where: the load value detected by the load sensor 94a is a; the load value detected by the load sensor 94b is b; the load value detected by the load sensor 94c is c; and the load value detected by the load sensor 94d is d, the X1-axis coordinate value (X1) and the Y1-axis coordinate value (Y1) of the center of gravity can be calculated using the following formula.

$$X1=((a+c)-(b+d))\times m$$

$$Y1=((c+d)-(a+b))\times n$$

(where m and n are constants defined in advance)

The thus calculated total load value and position of the center of gravity change in accordance with the action taken by the user and the shifting of their weight (the attitude) on the board-type controller 9. As an example, when the user has repeatedly stepped on the board-type controller 9, the total load value varies in accordance with the step cycle, and the position of the center of gravity changes so as to shift, in accordance with the step cycle, back and forth between the position on which the user places their left foot and the position on which the user places their right foot. As another example, when the user has repeatedly performed leg bending and extending on the board-type controller 9, the total load value varies in accordance with the leg bending and extending cycle. Changes in the position of the center of gravity, however, are relatively reduced.

Next, the CPU 10 calculates, on the basis of data transmitted from the terminal apparatus 6, the attitude and the motion of the terminal apparatus 6 that are subjected to an offset correction and a scaling correction (step 82), and proceeds to the subsequent step. For example, the CPU 10 calculates the attitude and the motion of the terminal apparatus 6 in real space (the vector Vax, the vector Vay, and the vector Vaz) on the basis of the acceleration indicated by the acceleration data Db1 and the angular velocity indicated by the angular velocity data Db2. Then, the CPU 10 makes an offset correction and a scaling correction on the attitude and the motion of the terminal apparatus 6 in real space to calculate the corrected attitude and motion of the terminal apparatus 6, to thereby update the terminal apparatus perspective direction data De2, the terminal apparatus up direction data De3, and the terminal apparatus right direction data De4.

Here, the CPU 10 can calculate the amount of rotation (the amount of change in the direction) of the terminal apparatus 6 in real space per unit time, using the angular velocity indicated by the angular velocity data Db2. Further, in the state where the terminal apparatus 6 is substantially stationary (in a static state) in real space, the acceleration applied to the terminal apparatus 6 is the gravitational acceleration. This makes it possible to calculate the direction of gravity applied to the terminal apparatus 6 (i.e., the attitude of the terminal apparatus 6 with respect to the vertical direction in real space, and the x-axis, y-axis, and z-axis directions with respect to the vertical direction; the directions of the vectors Vax, Vay, and Vaz), using the acceleration indicated by the acceleration data Db1. This enables the CPU 10 to calculate a change in the direction and the attitude of the terminal apparatus 6 on the basis of the acceleration indicated by the acceleration data Db1 and the angular velocity indicated by the angular velocity data Db2.

It should be noted that in the exemplary embodiment, a change in the direction and the attitude of the terminal apparatus 6 are calculated on the basis of the data indicating the acceleration and the angular velocity that are detected by the terminal apparatus 6. Alternatively, in another embodiment, a change in the direction and the attitude of the terminal apparatus 6 may be calculated using any one piece of data or three or more pieces of data. For example, the magnetic sensor 602 included in the terminal apparatus 6 detects a geomagnetism applied to the terminal apparatus 6. This makes it possible to calculate a predetermined orientation with respect to the terminal apparatus 6 (i.e., the attitude of the terminal apparatus 6 with respect to the predetermined orientation) on the basis of the direction of the geomagnetism applied to the terminal apparatus 6. Even when a magnetic field is generated in addition to the geomagnetism in the real space where the terminal apparatus 6 is located, it is possible to calculate the amount of rotation of the terminal apparatus 6. This enables the CPU 10 to calculate a change in the direction and the attitude of the terminal apparatus 6 using at least one of the data indicating the acceleration, the data indicating the angular velocity, and the data indicating the magnetism, which are detected by the terminal apparatus 6.

Any calculation method may be used to calculate the attitude of the terminal apparatus 6. For example, a calculation method is possibly used of correcting the attitude of the terminal apparatus 6, which is calculated on the basis of the angular velocity indicated by the angular velocity data Db2, using the acceleration indicated by the acceleration data Db1 and the direction of the magnetism detected by the magnetic sensor 602.

Specifically, the CPU 10 first calculates the attitude of the terminal apparatus 6 on the basis of the angular velocity indicated by the angular velocity data Db2. Any method may be used to calculate the attitude of the terminal apparatus 6 from the angular velocity. For example, the attitude of the terminal apparatus 6 may be calculated using the most recent attitude (the most recently calculated x-axis, y-axis, and z-axis directions) and the current angular velocity (the angular velocity currently acquired in step 43 in the processing loop). The CPU 10 causes the most recent x-axis, y-axis, and z-axis directions to rotate about the axes along the respective directions at the current angular velocity for a unit time, to thereby calculate new x-axis, y-axis, and z-axis directions. It should be noted that, as described above, the yet-to-be-corrected initial attitude and the corrected initial attitude of the terminal apparatus 6 are defined in steps 41 and 42 described above. Thus, when the attitude of the terminal apparatus 6 is calculated from the angular velocity, the CPU 10 can calculate the current attitude of the terminal apparatus 6 with respect to the yet-to-be-corrected initial attitude and the corrected initial attitude of the terminal apparatus 6 that have been calculated first.

Next, the CPU 10 corrects the attitude of the terminal apparatus 6 (the x-axis, y-axis, and z-axis directions), calculated on the basis of the angular velocity, using the acceleration indicated by the acceleration data Db1. Specifically, the CPU 10 calculates the attitude of the terminal apparatus 6 (the x-axis, y-axis, and z-axis directions) on the basis of the acceleration indicated by the acceleration data Db1. Here, in the state where the terminal apparatus 6 is substantially stationary, the acceleration applied to the terminal apparatus 6 is the gravitational acceleration. Accordingly, in this state, it is possible to calculate the direction of the gravitational acceleration (the direction of gravity) using the direction of the acceleration indicated by the acceleration data Db1. This makes it possible to calculate the facing direction of the terminal apparatus 6 relative to the direction of gravity (the x-axis, y-axis, and z-axis directions with respect to the direction of gravity).

When the attitude of the terminal apparatus 6 based on the acceleration is calculated, the CPU 10 corrects the attitude based on the angular velocity, using the attitude based on the acceleration. Specifically, the CPU 10 makes a correction to approximate at a predetermined rate the attitude of the terminal apparatus 6 (the x-axis, y-axis, and z-axis directions) calculated on the basis of the angular velocity to the attitude of the terminal apparatus 6 (the x-axis, y-axis, and z-axis directions) calculated on the basis of the acceleration. The predetermined rate may be a fixed value set in advance, or may be set in accordance with, for example, the acceleration indicated by the acceleration data Db1. Further, the attitude of the terminal apparatus 6 calculated on the basis of the acceleration cannot be calculated in the direction of rotation about the direction of gravity, and therefore, the CPU 10 may not make a correction on the attitude in this rotation direction. When correcting, on the basis of the direction of magnetism detected by the magnetic sensor 602, the attitude of the terminal apparatus 6 calculated on the basis of the angular velocity, the CPU 10 may approximate at a predetermined rate the attitude of the terminal apparatus 6 calculated on the basis of the angular velocity to the attitude of the terminal apparatus 6 calculated on the basis of the direction of magnetism detected by the magnetic sensor 602. This enables the CPU 10 to accurately calculate the attitude of the terminal apparatus 6. It should be noted that the correction of the attitude described above based on the acceleration, the angular velocity, and the direction of magnetism may be made before or after the offset correction and the scaling correction. The method of the offset correction and the scaling correction is similar to that in the process of step 41 described above, and therefore is not described in detail here.

Next, the CPU 10 sets the player object Po (step 83), and proceeds to the subsequent step. With reference to FIG. 21, a description is given below of the player object setting process in step 83 described above.

Referring to FIG. 21, the CPU 10 calculates the difference in horizontal angle between the real space reference direction and the terminal apparatus perspective direction (step 120), and proceeds to the subsequent step. Here, the difference in horizontal angle described above is the difference in angle (e.g., the angle F shown in FIG. 23) obtained by projecting onto a horizontal plane the difference in angle between the corrected real space reference direction and terminal apparatus perspective direction in real space, and indicates the angle by which the terminal apparatus perspective direction of the terminal apparatus 6 (the z-axis positive direction) has changed from the initial attitude of the terminal apparatus 6 with respect to the vertical direction in real space. For example, the CPU 10 calculates the difference in horizontal angle described above using the real space reference direction indicated by the real space reference direction data De1 and the terminal apparatus perspective direction indicated by the terminal apparatus perspective direction data De2.

Next, the CPU 10 calculates the operation indication direction relative to the virtual world reference direction, in accordance with the difference in horizontal angle and the attitude (up-down angle) of the terminal apparatus 6 in the up-down direction (step 121), and proceeds to the subsequent step. For example, as shown in FIG. 23, the CPU 10 calculates the operation indication direction in the virtual world, using the virtual world reference direction indicated by the virtual world reference direction data Df1, such that the difference in angle obtained by projecting the virtual world reference direction and the operation indication direction onto a horizontal plane in the virtual world is the difference in horizontal angle described above, and the virtual world reference direction and the operation indication direction have the same positional relationship (i.e., the positional relationships are such that when the terminal apparatus perspective direction has rotated to the left relative to the real space reference direction, also the operation indication direction rotates to the left relative to the virtual world reference direction) (the angle F shown in FIG. 23). Further, as shown in FIG. 24, the CPU 10 calculates the operation indication direction in the virtual world, using the terminal apparatus perspective direction indicated by the terminal apparatus perspective direction data De2, such that the difference in angle between the horizontal direction in the virtual world and the operation indication direction is the difference in angle between the horizontal direction in real space and the terminal apparatus perspective direction, and the horizontal direction in the virtual world and the operation indication direction have the same positional relationship (i.e., when the terminal apparatus perspective direction is directed downward relative to the horizontal direction in real space, also the operation indication direction is directed downward relative to the horizontal direction in the virtual world) (the angle I shown in FIG. 24). Then, the CPU 10 updates the operation indication direction data Df2 using the calculated operation indication direction.

Next, the CPU 10 calculates the operation up direction in the virtual world on the basis of the terminal apparatus up direction of the terminal apparatus 6 (step 122), and proceeds to the subsequent step. For example, the CPU 10 calculates the operation up direction using the terminal apparatus perspective direction indicated by the terminal apparatus perspective direction data De2, the terminal apparatus up direction indicated by the terminal apparatus up direction data De3, and the operation indication direction indicated by the operation indication direction data Df2. Specifically, as shown in FIG. 24, the CPU 10 calculates the operation up direction such that the operation up direction in the virtual world with respect to the operation indication direction is the same as the corrected terminal apparatus up direction in real space with respect to the terminal apparatus perspective direction. Here, the terminal apparatus perspective direction and the terminal apparatus up direction are set by making an offset correction and a scaling correction on directions in real space with respect to the direction of gravity (the vertical direction). Meanwhile, the operation indication direction is set as a direction in the virtual world, and therefore can be handled also as a direction with respect to the direction of gravity set in the virtual world. Thus, the use of the terminal apparatus perspective direction, the terminal apparatus up direction, and the operation indication direction makes it possible to calculate the operation up direction in the virtual world corresponding to the terminal apparatus up direction in real space. Then, the CPU 10 updates the operation up direction data Df3 using the calculated operation up direction.

Next, the CPU 10 determines whether or not the player object Po is moving (step 123). For example, when a movement vector is set in the movement vector data Dh, the CPU 10 determines that the player object Po is moving. When the player object Po is moving, the CPU 10 proceeds to the subsequent step 124. On the other hand, when the player object Po is not moving, the CPU 10 proceeds to the subsequent step 130.

In step 124, the CPU 10 calculates the angle of rotational movement in accordance with the difference in horizontal angle calculated in step 120 described above, and proceeds to the subsequent step. For example, the CPU 10 calculates an angle of rotational movement G (the angle G shown in FIG. 23) by $$G = F \times f1$$

(where F is the difference in horizontal angle, and f1 is a positive constant less than 1 (e.g., 0.001))

Next, the CPU 10 changes the virtual world reference direction in accordance with the angle of rotational movement calculated in step 124 described above (step 125), and proceeds to the subsequent step. For example, the CPU 10, when the virtual world reference direction indicated by the virtual world reference direction data Df1 is projected onto a horizontal plane in the virtual world, changes the virtual world reference direction so as to rotate about the direction of gravity in the virtual world by the angle of rotational movement, and to approximate the operation indication direction, to thereby update the virtual world reference direction data Df1 using the virtual world reference direction after the change.

Next, on the basis of the operation indication direction indicated by the operation indication direction data Df2 and the operation up direction indicated by the operation up direction data Df3, the CPU 10 sets the facing direction and the attitude of the player object Po in the virtual world (step 126), and proceeds to the subsequent step. As an example, the CPU 10 uses the operation indication direction, indicated by the operation indication direction data Df2, as it is as the facing direction of the player object Po (the direction in which the player object Po is to move). Then, the CPU 10 sets the attitude of the player object Po in which it is to roll, such that the operation up direction indicated by the operation up direction data Df3 is the up direction of the player object Po in the virtual world (the direction of the back surface of the torso shown in FIG. 24 in the exemplary game described above). Then, the CPU 10 updates the action/attitude data Dg on the basis of the set facing direction and attitude of the player object Po. Thus, the facing direction and the attitude of the player object Po in the virtual world are set on the basis of the attitude of the terminal apparatus 6 in real space.

As an example, when, as shown in FIG. 24, the terminal apparatus 6 has roll-rotated in a direction H and by a roll angle θ (i.e., the y-axis has roll-rotated about the z-axis in the direction H and by the angle θ), the attitude of the player object Po is controlled such that the player object Po rolls in the virtual world about the moving direction of the player object Po in the direction H and by the roll angle θ (e.g., the direction of the back surface of the torso of the player object Po roll-rotates about the moving direction in the direction H and by the angle θ). Then, the player object Po and the virtual world are displayed on the LCD 61 of the terminal apparatus 6 such that the up-down direction in the virtual world where the player object Po is placed rotates from the up-down direction of the LCD 61 in the direction opposite to the roll direction and by the roll angle θ. This causes the player object Po to roll in the virtual world in the direction H and by the roll angle θ; however, the virtual world is displayed on the LCD 61 so as to rotate in the direction opposite to the direction H and by the roll angle θ. This results in causing the player object Po to be displayed in the same state on the LCD 61, and causing the virtual world except for the player object Po to be displayed so as to rotate in the direction opposite to the direction H. Further, the terminal apparatus 6 rotates in the direction H and by the roll angle θ; however, the virtual world except for the player object Po is displayed on the LCD 61 so as to rotate in the direction opposite to the direction H and by the same roll angle θ. This results in causing the virtual world to be displayed in the same direction relative to real space, and causing the player object Po to be displayed so as to rotate in the direction H relative to the virtual world and real space.

In addition, when the user has directed the terminal apparatus perspective direction of the terminal apparatus 6 upward (i.e., has pitched the terminal apparatus 6 upward) such that the corrected terminal apparatus perspective direction is directed upward relative to a horizontal plane, the facing direction of the player object Po is set to the elevation direction at an angle by which the corrected terminal apparatus perspective direction is directed upward. Further, when the user has directed the terminal apparatus perspective direction of the terminal apparatus 6 downward (i.e., has pitched the terminal apparatus 6 downward) such that the corrected terminal apparatus perspective direction is directed downward relative to a horizontal plane, the facing direction of the player object Po is set to the depression direction at an angle by which the corrected terminal apparatus perspective direction is directed downward. Further, the user has rotated (i.e., rolled) the terminal apparatus 6 about the terminal apparatus perspective direction, the player object Po rolls in the virtual world in the direction in which the terminal apparatus 6 has rolled and in accordance with the angle by which the terminal apparatus 6 has rolled. Further, the left-right facing direction of the player object Po is set on the basis of a change in the left-right direction of the terminal apparatus 6 relative to the real space reference direction. For example, when the terminal apparatus 6 has rotationally moved in the yaw direction (see FIG. 3), which is the direction of rotation about the y-axis, also the facing direction of the player object Po changes in accordance with the amount of the rotational movement. Specifically, when the terminal apparatus 6 has rotationally moved about the y-axis to the left as viewed in the y-axis negative direction, also the facing direction of the player object Po changes to the left of the player object Po in accordance with the amount of the rotational movement. Further, when the user maintains the state of the terminal apparatus 6 being rotationally moved to the left or right relative to the real space reference direction, the virtual world reference direction continuously changes to the left or right. Thus, step 121 described above is performed, whereby, in accordance with the change in the virtual world reference direction, also the operation indication direction continuously changes to the left or right. Thus, when the user maintains the state where the terminal apparatus 6 is rotationally moved to the left or right relative to the real space reference direction, also the facing direction of the player object Po continuously changes further to the left or right. That is, even if wishing to greatly change the facing direction of the player object Po such as changing it in the opposite direction, the user does not need to change the direction of the terminal apparatus 6 greatly in, for example, the opposite direction. This makes it possible to improve the operability of the user.

Next, the CPU 10 performs a player object action setting process (step 127), and proceeds to the subsequent step.

With reference to FIG. 22, a description is given below of the player object action setting process performed in step 127 described above.

Referring to FIG. 22, the CPU 10 determines whether or not the action mode flag indicated by the movement mode flag data Dm is set to off (step 140). Then, when the action mode flag is set to off, the CPU 10 proceeds to the subsequent step 141. On the other hand, when the action mode flag is set to on, the CPU 10 proceeds to the subsequent step 148.

In step 141, the CPU 10 determines whether or not the total load value is equal to or greater than a predetermined value. For example, the CPU 10 determines whether or not the latest total load value indicated by the load value data Dc is equal to or greater than the predetermined value. The predetermined value is a threshold for determining that the user has taken action so as to perform leg bending and extending on the board-type controller 9. As an example, the predetermined value is set to a value obtained by adding a predetermined proportion (e.g., 20%) to the weight of the user mounted on the board-type controller 9. Here, the weight of the user mounted on the board-type controller 9 may be calculated on the basis of the total load value (e.g., an average value of the total load values obtained within a predetermined period), or may be a value input in advance by the user. Then, when the total load value is equal to or greater than the predetermined value, the CPU 10 proceeds to the subsequent step 142. On the other hand, when the total load value is less than the predetermined value, the CPU 10 proceeds to the subsequent step 144.

In step 142, the CPU 10 sets the object action to the action of dolphin-kicking, and proceeds to the subsequent step. For example, when the total load value is equal to or greater than the predetermined value, the CPU 10 determines that the user has taken a leg bending and extending action on the board-type controller 9. In this case, the CPU 10 sets the action of the player object Po to the action of swimming by a dolphin kick style, and also sets the action of the player object Po to the action of dolphin-kicking, to thereby update the action/attitude data Dg using the set action.

Next, the CPU 10 sets the action mode flag to on (step 143), and ends the process of this subroutine. For example, the CPU 10 changes the action mode flag indicated by the movement mode flag data Dm to on.

On the other hand, when it has been determined in step 141 described above that the total load value is less than the predetermined value, the CPU 10 determines whether or not the position of the center of gravity indicated by the position-of-center-of-gravity data Dd has moved into a right foot area from outside thereof (step 144). When the position of the center of gravity has moved into the right foot area from outside thereof, the CPU 10 proceeds to the subsequent step 145. On the other hand, when the position of the center of gravity has not moved into the right foot area from outside thereof, the CPU 10 proceeds to the subsequent step 146.

Here, in a predetermined coordinate system corresponding to positions on the platform 9a of the board-type controller 9 (e.g., an X1-Y1 coordinate system where: the origin is the center of the platform 9a; an X1-axis direction is the long side direction of the platform 9a; and a Y1-axis direction is the short side direction), the following are set: an area (right foot area) where the position of the center of gravity moves when the user has raised their left foot and lowered their right foot in a step action; and an area (left foot area) where the position of the center of gravity moves when the user has raised their right foot and lowered their left foot in a step action. For example, the left foot area and the right foot area are set in a left portion and a right portion, respectively, on the platform 9a (e.g., a left portion and a right portion when the power button 9c is placed below), and a neutral area is set between the left foot area and the right foot area so as to extend in the front-back direction and have a predetermined width. In the process of step 144 described above, a positive determination is made when the latest position of the center of gravity indicated by the position-of-center-of-gravity data Dd has moved into the right foot area from outside thereof, such as when the latest position of the center of gravity has moved into the right foot area from the neutral area.

It should be noted that the user may possibly step while changing their direction on the board-type controller 9. In this case, if the positions of the left foot area, the right foot area, and the neutral area are fixed, it may not be possible to accurately make step determinations. In such a case, the left foot area, the right foot area, and the neutral area in the coordinate system may be moved on the basis of the movement of the position of the center of gravity in the coordinate system. For example, when the moving distance of the position of the center of gravity during a predetermined period is equal to or greater than a predetermined length, the neutral area is moved so as to extend perpendicular to the movement path of the position of the center of gravity during the predetermined period in the central position of the movement path, and the left foot area and the right foot area are moved in accordance with the movement of the neutral area. The left foot area, the right foot area, and the neutral area may be thus moved, whereby it is possible to accurately make step determinations even if the user has stepped while changing their direction on the board-type controller 9.

It should be noted that in the step determination described above, it is determined whether the foot with which the user has stepped on the board-type controller 9 is their left foot or right foot. It may not be necessary to distinguish between left and right. For example, in the above descriptions, if processing is performed such that the "left foot" is "one foot", and the "right foot" is the "other foot", the foot with which the user has stepped and the leg to be kicked by the player object Po with a flutter kick may be the opposite to those of the processing described above. It is, however, possible to instruct an action so as to synchronize the step action of the user with the timing of the flutter kick action of the player object Po.

In step 145, the CPU 10 sets the object action to the action of flutter-kicking with its right foot, and ends the process of the subroutine. For example, when the position of the center of gravity has moved into the right foot area from outside thereof, the CPU 10 determines that the user has taken a step action so as to raise their left foot and lower their right foot on the board-type controller 9. In this case, the CPU 10 sets the action of the player object Po to the action of swimming by a flutter kick style, and also sets the action of the player object Po to the action of flutter-kicking with its right foot, to thereby update the action/attitude data Dg using the set action.

In step 146, the CPU 10 determines whether or not the position of the center of gravity indicated by the position-of-center-of-gravity data Dd has moved into the left foot area from outside thereof. When the position of the center of gravity has moved into the left foot area from outside thereof, the CPU 10 proceeds to the subsequent step 147. On the other hand, when the position of the center of gravity has not moved into the left foot area outside thereof, the CPU 10 proceeds to the subsequent step 151.

In step 147, the CPU 10 sets the object action to the action of flutter-kicking with its left foot, and ends the process of the subroutine. For example, when the position of the center of gravity has moved into the left foot area from outside thereof, the CPU 10 determines that the user has taken a step action so as to raise their right foot and lower their left foot on the board-type controller 9. In this case, the CPU 10 sets the action of the player object Po to the action of swimming by a flutter kick style, and also sets the action of the player object Po to the action of flutter-kicking with its left foot, to thereby update the action/attitude data Dg using the set action.

When it has been determined in step 140 described above that the action mode flag is on, the CPU 10 determines whether or not a predetermined period has elapsed since the action mode flag has been set to on (step 148). When the predetermined period has elapsed, the CPU 10 proceeds to the subsequent step 149. On the other hand, when the predetermined period has not elapsed, the CPU 10 proceeds to the subsequent step 150. Here, the predetermined period is a period from the time when a dolphin kick is performed to the time when the next dolphin kick operation input or the next flutter kick operation input is permitted. Thus, the determination of the action of the user using the board-type controller 9 is not made until the predetermined period elapses. This makes it possible to prevent an erroneous determination of the action of the user immediately after dolphin-kicking.

In step 149, the CPU 10 sets the action mode flag to off, and ends the process of the subroutine. For example, the CPU 10 changes the action mode flag indicated by the movement mode flag data Dm to off.

On the other hand, in step 150, the CPU 10 sets the object action to "during a dolphin kick", and ends the process of the subroutine. For example, the CPU 10 continuously sets the action of the player object Po to the action of swimming by a dolphin kick style, and also sets the action of the player object Po to "during a dolphin kick", to thereby update the action/attitude data Dg using the set action.

When the action mode flag is off (a positive determination is made in step 140 described above); the total load value is less than the predetermined value (a negative determination is made in step 141 described above); the position of the center of gravity has not moved into the right foot area from outside thereof (a negative determination is made in step 144 described above); and the position of the center of gravity has not moved into the left foot area from outside thereof (a negative determination is made in step 146 described above), the CPU 10 sets the currently set action to a continuous action (step 151), and ends the process of the subroutine. For example, when the action of kicking legs (e.g., the action of flutter-kicking) is set, the CPU 10 cancels the action, and continuously sets the swimming style of the player object Po that is set as the object action, to thereby update the action/attitude data Dg using the set action.

Referring back to FIG. 21, after the player object action setting process in step 127 described above, the CPU 10 sets the movement vector of the player object Po (step 128), and proceeds to the subsequent step. For example, the CPU 10 calculates the moving velocity of the player object Po on the basis of the chronological array of the total load values indicated by the load value data Dc (the history of changes in the total load value) and the action (swimming style) of the player object Po set in step 127 described above. As an example, the CPU 10 makes a calculation such that the shorter the cycle of the total load value changing, the greater the velocity of the player object Po moving. As another example, the CPU 10 makes a calculation such that the greater the maximum value of, or the width of the change in, the total load value, the greater the velocity of the player object Po moving. For example, the shorter the interval of the user stepping on the board-type controller 9, the greater the moving velocity of the player object Po swimming with a flutter kick. Further, the shorter the interval of the user performing leg bending and extending on the board-type controller 9, the greater the moving velocity of the player object Po swimming with a dolphin kick. The greater the strength of leg bending and extending, the greater the moving velocity of the player object Po swimming with a dolphin kick. Then, the CPU 10 corrects the calculated moving velocity with a coefficient based on the set swimming style, and determines the moving velocity of the player object Po. Further, the moving velocity of the player object Po is set so as to be relatively great at the time of kicking legs, and set so as to decrementally decrease until the next time of kicking legs.

In addition, the CPU 10 sets the operation indication direction in the virtual world, indicated by the operation indication direction data Df2, to the moving direction of the player object Po. Then, the CPU 10 calculates the movement vector of the player object Po in the virtual world using the moving velocity and the moving direction of the player object Po that have been calculated as described above, to thereby update the movement vector data Dh using the calculated movement vector. For example, the CPU 10 sets the length of the movement vector using the calculated moving velocity of the player object Po, and sets the direction of the movement vector using the operation indication direction indicated by the operation indication direction data Df2.

Next, the CPU 10 calculates the position of the player object Po (step 129), and ends the process of this subroutine. For example, on the basis of the movement vector indicated by the movement vector data Dh, the CPU 10 moves, in the virtual world, the position of the player object Po indicated by the position data Di, to thereby update the position data Di using the position after the movement.

On the other hand, when it has been determined in step 123 described above that the player object Po is not moving, the CPU 10 sets the facing direction of the player object Po in the virtual world on the basis of the operation indication direction indicated by the operation indication direction data Df2 and the operation up direction data Df3 (step 130), and proceeds to the subsequent step. It should be noted that the process of step 130 described above is similar to the process of step 126 described above, and therefore is not described in detail here.

Next, the CPU 10 sets the object action to a static state (step 131), and ends the process of the subroutine. For example, the CPU 10 sets the action of the player object Po to a static state (e.g., the state of drifting without swimming underwater), to thereby update the action/attitude data Dg using the set action.

Referring back to FIG. 20, after the player object setting process in step 83 described above, the CPU 10 sets parameters concerning the second virtual camera (step 84), and proceeds to the subsequent step. For example, a terminal game image and a monitor game image are generated as, for example, three-dimensional CG images obtained by calculating a game space viewed from a virtual camera placed in the virtual world (virtual space). Specifically, the first virtual camera for generating a terminal game image is set so as to include the state of the virtual world viewed from behind and close to the player object Po placed in the virtual world. Further, the second virtual camera for generating a monitor game image is set in the same virtual world where the first virtual camera is set, the second virtual camera set so as to include the state of the virtual world obtained by viewing from a distant bird's-eye view the player object Po placed in the virtual world. The CPU 10 sets the positions of the first virtual camera and the second virtual camera in the virtual world (parameters concerning the first virtual camera and the second virtual camera) on the basis of the position of the player object Po indicated by the position data Di and the operation indication direction based on the operation indication direction data Df2 (the direction of the player object Po). A terminal game image and a monitor game image are game images of the virtual world that are thus viewed from different points of view. This causes the game images of the virtual world viewed from the different points of view to be displayed on the LCD 61 and the monitor 2.

Specifically, the CPU 10 controls the attitude of the first virtual camera in the virtual world so as to be the same as the attitude of the terminal apparatus 6 that is subjected to an offset correction and a scaling correction. That is, the CPU 10 controls the attitude of the first virtual camera such that: the operation indication direction set on the basis of the corrected z-axis positive direction of the terminal apparatus 6 (the operation indication direction indicated by the operation indication direction data Df2) corresponds to the Z-axis positive direction (the direction of the line of sight) of the first virtual camera; and the operation up direction set on the basis of the corrected y-axis positive direction of the terminal apparatus 6 (the operation up direction indicated by the operation up direction data Df3) corresponds to the Y-axis positive direction of the first virtual camera (the virtual camera up direction). Then, the positional relationship (including the roll directions) between the player object Po and the first virtual camera is fixed, and the position of the first virtual camera is set on the basis of the position of the player object Po that is moving in the virtual world. That is, the user can control the actions of the player object Po and the first virtual camera for generating a virtual world image to be displayed on the LCD 61 of the terminal apparatus 6, by moving the terminal apparatus 6. Then, the corrected attitude and direction of the terminal apparatus 6 are in conjunction with the attitude and the direction of the first virtual camera. This enables the user to enjoy a feeling as if peeping at the virtual world using the LCD 61 of the terminal apparatus 6 as a peep window.

Next, the CPU 10 sets the movement path of the player object Po (step 85), and ends the process of this subroutine. For example, the CPU 10 adds the current position of the player object Po, indicated by the position data Di, to the movement path indicated by the movement path data Dk, to thereby update the movement path data Dk using the movement path to which the current position has been added.

Referring back to FIG. 19, after the game control process in step 45, the CPU 10 and the GPU 32 generate a monitor game image to be displayed on the monitor 2 (step 46), and proceed to the subsequent step. For example, the CPU 10 and the GPU 32 read from the main memory the data indicating the result of the game control process performed in step 45, and read from the VRAM 34 the data used to generate a monitor game image. Then, the CPU 10 and the GPU 32 generate a game image using the read data, and store the generated monitor game image in the VRAM 34. Any monitor game image may be generated by any method so long as the monitor game image represents the result of the game control process performed in step 45. For example, the monitor game image may be a three-dimensional CG image generated by the steps of: placing the second virtual camera in the virtual world on the basis of the parameters concerning the second virtual camera that are indicated by the virtual camera data Dj; placing the player object Po in the virtual world on the basis of the action/attitude data Dg and the position data Di; placing the movement path Lp in the virtual world on the basis of the movement path data Dk; and calculating the virtual world viewed from the second virtual camera.

Next, the CPU 10 and the GPU 32 generate a terminal game image to be displayed on the terminal apparatus 6 (step 47), and proceed to the subsequent step. For example, the CPU 10 and the GPU 32 read from the main memory the data indicating the result of the game control process performed in step 44, and read from the VRAM 34 the data used to generate a terminal game image. Then, the CPU 10 and the GPU 32 generate a terminal game image using the read data, and store the generated terminal game image in the VRAM 34. Similarly to the monitor game image, any terminal game image may be generated by any method so long as the terminal game image represents the result of the game control process performed in step 45. Further, the terminal game image may be generated by the same method as, or a different method from, that for the monitor game image. For example, the terminal game image may be generated as a three-dimensional CG image by the steps of: placing the first virtual camera in the virtual world on the basis of the parameters concerning the first virtual camera that are indicated by the virtual camera data Dj; placing the player object Po in the virtual world on the basis of the action/attitude data Dg and the position data Di; and calculating the virtual world viewed from the first virtual camera.

It should be noted that if the action of the player object Po indicated by the action/attitude data Dg indicates the action of kicking legs (the action of dolphin-kicking or the action of flutter-kicking), the player object Po may be placed in the virtual world to as to take the action of kicking legs. This makes it possible to cause the player object Po to take action in synchronization with the action (a step action or a leg bending and extending action) taken by the user on the board-type controller 9.

Next, the CPU 10 generates a monitor game sound to be output to the loudspeakers 2a of the monitor 2 (step 48), and proceeds to the subsequent step. For example, the CPU 10 causes the DSP 33 to generate a monitor game sound to be output from the loudspeakers 2a, in accordance with the result of the game control process performed in step 45. As an example, the CPU 10 causes the DSP 33 to generate a monitor game sound in which BGM or the like to be output from the monitor 2 is added to the voices and the action sounds of the objects, sound effects, and the like that are supposed to be heard on the basis of the position of the second virtual camera in the virtual world set in accordance with the result of the game control process in step 45.

Next, the CPU 10 generates a terminal game sound to be output to the loudspeakers 607 of the terminal apparatus 6 (step 49), and proceeds to the subsequent step. For example, the CPU 10 causes the DSP 33 to generate a terminal game sound to be output from the loudspeakers 607, in accordance with the result of the game control process performed in step 45. As an example, the CPU 10 causes the DSP 33 to generate a terminal game sound in which BGM or the like to be output from the terminal apparatus 6 is added to the voices and the action sounds of the objects, sound effects, and the like that are supposed to be heard on the basis of the position of the first virtual camera in the virtual world set in accordance with the result of the game control process in step 45. The terminal game sound may be the same as, or different from, the monitor game sound. Alternatively, the terminal game sound may be partially different from the monitor game sound (e.g., the terminal game sound and the monitor game sound include the same BGM and different sound effects). It should be noted that when the monitor game sound and the terminal game sound are the same, the terminal game sound generation step in step 49 may not need to be performed.

Next, the CPU 10 generates a terminal game sound to be output to the loudspeakers 607 of the terminal apparatus 6 (step 50), and proceeds to the subsequent step. For example, the CPU 10 causes the DSP 33 to generate a terminal game sound to be output from the loudspeakers 607, in accordance with the result of the game control process performed in step 44. As an example, the CPU 10 causes the DSP 33 to generate a terminal game sound in which BGM or the like to be output from the terminal apparatus 6 is added to the voices and the action sounds of the objects, sound effects, and the like that are supposed to be heard on the basis of the position of the first virtual camera in the virtual world set in accordance with the result of the game control process in step 44. The terminal game sound may be the same as, or different from, the monitor game sound. Alternatively, the terminal game sound may be partially different from the monitor game sound (e.g., the terminal game sound and the monitor game sound include the same BGM and different sound effects). It should be noted that when the monitor game sound and the terminal game sound are the same, the terminal game sound generation step in step 48 may not need to be performed.

Next, the CPU 10 transmits the terminal game image and the terminal game sound to the terminal apparatus 6 (step 51), and proceeds to the subsequent step. For example, the CPU 10 transmits to the codec LSI 27 the data of the terminal game image stored in the VRAM 34 and the data of the terminal game sound generated by the DSP 33. The codec LSI 27 performs a predetermined compression process on the transmitted data. The compressed data of the terminal game image and the compressed data of the terminal game sound are transmitted from the codec LSI 27 to the terminal communication module 28, and then transmitted from the terminal communication module 28 to the terminal apparatus 6 via the antenna 29. The data of the terminal game image and the data of the terminal game sound that have been transmitted from the game apparatus body 5 are received by the wireless module 610 of the terminal apparatus 6, and are subjected to a predetermined decompression process by the codec LSI 606. Then, the decompressed data of the terminal game image is output to the LCD 61, and the decompressed data of the terminal game sound is output to the sound IC 608. This causes the terminal game image to be displayed on the LCD 61, and causes the terminal game sound to be output from the loudspeakers 607.

Next, the CPU 10 determines whether or not the game is to be ended (step 52). Conditions for ending the game may be, for example: that particular conditions have been satisfied so that the game is over, or the game is completed; or that the user has performed an operation for ending the game. When the game is not to be ended, the CPU 10 returns to step 43 and repeats the same processing. On the other hand, when the game is to be ended, the CPU 10 ends the processing of the flow chart. Thereafter, the series of processes 43 through 52 is repeatedly performed until the CPU 10 determines in step 52 that the game is to be ended.

As described above, based on the processing described above, when the attitude of the terminal apparatus 6 (the terminal apparatus perspective direction) is transformed into the operation indication direction in the virtual world, the attitude of the terminal apparatus 6 is subjected to an offset correction and a scaling correction. For example, the offset correction is made, whereby, if the terminal apparatus perspective direction is directed downward in the depression direction and by a predetermined angle with respect to a horizontal direction in real space, the operation indication direction is set to a horizontal direction in the virtual world. Thus, even when the user wishes to maintain the operation indication direction in the horizontal direction in the virtual world, the user does not need to continue a forced position in which they maintain the state where the LCD 61 of the terminal apparatus 6 vertically stands in real space. This enables the user to operate the terminal apparatus 6 while being in a relatively comfortable position (the reference attitude) in which the LCD 61 is in an elevated state at a predetermined angle. Further, the scaling correction is made, whereby the terminal apparatus perspective direction is transformed into the operation indication direction such that the angle of change in the terminal apparatus perspective direction is scaled into an appropriate angle. For example, the making of the scaling correction makes it possible that even when the angle of change in the terminal apparatus perspective direction is relatively small, the operation indication direction is changed with respect to the horizontal direction in the virtual world by a relatively great angle of change. This reduces the burden of the operation, and also makes it possible to set the operation indication direction to the vertically up and vertically down directions in the virtual world without causing the user to take a position of a great burden, such as one in which the user directs the terminal apparatus perspective direction vertically upward and vertically downward in real space.

It should be noted that in the exemplary embodiment described above, by way of example, an offset correction and a scaling correction are made when the attitude of the terminal apparatus 6 (the terminal apparatus perspective direction) is transformed into the operation indication direction in the virtual world. Alternatively, only either one of the corrections may be made. It is needless to say that even when either one of the corrections is thus made, it is possible to obtain a part of the effects described above. For example, the case is considered where only the offset correction is made. To correct the terminal apparatus perspective direction (the vector Vaz), only the following correction is made. The direction of the terminal apparatus perspective direction with respect to a horizontal plane in real space is rotated in the elevation direction and by the angle by which the offset correction is made. Further, in the case where only the scaling correction is made, the intercepts of the functions to be used in the corrections shown in FIGS. 14A through 17B are set to 0, and the attitude of the terminal apparatus 6 (the terminal apparatus perspective direction) is transformed into the operation indication direction in the virtual world using the functions.

In addition, in the exemplary embodiment described above, when the attitude of the terminal apparatus 6 (the terminal apparatus perspective direction) is transformed into the operation indication direction in the virtual world, a scaling correction is made on the direction of the terminal apparatus 6 about the left-right horizontal direction (i.e., the pitch in the up-down direction). Alternatively, a scaling correction may be made on another direction. For example, when the attitude of the terminal apparatus 6 (the terminal apparatus perspective direction) is transformed into the operation indication direction in the virtual world, a scaling correction may be made on the direction of the terminal apparatus 6 about the vertical direction (i.e., the yaw in the left-right direction), or the direction of the terminal apparatus 6 about the front-back horizontal direction (i.e., the roll in the left-right rotation). In this case, when the attitude of the terminal apparatus 6 (the terminal apparatus perspective direction) is transformed into the operation indication direction in the virtual world, it is possible to make a scaling correction on at least one of the directions about the three directions (i.e., about the left-right horizontal direction, about the vertical direction, or about the front-back horizontal direction).

In addition, in the exemplary embodiment described above, by way of example, when the attitude of the terminal apparatus 6 (the terminal apparatus perspective direction) is transformed into the operation indication direction in the virtual world, an offset correction is made so that the terminal apparatus perspective direction is corrected in the elevation direction. Alternatively, when the terminal apparatus perspective direction is transformed into the operation indication direction, an offset correction may be made so that the terminal apparatus perspective direction is corrected in the depression direction. For example, if an image obtained by looking down upon the virtual world is displayed on the LCD 61, the operation indication direction indicating the direction of the line of sight of the first virtual camera needs to be set to the vertical direction in the virtual world. In this case, the attitude of the terminal apparatus 6 used to set the operation indication direction needs to be set such that the terminal apparatus perspective direction is directed in the vertical direction in real space. This possibly results in a position of a burden on the user, which makes it difficult for the user to operate the terminal apparatus 6 for a long time. The terminal apparatus perspective direction, however, may be transformed into the operation indication direction by being subjected to an offset correction so that the terminal apparatus perspective direction is corrected in the depression direction and by a predetermined angle, whereby the attitude of the terminal apparatus 6 obtained by directing the terminal apparatus perspective direction in the elevation direction and by the predetermined angle with respect to the vertical direction in real space serves as the operation of setting the operation indication direction to the vertical direction in the virtual world. This makes it possible to reduce the burden of the operation of the user, and therefore enables the user to operate the terminal apparatus 6 while being in a relatively comfortable position. For example, an offset correction is made so that the operation indication direction calculated so as to correspond to the attitude of the terminal apparatus 6 that allows the user to hold it in an operation position relatively comfortable even while maintaining it in the same attitude for a long time (e.g., in the reference attitude in which the terminal apparatus perspective direction is directed in the elevation direction and by the angle B with respect to the vertical direction in real space) is the vertical direction of the virtual world.

In addition, in the exemplary embodiment described above, by way of example, when the attitude of the terminal apparatus 6 (the terminal apparatus perspective direction) is transformed into the operation indication direction in the virtual world, an offset correction and/or a scaling correction are made so that the terminal apparatus perspective direction is corrected in the elevation direction or the depression direction. That is, in the exemplary embodiment, the amount of rotation by which the terminal apparatus perspective direction rotates about a horizontal direction in real space perpendicular to the terminal apparatus perspective direction of the terminal apparatus 6 is subjected to the offset correction and/or the scaling correction so that the amount of rotation is corrected in the up-down direction in real space. The axis of rotation of the terminal apparatus perspective direction to be subjected to the offset correction and/or the scaling correction, however, may be another axis in real space. For example, the amount of rotation by which the terminal apparatus perspective direction rotates about a predetermined direction defined in advance in the terminal apparatus 6 (e.g., a left-right direction parallel to the display screen of the LCD 61 (the x-axis direction)) may be subjected to an offset correction and/or a scaling correction about the predetermined direction. In this case, the amount of rotation with respect to the terminal apparatus 6 is corrected. Thus, the offset correction and/or the scaling correction are made, regardless of the attitude of the terminal apparatus 6 in real space. For example, the case is considered where the amount of rotation by which the terminal apparatus perspective direction rotates about a left-right direction parallel to the display screen of the LCD 61 (the x-axis direction) is subjected to an offset correction and/or a scaling correction. Even in an operation environment where the user views an image displayed on the LCD 61 by moving the terminal apparatus 6 while holding it and being in a lying position, it is possible, regardless of the attitude of the terminal apparatus 6 rolling in real space, to always correct the terminal apparatus perspective direction, which changes in accordance with the user moving the terminal apparatus 6 in the pitch direction.

In addition, in the exemplary game described above, the virtual camera (first virtual camera) for generating an image to be displayed on the LCD 61 is controlled (the position, the direction, and the attitude of the virtual camera are controlled) on the basis of the attitude of the terminal apparatus 6. Such control makes it possible to provide the user with an image as if peeping at the virtual world through the LCD 61, and provide the user with a feeling as if being in the virtual world. Further, the operation using the attitude of the terminal apparatus 6 enables the operation of rotating the terminal apparatus 6 in three directions, such as a left-right swing (yaw) about the vertical direction (e.g., about the y-axis direction), an upward and downward swing (pitch) about the left-right horizontal direction (e.g., about the x-axis direction), and a left-right rotation (roll) about the front-back horizontal direction (e.g., about the z-axis direction), and therefore is suitable for controlling the virtual camera capable of making a similar movement also in the virtual world. Thus, the attitude of the virtual camera in the virtual world may be controlled so as to coincide with the attitude of the terminal apparatus 6 in real space, whereby it is possible to provide an image as if peeping in the direction desired by the user in the virtual world. In addition, in the exemplary game described above, in accordance with the user taking action on the board-type controller 9, the player object takes action (e.g., a moving action). That is, the user is provided, by an image displayed on the LCD 61, with a feeling as if being in the virtual world, and is additionally provided with an operation feeling as if the user themselves is a player object in real space. This enhances the feeling as if being in the virtual world.

In addition, in the exemplary game described above, the attitude of the player object Po displayed on the LCD 61 is controlled on the basis of the attitude of the terminal apparatus 6. Such control makes it possible to provide the user with an operation environment as if the terminal apparatus 6 were the player object Po, and also provide a feeling as if the user were the player object Po in the virtual world, and a feeling as if directly controlling the player object Po. Further, the operation using the attitude of the terminal apparatus 6 enables the operation of rotating the terminal apparatus 6 in three directions, such as a left-right swing (yaw) about the vertical direction (e.g., about the y-axis direction), an upward and downward swing (pitch) about the left-right horizontal direction (e.g., about the x-axis direction), and a left-right rotation (roll) about the front-back horizontal direction (e.g., about the z-axis direction), and therefore is suitable for controlling the player object Po capable of making a similar movement also in the virtual world. For example, in the exemplary game, a left-right swing (yaw) about the height direction along the LCD 61 of the terminal apparatus 6 (the y-axis direction) may be set to correspond to a change in the attitude of the player object Po in the left-right direction (yaw); an upward and downward swing (pitch) about the left-right direction along the LCD 61 (the x-axis direction) may be set to correspond to a change in the attitude of the player object Po in the up-down direction (pitch); and a left-right rotation (roll) about the perspective direction of the LCD 61 (the z-axis direction) may be set to correspond to a rotational change in the attitude of the player object Po about the forward direction (moving direction) of the player object Po (roll), whereby it is possible to provide an image of an object that changes its attitude to the attitude desired by the user in the virtual world. Further, in the exemplary game described above, in accordance with the user taking action on the board-type controller 9, the player object Po takes action (e.g., a moving action). That is, the user controls one player object Po using a plurality of devices (the terminal apparatus 6 and the board-type controller 9). This makes it possible to perform an unprecedented operation. Further, the control of the attitude of the player object Po on the basis of the attitude of the terminal apparatus 6 makes it possible to provide a feeling as if the user were the player object Po in the virtual world, and a feeling as if directly controlling the player object Po. As well as this, the operation performed on the board-type controller 9 makes it possible to provide an operation feeling as if the user themselves were the player object Po in real space. This enhances the feeling as if being in the virtual world. Further, in the exemplary game described above, it is possible to cause the player object Po to move in the forward direction of the player object Po. Thus, on the basis of the attitude of the terminal apparatus 6, the user can set the attitude (forward direction) of the player object Po, and can also set the moving direction of the player object Po. This enables the operation of setting the moving direction in an intuitive manner, which facilitates the setting of the moving direction to the direction desired by the user. Further, similarly to the attitude of the player object Po described above, it is possible to set the moving direction of the player object Po in accordance with the operation of rotating the terminal apparatus 6 in three directions. This makes it possible to set in the virtual world the moving direction desired by the user as it is.

In addition, in the exemplary game described above, the moving direction of the player object Po is set on the basis of the attitude of the terminal apparatus 6. Such a setting of the moving direction makes it possible to provide the user with an operation environment as if the terminal apparatus 6 were the player object Po, and also provide a feeling as if the user were the player object Po in the virtual world, and a feeling as if directly controlling the player object Po. Further, the operation using the attitude of the terminal apparatus 6 enables the operation of rotating the terminal apparatus 6 in three directions, such as a left-right swing (yaw) about the vertical direction (e.g., about the y-axis direction), an upward and downward swing (pitch) about the left-right horizontal direction (e.g., about the x-axis direction), and a left-right rotation (roll) about the front-back horizontal direction (e.g., about the z-axis direction), and therefore is suitable for controlling the player object Po whose moving direction can be set in at least one of the three directions also in the virtual world. For example, in the exemplary game, a left-right swing (yaw) about the height direction along the LCD 61 of the terminal apparatus 6 (the y-axis direction) may be set to correspond to a change in the moving direction of the player object Po in the left-right direction (yaw), and an upward and downward swing (pitch) about the left-right direction along the LCD 61 (the x-axis direction) may be set to correspond to a change in the moving direction of the player object Po in the up-down direction (pitch), whereby it is possible to provide the control of an object in which the object moves in the virtual world in the moving direction desired by the user. Further, in the exemplary game described above, the moving action of the player object Po (e.g., the setting of the moving velocity) is taken in accordance with the user taking action on the board-type controller 9. That is, the user controls the moving direction and the moving velocity of one player object Po using a plurality of devices (the terminal apparatus 6 and the board-type controller 9). This enables an unprecedented operation. Further, the setting of the moving direction of the player object Po based on the attitude of the terminal apparatus 6 provides a feeling as if the user were the player object Po in the virtual world, and a feeling as if directly controlling the player object Po, and also provides, on the basis of the operation performed on the board-type controller 9, an operation feeling as if the user themselves were the player object Po in real space. This enhances the feeling as if being in the virtual world.

In addition, in the exemplary game described above, it is possible to set the perspective direction in the virtual world displayed on the LCD 61 of the terminal apparatus 6, as the moving direction of the player object Po. This enables the user to set the moving direction of the player object Po on the basis of the attitude of the terminal apparatus 6. Further, the virtual world is displayed on the LCD 61 such that the moving direction is the perspective direction. This enables the operation of setting the moving direction in an intuitive manner, which facilitates the setting of the moving direction to the direction desired by the user. Further, similarly to the direction of the virtual camera described above, it is possible to set the moving direction of the player object Po in accordance with the operation of rotating the terminal apparatus 6 in three directions. This makes it possible to set in the virtual world the moving direction desired by the user as it is.

In addition, in the exemplary game described above, an image of the virtual world including at least the player object Po is displayed on the LCD 61 of the terminal apparatus 6. Alternatively, an image of the virtual world in another form may be displayed on the LCD 61. For example, a virtual world image viewed from the first-person point of view of the player object Po may be displayed on the LCD 61 without displaying the player object Po. In this case, the up-down direction in the virtual world displayed on the LCD 61 from the first-person point of view may, in accordance with the roll of the terminal apparatus 6, roll in the opposite direction (i.e., the first virtual camera in the virtual world may roll in the same action as that of the roll of the terminal apparatus 6 in real space). Further, the perspective direction of the virtual world displayed on the LCD 61 from the first-person point of view may be the same as, or may be different from, the moving direction of the player object Po. It is needless to say that when the perspective direction of the virtual world displayed on the LCD 61 from the first-person point of view is the same as the moving direction of the player object Po, the virtual world is displayed on the LCD 61 such that the moving direction is the perspective direction, and this makes it possible to perform the operation of setting the moving direction in an intuitive manner, which facilitates the setting of the moving direction to the direction desired by the user.

It should be noted that in the exemplary game described above, the exemplary processing is performed such that in accordance with the operation indication direction determined on the basis of the attitude of the terminal apparatus 6, the position and the attitude of the virtual camera are controlled in conjunction immediately after the determination. In accordance with the change in the operation indication direction and the change in the operation up direction, however, the position and the attitude of the first virtual camera may be controlled after a delay of a predetermined period. In this case, after the facing direction and the attitude of the player object Po change, the position and the attitude of the first virtual camera change so as to follow the facing direction and the attitude of the player object Po after the delay of the predetermined period.

In addition, in the exemplary game described above, the positional relationship (including the roll directions) between the player object Po and the first virtual camera is fixed, and the position of the first virtual camera is set on the basis of the position of the player object Po that is moving in the virtual world. Alternatively, the positional relationship between the player object Po and the first virtual camera may change. As an example, if the operation of rotating the terminal apparatus 6 is performed, such as a left-right rotation (roll) about the front-back horizontal direction (e.g., about the z-axis direction), the first virtual camera is caused to roll in the virtual world about the direction of the line of sight of the first virtual camera (the Z-axis positive direction) in the direction in which the terminal apparatus 6 has rolled and by the angle of the roll. In contrast, the player object Po is caused to roll in the virtual world about the moving direction (the same direction as the direction of the line of sight of the first virtual camera if the moving direction coincides with the direction of the line of sight) in the direction of the roll and by an angle smaller than the angle of the roll. This changes at least the positional relationship between the player object Po and the first virtual camera in the roll directions. Even when the roll angle by which the attitude of the player object Po thus changes in the roll direction is smaller than the roll angle of the terminal apparatus 6, the player object Po still takes the action of rolling in response to the operation of the user rolling the terminal apparatus 6. This makes it possible to enjoy a similar operation feeling.

As another example, if the operation of rotating the terminal apparatus 6 is performed, such as a left-right rotation (roll) about the front-back horizontal direction (e.g., about the z-axis direction), the first virtual camera is caused to roll in the virtual world about the direction of the line of sight of the first virtual camera (the Z-axis positive direction) in the direction in which the terminal apparatus 6 has rolled and by the angle of the roll. In contrast, the player object Po is once caused to roll in the virtual world about the moving direction (the same direction as the direction of the line of sight of the first virtual camera if the moving direction coincides with the direction of the line of sight) in the direction of the roll and by the same angle as the angle of the roll. Then, the attitude of the player object Po is changed at a predetermined roll rotation velocity such that only the direction of the back surface of the torso of the player object Po is directed upward in the virtual world. This changes at least the positional relationship between the player object Po and the first virtual camera in the roll directions after the movement of roll rotation. Even when control is thus performed such that the attitude of the player object Po in the roll direction returns to a direction based on the up-down direction in the virtual world, it is possible to cause the player object Po to once take the action of rolling in response to the operation of the user rolling the terminal apparatus 6. This enables the user to enjoy a similar operation feeling when having performed the operation of rolling the terminal apparatus 6.

In addition, in the above descriptions, the attitude of the first virtual camera in the virtual world is controlled so as to be the same as the attitude of the terminal apparatus 6 in real space. This makes it possible, in accordance with the user directing the terminal apparatus 6 in the direction that they wish to view, to provide the user with, for example, an image as if peeping at the virtual world through the terminal apparatus 6, and provide the user with a feeling as if being in the virtual world. If, however, such effects are not expected, the attitude of the terminal apparatus 6 in real space and the attitude of the first virtual camera in the virtual world do not need to completely coincide with each other. For example, when the terminal apparatus 6 has rotated about a predetermined axis (e.g., the z-axis) by an amount of rotation θt, the first virtual camera may be caused to rotate about a direction in the virtual world corresponding to the predetermined axis (e.g., the direction of the line of sight of the first virtual camera) by an amount of rotation smaller than, or greater than, the amount of rotation θt. Further, after the first virtual camera rotates by the amount of rotation smaller than, or greater than, the amount of rotation θt, the first virtual camera may further rotate at a predetermined rotation velocity so that the attitude of the first virtual camera is the same as the attitude of the terminal apparatus 6 in real space.

In addition, in the exemplary information processing described above, the terminal apparatus up direction (the y-axis positive direction) and the operation up direction are used to set the motion of the terminal apparatus 6 about the z-axis and the directions in which the first virtual camera and the player object Po are caused to roll. Alternatively, once the attitudes of the first virtual camera and the player object Po in the virtual world in the roll directions are set to correspond to the attitude of the terminal apparatus 6, these directions may not need to be used in the subsequent processing. For example, after the attitudes of the first virtual camera and the player object Po in the virtual world in the roll directions are set to correspond to the attitude of the terminal apparatus 6, the angle of rotation corresponding to the angular velocity generated about the z-axis of the terminal apparatus 6 may be set as it is to correspond to the attitudes of the first virtual camera and the player object Po in the virtual world in the roll directions, whereby it is possible to control the attitudes in a similar manner.

In addition, in the above descriptions, the virtual world is fixed, and the virtual camera and the player object Po are caused to move relative to the virtual world. It is, however, needless to say that the virtual camera and the player object Po only need to move relative to the virtual world. For example, when the direction, the position, the attitude, and the like of the virtual camera in the virtual world change in accordance with changes in the direction, the motion, and the attitude, and the like of the terminal apparatus 6, the direction, the position, the attitude, and the like of the virtual camera may be fixed, and the entire virtual world may be moved with respect to the virtual camera in accordance with changes in the direction, the motion, and the attitude, and the like of the terminal apparatus 6. Further, when the direction, the position, the attitude, and the like of the player object Po in the virtual world change in accordance with changes in the direction, the motion, and the attitude, and the like of the terminal apparatus 6, the direction, the position, the attitude, and the like of the player object Po may be fixed, and the entire virtual world except for the player object Po may be moved with respect to the player object Po in accordance with changes in the direction, the motion, and the attitude, and the like of the terminal apparatus 6.

In addition, in the above descriptions, the terminal apparatus up direction (the y-axis positive direction) and the operation up direction are used to set the motion of the terminal apparatus 6 about the z-axis and the directions in which the first virtual camera and the player object Po are caused to roll. Alternatively, the above motion and directions may be set using another axis orthogonal to the z-axis, or another direction orthogonal to the direction of the line of sight of the first virtual camera and the moving direction of the player object Po (the operation indication direction). For example, the motion of the terminal apparatus 6 about the z-axis and the directions in which the first virtual camera and the player object Po are caused to roll may be set using the terminal apparatus left direction (the x-axis positive direction) and the operation left direction.

In addition, in the exemplary game described above, the game image displayed on the LCD 61 of the terminal apparatus 6 and the game image displayed on the monitor 2 are images both representing the state of the same virtual world (virtual space), but are images different from each other in the point of view, and the range of view, toward the virtual world (virtual space) is viewed. This enables the user to view the virtual world (virtual space) displayed on the two display screens in different fields of view and different display ranges, and therefore enables the user to appropriately view a suitable game image depending on the state of the game. Further, the exemplary game described above enables the user to perform an operation while holding the terminal apparatus 6, to thereby change the positions and the attitudes of the player object Po and the virtual camera in accordance with the attitude and the position of the terminal apparatus 6 in real space, and also change an image displayed on the LCD 61 in accordance with the positions and the attitudes of the player object Po and the virtual camera. This makes it possible to provide a sense of presence in the virtual world (virtual space) to the user viewing an image displayed on the LCD 61 while holding the terminal apparatus 6. On the other hand, viewing only an image displayed on the LCD 61 may make it difficult to understand the position relative to the entire virtual world (virtual space) and the circumstance of the player object Po. The display of the virtual world (virtual space) in a relatively wide range on the monitor 2 can solve such a problem.

In addition, in the exemplary game described above, the user can perform an operation based on a change in the load applied to the board-type controller 9, and can also perform an operation holding the terminal apparatus 6 (an operation based on the attitude and the position of the apparatus body, a touch operation, a button operation, and the like), on which a game image including the player object Po is displayed. Then, the player object Po displayed on the terminal apparatus 6 takes action in the virtual world in accordance with the operation based on a change in the load applied to the board-type controller 9 and/or the operation using the terminal apparatus 6. This makes it possible to provide the user with a feeling as if the user, as the player object Po, took action and viewed the virtual world, and to provide the user with a feeling as if controlling the player object Po in real space.

Here, in the operation using the board-type controller 9 described above, the presence or absence of a load to be applied to the board-type controller 9, a change in the load, and the position of the center of gravity of the load are used to control various actions of the player object Po. For example, in the exemplary game described above, the action, the moving velocity, the moving direction, and the like of the player object are changed on the basis of a change in the load applied to the board-type controller 9, and the position of the center of gravity of the load. It should be noted that in the exemplary game, directions in the virtual world (e.g., the moving direction, the forward direction, and the like of the player object Po) are set in accordance with the operation direction of the user; however, the directions are set on the basis of the attitude (direction) of the terminal apparatus 6. This is an example where, when the operation based on the attitude of the terminal apparatus 6 is compared to the operation using the board-type controller 9, the operation based on the attitude of the terminal apparatus 6 is selected because it makes it easier to perform the operation of setting directions, and increases a sense of presence in the game. Alternatively, in accordance with the content of the game, the more appropriate of the attitude of the terminal apparatus 6 and the position of the center of gravity of the load to be applied to the board-type controller 9 may be selected for the operation of indicating directions. When the terminal apparatus 6 and the board-type controller 9 are thus used as operation means, it is possible to select a suitable method from among a plurality of optional operations in order to set directions in the virtual world in accordance with an operation of the user.

It should be noted that the game system 1 allows the user to perform various games using the terminal apparatus 6 and the board-type controller 9 as operation means. The terminal apparatus 6 can be used as a controller that allows the user to provide an input by an operation based on the motion of the body of the terminal apparatus 6, a touch operation, a button operation, or the like, while it can be used as a portable display or a second display. Accordingly, the game system 1 achieves a wide range of games. That is, the terminal apparatus 6 functions as a display apparatus, and therefore, there may be a game system in which: the terminal apparatus 6 is used as display means while the monitor 2 and the controller 7 are not used; and the board-type controller 9 is used as operation means. Further, the terminal apparatus 6 functions as an operation device as well as a display apparatus, and therefore, there may be a game system in which the terminal apparatus 6 is used as display means while the monitor 2 and the controller 7 are not used, and the terminal apparatus 6 and the board-type controller 9 are used as operation means. Further, the terminal apparatus 6 functions as an operation device as well as a display apparatus, and therefore, there may be a game system in which the terminal apparatus 6 is used as display means while the monitor 2, the board-type controller 9, and the controller 7 are not used, and the terminal apparatus 6 is used as operation means.

In addition, in the exemplary embodiment, the terminal apparatus 6 functions as a so-called thin client terminal, which does not perform game processing. In the exemplary embodiment, however, at least a part of the series of steps in the game processing to be performed by the game apparatus body 5 may be performed by the terminal apparatus 6. As an example, the terminal game image generation process may be performed by the terminal apparatus 6. As another example, all the series of steps in the game processing to be performed by the game apparatus body 5 may be performed by the terminal apparatus 6. In this case, the terminal apparatus 6 functions as a processing device that performs the steps in the game processing, as well as a display apparatus, and therefore, there may be a game system in which: the terminal apparatus 6 is used as display means while the monitor 2, the game apparatus body 5, and the controller 7 are not used; the board-type controller 9 is used as operation means; and the terminal apparatus 6 is used as processing means. In this game system, only the terminal apparatus 6 and the board-type controller 9 are connected wirelessly or wired, and board operation data is transmitted from the board-type controller 9 to the terminal apparatus 6, thereby achieving various games. Further, it is needless to say that when the board-type controller 9 is not used either, the terminal apparatus 6 may be used as display means, operation means, and processing means.

In addition, in the above embodiment, attitude data (e.g., at least one piece of data output from the magnetic sensor 602, the acceleration sensor 603, and the gyro sensor 604) used to calculate the motion of the terminal apparatus 6 (including the position and the attitude, or changes in the position and the attitude) is output from the terminal apparatus 6 to the game apparatus body 5, and the motion of the terminal apparatus 6 is calculated by the information processing performed by the game apparatus body 5. The motion of the terminal apparatus 6 to be calculated by the game apparatus body 5, however, may be calculated by the terminal apparatus 6. In this case, the data indicating the motion of the terminal apparatus 6 that has been calculated by the terminal apparatus 6 (i.e., data indicating the position and the attitude of the terminal apparatus 6, or changes in the position and the attitude that have been calculated using the attitude data) is output from the terminal apparatus 6 to the game apparatus body 5, and the data is used in the information processing performed by the game apparatus body 5.

In addition, in the above descriptions, the terminal apparatus 6 and the game apparatus body 5 are connected by wireless communication, and the board-type controller 9 and the game apparatus body 5 are connected by wireless communication. Alternatively, wireless communication between devices may be performed in a form other than the above. As a first example, the terminal apparatus 6 functions as a relay device for another wireless communication. In this case, board operation data of the board-type controller 9 is wirelessly transmitted to the terminal apparatus 6, and the terminal apparatus 6 wirelessly transmits, to the game apparatus body 5, terminal operation data of the terminal apparatus 6 together with the received board operation data. In this case, while the terminal apparatus 6 and the game apparatus body 5 are directly connected by wireless communication, the board-type controller 9 is connected to the game apparatus body 5 via the terminal apparatus 6 by wireless communication. As a second example, the board-type controller 9 functions as a relay device for another wireless communication. In this case, terminal operation data of the terminal apparatus 6 is wirelessly transmitted to the board-type controller 9, and the board-type controller 9 wirelessly transmits, to the game apparatus body 5, board operation data of the board-type controller 9 together with the received terminal operation data. In this case, the board-type controller 9 and the game apparatus body 5 are directly connected by wireless communication, while the terminal apparatus 6 is connected to the game apparatus body 5 via the board-type controller 9 by wireless communication.

In addition, the terminal apparatus 6 and/or the board-type controller 9 may be electrically connected to the game apparatus body 5 via cables. In this case, the cables connected to the terminal apparatus 6 and/or the board-type controller 9 are connected to a connection terminal of the game apparatus body 5. As a first example, the terminal apparatus 6 and the game apparatus body 5 are electrically connected via a first cable, and the board-type controller 9 and the game apparatus body 5 are electrically connected via a second cable. As a second example, the terminal apparatus 6 and the game apparatus body 5 are electrically connected via a cable. In this case, board operation data of the board-type controller 9 may be wirelessly transmitted to the terminal apparatus 6 and then transmitted to the game apparatus body 5 via the cable. As a third example, the board-type controller 9 and the game apparatus body 5 are electrically connected via a cable. In this case, terminal operation data of the terminal apparatus 6 may be wirelessly transmitted to the board-type controller 9 and then transmitted to the game apparatus body 5 via the cable. Alternatively, terminal operation data of the terminal apparatus 6 may be wirelessly transmitted to the game apparatus body 5 directly from the terminal apparatus 6.

In addition, in the exemplary embodiment, the game system 1 includes one terminal apparatus 6 and one board-type controller 9. Alternatively, the game system 1 may be configured to include a plurality of terminal apparatuses 6 and a plurality of board-type controllers 9. That is, the game apparatus body 5 may be capable of wirelessly communicating with each terminal apparatus 6 and each type controller 9, and may transmit game image data, game sound data, and control data to each terminal apparatus, and receive terminal operation data, camera image data, microphone sound data, and board operation data from each terminal apparatus 6 and each board-type controller 9. When the game apparatus body 5 wirelessly communicates with the plurality of terminal apparatuses 6 and the plurality of board-type controllers 9, the game apparatus body 5 may perform the wireless communication in a time division manner or in a frequency division manner.

As described above, when the game system 1 includes a plurality of terminal apparatuses 6 and a plurality of board-type controllers 9, a plurality of users are allowed to play more games. For example, when the game system 1 includes two pairs of terminal apparatuses 6 and board-type controllers 9, two users are allowed to play a game simultaneously. Further, when the game system 1 includes two pairs of terminal apparatuses 6 and board-type controllers 9, the game system 1 includes three display apparatuses, and therefore can generate game images for three users to be displayed on the respective display apparatuses.

In addition, in the above descriptions, a plurality of load sensors 94 are provided in the board-type controller 9. If, however, information of the position of the center of gravity of a load applied to the board-type controller 9 is not used in the above processing, at least one load sensor 94 may be provided in the board-type controller 9.

In addition, the exemplary embodiment is described using the stationary game apparatus 3. The exemplary embodiment, however, may be achieved by executing the information processing program according to the exemplary embodiment with an information processing apparatus such as a hand-held game apparatus or a general personal computer. Further, in another embodiment, the exemplary embodiment may be applied not only to a game apparatus but also to a given hand-held electronic device (e.g., a PDA (Personal Digital Assistant) or a mobile telephone), a personal computer, a camera, and the like. Any device may be connected to the terminal apparatus 6 and the board-type controller 9 wirelessly or wired, whereby the exemplary embodiment can be achieved.

In addition, in the above descriptions, the information processing is performed by the game apparatus body 5. At least a part of the processing steps in the information processing, however, may be performed by another apparatus provided outside the game system 1. For example, when the game apparatus body 5 is configured to communicate with another apparatus (e.g., a server or another game apparatus), the processing steps in the information processing may be performed by the game apparatus body 5 in combination with said another apparatus. As an example, said another apparatus performs the process of setting a player object, a virtual world, and the like, and data concerning the motion and the attitude of the player object is transmitted from the game apparatus body 5 to said another apparatus, whereby the information processing is performed. Then, image data indicating the virtual world generated by said other apparatus is transmitted to the game apparatus body 5, and the virtual world is displayed on the monitor 2 and the LCD 61. At least a part of the processing steps in the information processing is thus performed by another apparatus, whereby the same processing as the information processing is achieved. It should be noted that at least a part of the processing steps in the information processing may be performed by the board-type controller 9 (the microcomputer 100). Further, the above information processing can be performed by one processor or by a cooperation of a plurality of processors, the one processor or the plurality of processors included in an information processing system including at least one information processing apparatus. Further, in the exemplary embodiment, the processes shown in the above flow charts are performed as a result of the CPU 10 of the game apparatus body 5 executing a predetermined program. Alternatively, a part or all of the processes may be performed by a dedicated circuit included in the game apparatus body 5.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

In addition, the shape of the game apparatus body 5 described above, the shapes of the terminal apparatus 6, the controller 7, and the board-type controller 9, and the shapes, the number, the placement, or the like of the various operation buttons and sensors are merely illustrative, and the exemplary embodiment can be achieved with other shapes, numbers, placements, and the like. Further, the processing orders, the setting values, the display forms, the criterion values, and the like that are used in the information processing described above are also merely illustrative, and it is needless to say that the exemplary embodiment can be achieved with other orders, display forms, and values.

In addition, the information processing program (the game program) described above may be supplied to the game apparatus body 5 not only from an external storage medium such as the optical disk 4, but also via a wireless or wired communication link. Further, the information processing program may be stored in advance in a nonvolatile storage device of the game apparatus body 5. It should be noted that examples of an information storage medium for storing the information processing program may include a CD-ROM, a DVD, given another optical disk storage medium similar to these, a flexible disk, a hard disk, a magnetic optical disk, and a magnetic tape, as well as a nonvolatile memory. Furthermore, the information storage medium for storing the information processing program may be a nonvolatile semiconductor memory or a volatile memory. Such storage media can be defined as storage media readable by a computer or the like. For example, a computer or the like is caused to read and execute programs stored in each of the storage media, and thereby can be caused to provide the various functions described above.

While some exemplary systems, exemplary methods, exemplary devices, and exemplary apparatuses have been described in detail, the foregoing description is in all aspects illustrative and not restrictive. It is understood that numerous other modifications and variations can be devised without departing from the spirit and scope of the appended claims. It is understood that the scope of the exemplary embodiment should be interpreted only by the scope of the appended claims. It is also understood that one skilled in the art can implement the exemplary embodiment in the equivalent range on the basis of the description of the exemplary embodiment and common technical knowledge, from the description of the specific embodiments. It should be understood that when used in the present specification, components and the like described in singular form with the words "a" and "an" before them do not exclude the plurality of these components. Furthermore, it should be understood that terms used in the present specification have meanings generally used in the art unless otherwise specified. Therefore, unless otherwise defined, all the jargons and technical terms have the same meanings as those generally understood by one skilled in the art of the exemplary embodiment. In the event of any contradiction, the present specification (including meanings defined herein) has priority.

A storage medium having stored thereon an information processing program, an information processing apparatus, an information processing system, and an information processing method according to the exemplary embodiment, when an image of a virtual world is displayed on a display apparatus that allows a user to view a screen thereof while holding it and an operation is performed on the virtual world in accordance with the attitude and the motion of the display apparatus, can facilitate the operation based on the attitude and the motion of the display apparatus, and therefore are suitable for use as an information processing program, an information processing apparatus, an information processing system, and an information processing method that perform processing based on the motion of a display apparatus.

What is claimed is:

1. A non-transitory computer-readable storage medium having stored thereon an information processing program to be executed by a computer of an information processing apparatus capable of displaying an image on a portable display apparatus that outputs at least data based on an attitude and/or a motion of the portable display apparatus body, the information processing program causing the computer to perform functionality comprising:
   calculating, on the basis of the attitude and/or motion data output from the portable display apparatus, at least a direction of rotation and an amount of rotation of the portable display apparatus about a predetermined direction in real space;
   calculating a corrected amount of rotation by offsetting the calculated amount of rotation by a predetermined amount;
   calculating, with respect to a direction that corresponds to the predetermined direction and is set in a virtual world, an operation indication direction based on the direction of rotation and the corrected amount of rotation;
   performing predetermined processing on the virtual world in accordance with the operation indication direction;
   generating a first image including at least a part of the virtual world subjected to the processing; and
   displaying the first image on the portable display apparatus.

2. The non-transitory computer-readable storage medium having stored thereon the information processing program according to claim 1, wherein
   in accordance with the operation indication direction, a process is performed of controlling an attitude of a first virtual camera set in the virtual world, and
   an image of the virtual world viewed from the first virtual camera is generated as the first image.

3. The non-transitory computer-readable storage medium having stored thereon the information processing program according to claim 2, wherein
   the attitude of the first virtual camera is controlled such that the operation indication direction coincides with a direction of a line of sight of the first virtual camera.

4. The non-transitory computer-readable storage medium having stored thereon the information processing program according to claim 1, wherein
   using as the predetermined direction a horizontal direction in real space perpendicular to a perspective direction of a display screen of the portable display apparatus, a direction of rotation and an amount of rotation of the perspective direction are calculated, and the operation indication direction is calculated so as to rotate about a horizontal direction in the virtual world on the basis of the direction of rotation and the corrected amount of rotation of the portable display apparatus.

5. The non-transitory computer-readable storage medium having stored thereon the information processing program according to claim 4, wherein the direction of rotation and the amount of rotation of the portable display apparatus about each of the predetermined direction, a direction of gravity in real space, and a horizontal direction in real space perpendicular to the predetermined direction are calculated, the corrected amount of rotation is calculated from the calculated amount of rotation about the predetermined direction, and the operation indication direction is calculated so as to: rotate about a horizontal direction in the virtual world on the basis of the direction of rotation and the corrected amount of rotation about the predetermined direction; rotate about a direction of gravity in the virtual world on the basis of the direction of rotation and the amount of rotation about the direction of gravity in real space; and rotate about a horizontal direction in the virtual world on the basis of the direction of rotation and the amount of rotation about the horizontal direction in real space perpendicular to the predetermined direction.

6. The non-transitory computer-readable storage medium having stored thereon the information processing program according to claim 1, wherein a direction of rotation and an amount of rotation of a perspective direction of a display screen of the portable display apparatus are calculated, using as the predetermined direction a direction defined in the portable display apparatus body.

7. The non-transitory computer-readable storage medium having stored thereon the information processing program according to claim 4, wherein the corrected amount of rotation is calculated by offsetting the calculated amount of rotation of the perspective direction about the predetermined direction, in an elevation direction and by the predetermined amount about the predetermined direction.

8. The non-transitory computer-readable storage medium having stored thereon the information processing program according to claim 4, wherein the corrected amount of rotation is calculated by offsetting the calculated amount of rotation of the perspective direction about the predetermined direction, in a depression direction and by the predetermined amount about the predetermined direction.

9. The non-transitory computer-readable storage medium having stored thereon the information processing program according to claim 4, wherein when, using as the predetermined amount an angle, between a horizontal direction in real space and the perspective direction, generated when the portable display apparatus is in a reference attitude in which a user views the first image displayed on the portable display apparatus while holding the portable display apparatus, an amount of rotation indicating the perspective direction of the portable display apparatus in the reference attitude is corrected to the corrected amount of rotation, the correction is made so that a direction obtained by the corrected amount of rotation is a horizontal direction in the virtual world.

10. The non-transitory computer-readable storage medium having stored thereon the information processing program according to claim 4, wherein when, using as the predetermined amount an angle, between a vertical direction in real space and the perspective direction, generated when the portable display apparatus is in a reference attitude in which a user views the first image displayed on the portable display apparatus while holding the portable display apparatus, an amount of rotation indicating the perspective direction of the portable display apparatus in the reference attitude is corrected to the corrected amount of rotation, the correction is made so that a direction obtained by the corrected amount of rotation is a vertical direction in the virtual world.

11. The non-transitory computer-readable storage medium having stored thereon the information processing program according to claim 1, wherein when the corrected amount of rotation indicates an amount of rotation beyond a vertically up direction in the virtual world, the corrected amount of rotation is calculated so as to be limited to the vertically up direction, and when the corrected amount of rotation indicates an amount of rotation beyond a vertically down direction in the virtual world, the corrected amount of rotation is calculated so as to be limited to the vertically down direction.

12. The non-transitory computer-readable storage medium having stored thereon the information processing program according to claim 1, wherein image data indicating the first image is output to the portable display apparatus, and the portable display apparatus performs features comprising:

acquiring the image data output from the information processing apparatus, and displaying the first image indicated by the acquired image data.

13. The non-transitory computer-readable storage medium having stored thereon the information processing program according to claim 12, the information processing program further causing the computer to perform features comprising generating compression image data by compressing the image data indicating the first image, wherein the generated compression image data is output to the portable display apparatus, the compression image data output from the information processing apparatus is acquired, the portable display apparatus further performs features comprising decompressing the compression image data to obtain the image data indicating the first image, and displaying the first image indicated by the acquired and decompressed image data.

14. The non-transitory computer-readable storage medium having stored thereon the information processing program according to claim 1, wherein besides the first image, a second image representing the virtual world is further displayed on another display apparatus connected to the information processing apparatus.

15. The non-transitory computer-readable storage medium having stored thereon the information processing program according to claim 14, the information processing program further causing the computer to perform features comprising generating compression image data by compressing the image data indicating the first image, wherein the generated compression image data is output to the portable display apparatus, and, besides the compression image data, image data indicating the second image is output to said another display apparatus without being compressed, and the portable display apparatus performs features comprising:

acquiring the compression image data output from the information processing apparatus;

decompressing the compression image data to obtain the image data indicating the first image; and displaying the first image indicated by the acquired and decompressed image data.

16. The non-transitory computer-readable storage medium having stored thereon the information processing program according to claim 14, wherein a point of view for generating the second image is set at a position different from a position of a point of view for generating the first image.

17. The non-transitory computer-readable storage medium having stored thereon the information processing program according to claim 14, wherein a point of view for generating the second image is set at a position in the virtual world including a point of view for generating the first image, and a range wider than a range of the virtual world represented by the first image is displayed as the second image on said another display apparatus.

18. The non-transitory computer-readable storage medium having stored thereon the information processing program according to claim 14, wherein a direction of a line of sight from a point of view for generating the second image is set in a vertical direction in the virtual world, and the point of view for generating the second image is set at a position of viewing from a bird's-eye view a point of view for generating the first image.

19. The non-transitory computer-readable storage medium having stored thereon the information processing program according to claim 1, wherein the portable display apparatus includes at least one of a gyro sensor and an acceleration sensor, each of which outputs data based on the attitude and/or the motion of the portable display apparatus body, and on the basis of the data output from the at least one of the gyro sensor and the acceleration sensor, the direction of rotation and the amount of rotation of the portable display apparatus are calculated.

20. The non-transitory computer-readable storage medium having stored thereon the information processing program according to claim 1, wherein an attitude of a virtual object in the virtual world is controlled in correspondence with the operation indication direction when the operation indication direction is within a specified range, and an attitude of a virtual camera imaging the virtual world is controlled in correspondence with the operation indication direction regardless of whether the operation indication direction is within the specified range.

21. An information processing apparatus capable of displaying an image on a portable display apparatus that outputs at least data based on an attitude and/or a motion of the portable display apparatus body, the information processing apparatus comprising:

a rotation information calculation unit that calculates, on the basis of the attitude and/or motion data output from the portable display apparatus, at least a direction of rotation and an amount of rotation of the portable display apparatus about a predetermined direction in real space;

a correction unit that calculates a corrected amount of rotation by offsetting by a predetermined amount the amount of rotation calculated by the rotation information calculation unit;

an operation indication direction calculation unit that calculates, with respect to a direction that corresponds to the predetermined direction and is set in a virtual world, an operation indication direction based on the direction of rotation and the corrected amount of rotation;

an operation indication direction processing unit that performs predetermined processing on the virtual world in accordance with the operation indication direction;

a first image generation unit that generates a first image including at least a part of the virtual world subjected to the processing performed by the operation indication direction processing unit; and a display control unit that displays the first image on the portable display apparatus.

22. An information processing system including a plurality of apparatuses configured to communicate with each other, the information processing system capable of displaying an image on a portable display apparatus that outputs at least data based on an attitude and/or a motion of the portable display apparatus body, the information processing system comprising:

a rotation information calculation unit that calculates, on the basis of the attitude and/or motion data output from the portable display apparatus, at least a direction of rotation and an amount of rotation of the portable display apparatus about a predetermined direction in real space;

a correction unit that calculates a corrected amount of rotation by offsetting by a predetermined amount the amount of rotation calculated by the rotation information calculation unit;

an operation indication direction calculation unit that calculates, with respect to a direction that corresponds to the predetermined direction and is set in a virtual world, an operation indication direction based on the direction of rotation and the corrected amount of rotation;

an operation indication direction processing unit that performs predetermined processing on the virtual world in accordance with the operation indication direction;

a first image generation unit that generates a first image including at least a part of the virtual world subjected to the processing performed by the operation indication direction processing unit; and a display control unit that displays the first image on the portable display apparatus.

23. An information processing method performed by a processor or a corporation of a plurality of processors included in an information processing system including at least one information processing apparatus capable of displaying an image on a portable display apparatus that outputs at least data based on an attitude and/or a motion of the portable display apparatus body, the information processing method comprising:
- calculating, on the basis of the attitude and/or motion data output from the portable display apparatus, at least a direction of rotation and an amount of rotation of the portable display apparatus about a predetermined direction in real space;
- calculating a corrected amount of rotation by offsetting the calculated amount of rotation by a predetermined amount;
- calculating, with respect to a direction that corresponds to the predetermined direction and is set in a virtual world, an operation indication direction based on the direction of rotation and the corrected amount of rotation;
- performing predetermined processing on the virtual world in accordance with the operation indication direction;
- generating a first image including at least a part of the virtual world subjected to the processing; and
- displaying the first image on the portable display apparatus.

* * * * *